US011708728B2

(12) United States Patent
Francis et al.

(10) Patent No.: US 11,708,728 B2
(45) Date of Patent: **\*Jul. 25, 2023**

(54) TORQUE WRENCH SYSTEM HAVING MULTIPLE TORQUE STATIONS

(71) Applicant: Dale Francis, Luling, LA (US)

(72) Inventors: Dale Francis, Luling, LA (US); Nicholas Francis, Luling, LA (US); William P. Bernard, Luling, LA (US); Oswald J. Bernard, Luling, LA (US); Lan Hiscox, Houston, TX (US); Brian Compton, Cypress, TX (US); Arthur Jones, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,098

(22) Filed: Aug. 10, 2021

(65) Prior Publication Data

US 2022/0025719 A1     Jan. 27, 2022

Related U.S. Application Data

(63) Continuation of application No. 16/594,315, filed on Oct. 7, 2019, now Pat. No. 11,085,252, which is a continuation of application No. 15/894,174, filed on Feb. 12, 2018, now Pat. No. 10,435,965, which is a continuation of application No. 14/172,096, filed on Feb. 4, 2014, now Pat. No. 9,890,599, which is a continuation of application No. 13/736,101, filed on Jan. 8, 2013, now Pat. No. 8,640,780, which is a
(Continued)

(51) Int. Cl.
*E21B 19/16* (2006.01)
*B25B 21/00* (2006.01)
*B25B 23/14* (2006.01)
*B23P 19/06* (2006.01)
*E21B 17/08* (2006.01)

(52) U.S. Cl.
CPC .......... *E21B 19/161* (2013.01); *B23P 19/061* (2013.01); *B23P 19/069* (2013.01); *B25B 21/002* (2013.01); *B25B 21/005* (2013.01); *B25B 21/008* (2013.01); *B25B 23/14* (2013.01); *E21B 17/085* (2013.01); *E21B 19/16* (2013.01); *E21B 19/163* (2013.01); *E21B 19/165* (2013.01)

(58) Field of Classification Search
CPC .............................. E21B 19/16; E21B 19/163
See application file for complete search history.

(56) References Cited

U.S. PATENT DOCUMENTS 3,165,899 A * 1/1965 Shatto, Jr. ............... E21B 41/04
81/54
2016/0084065 A1* 3/2016 DeBerry ............... E21B 19/165
166/336

\* cited by examiner

*Primary Examiner* — Tara Schimpf
(74) *Attorney, Agent, or Firm* — Roy Kiesel Ford Doody & North, APLC; Brett A. North

(57) ABSTRACT

An improved multi-bolt and nut torque wrench for installing and removing bolts or nuts from flanged joints or the like which includes a plurality of torque stations having a plurality of high torque wrenches for engaging the heads of the bolts or nuts during a high torque phase of removal or installation; a plurality of low-torque motors operatively engaged with the wrenches for rotating the bolts or nuts during the low torque phase of removal or installation; a source of hydraulic fluid for driving the low-torque motors during the low-torque phase, and driving the high-torque wrenches during the high torque phase; and a mechanism for switching between the two phases depending on the torque needed.

18 Claims, 52 Drawing Sheets

Related U.S. Application Data continuation of application No. 13/448,536, filed on Apr. 17, 2012, now Pat. No. 8,347,972, which is a continuation of application No. 13/235,928, filed on Sep. 19, 2011, now Pat. No. 8,157,018, which is a continuation of application No. 12/434,861, filed on May 4, 2009, now Pat. No. 8,020,626.

(60) Provisional application No. 61/050,067, filed on May 2, 2008.

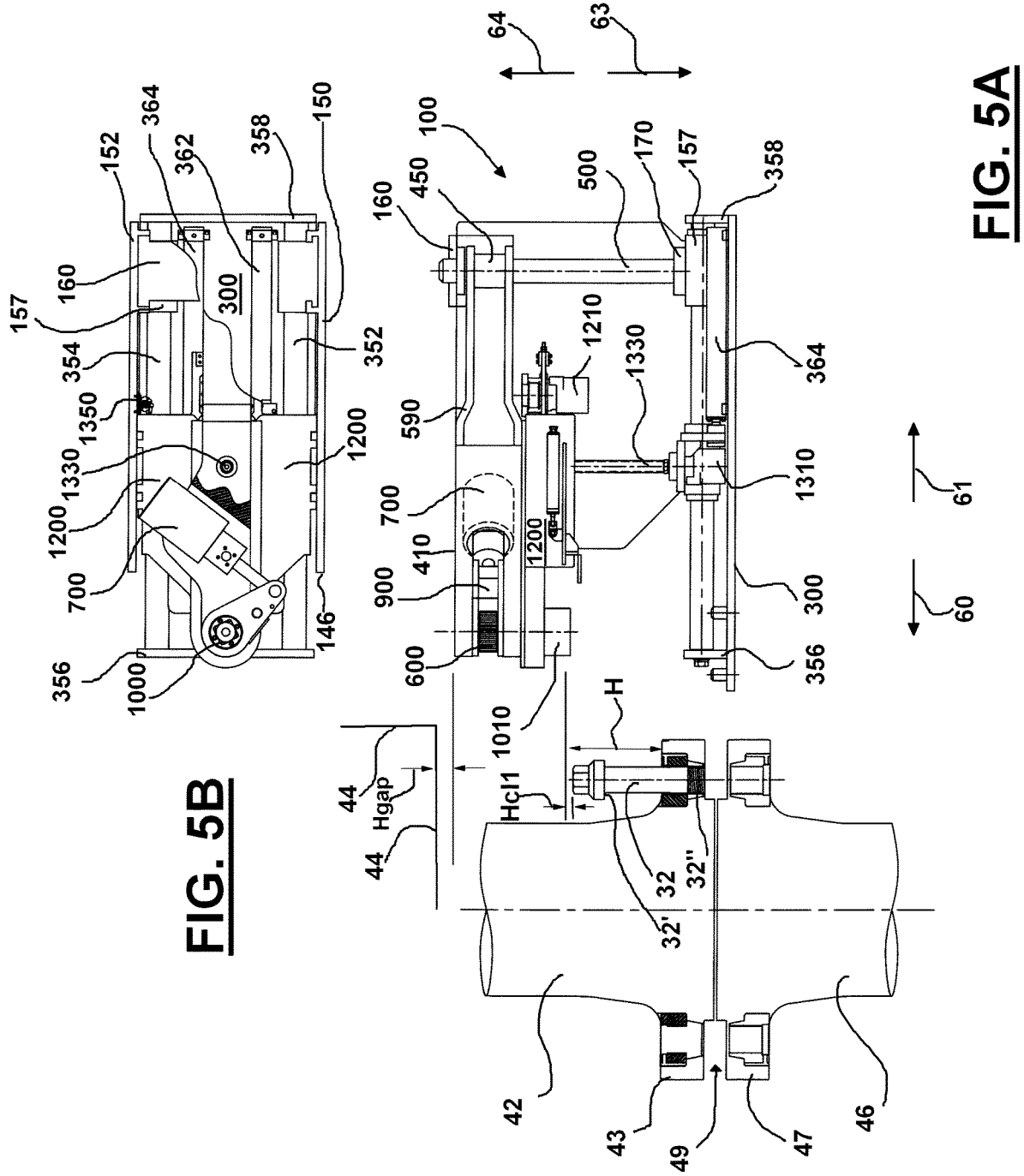

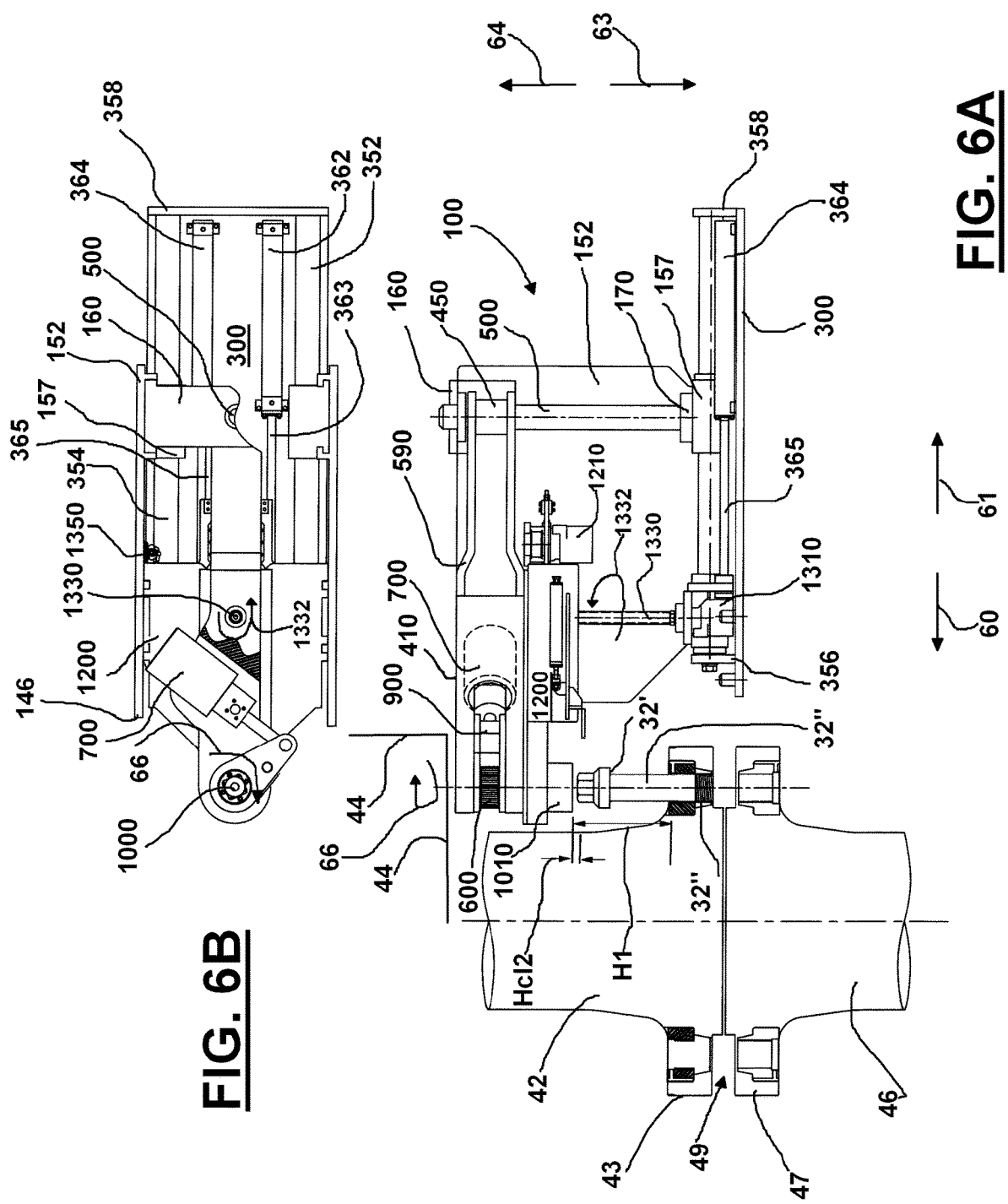

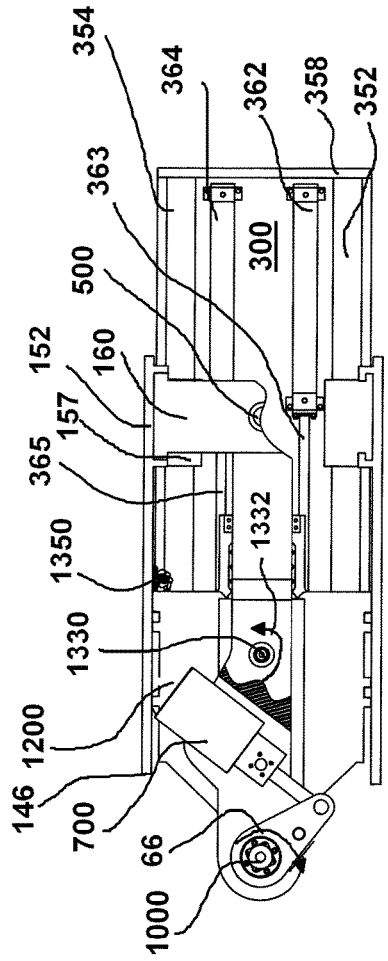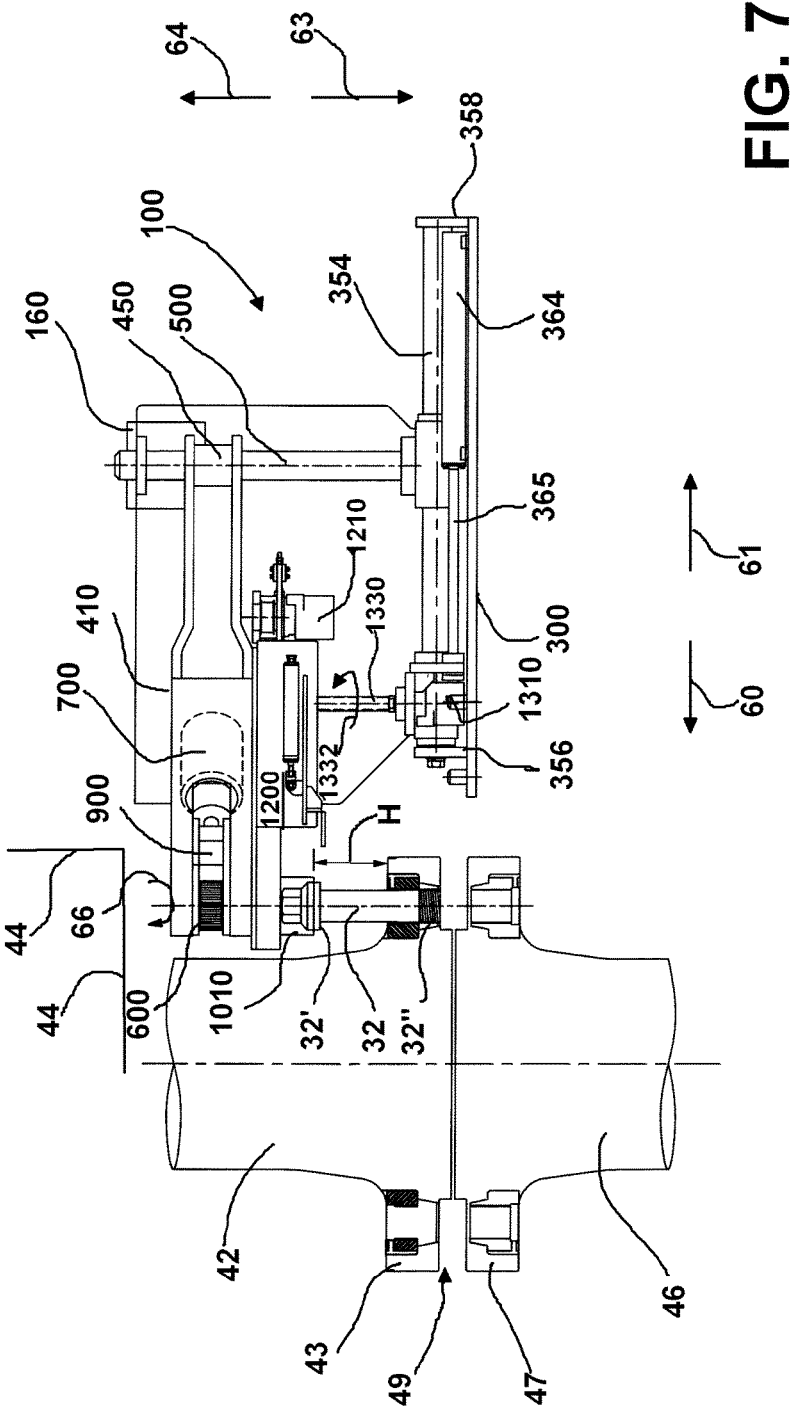

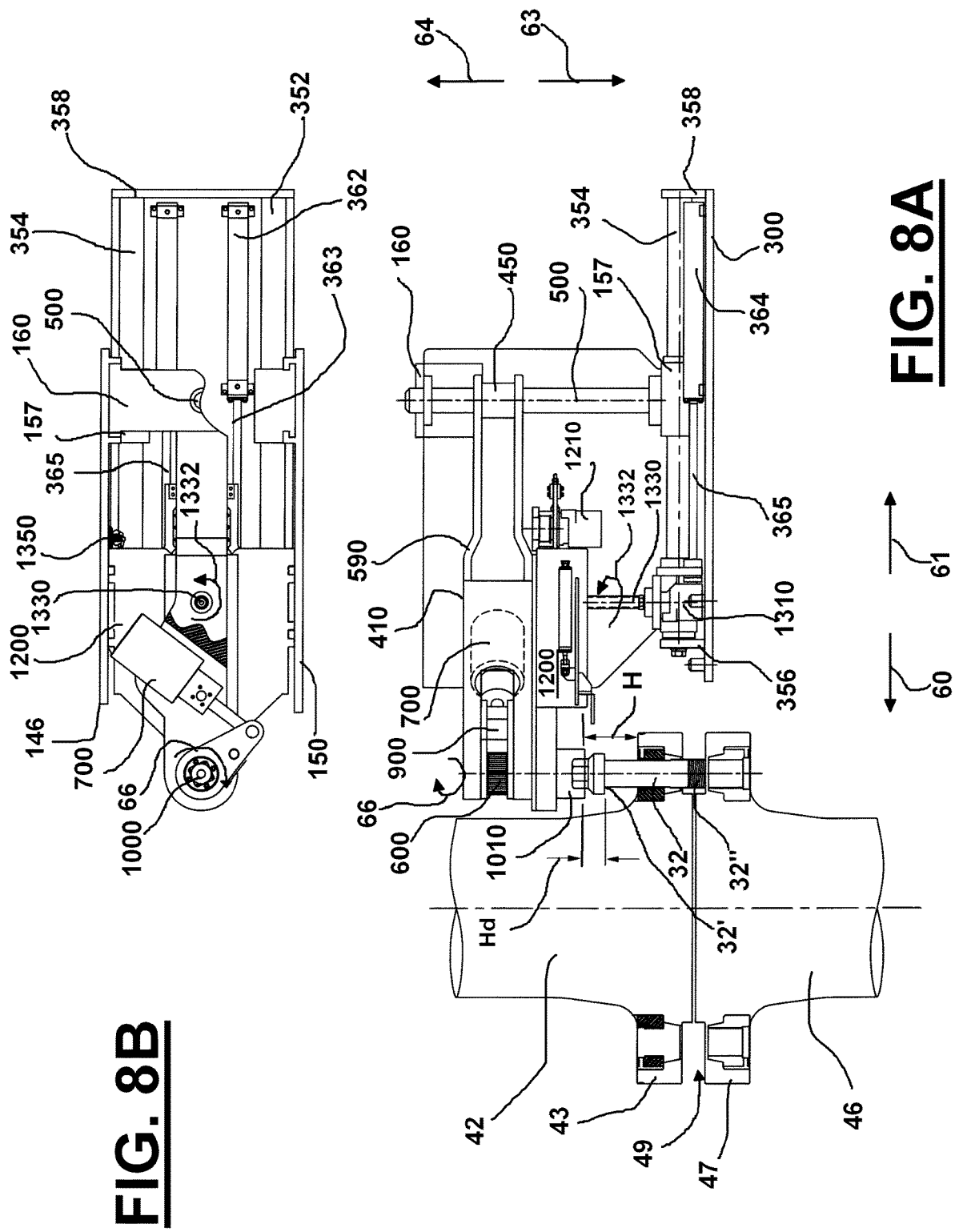

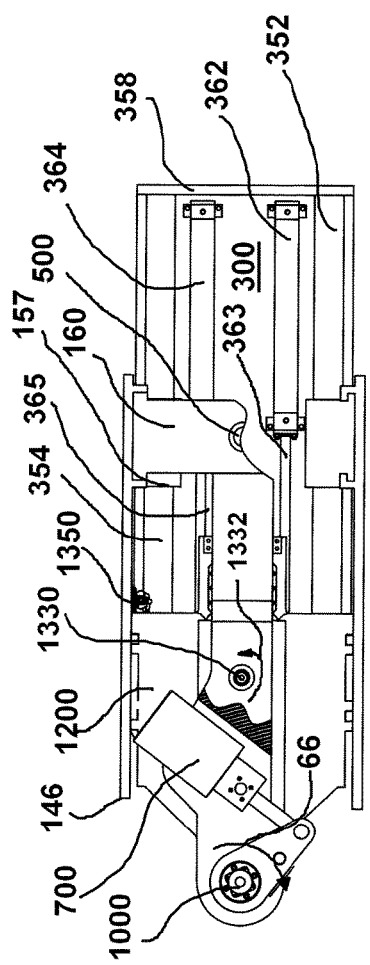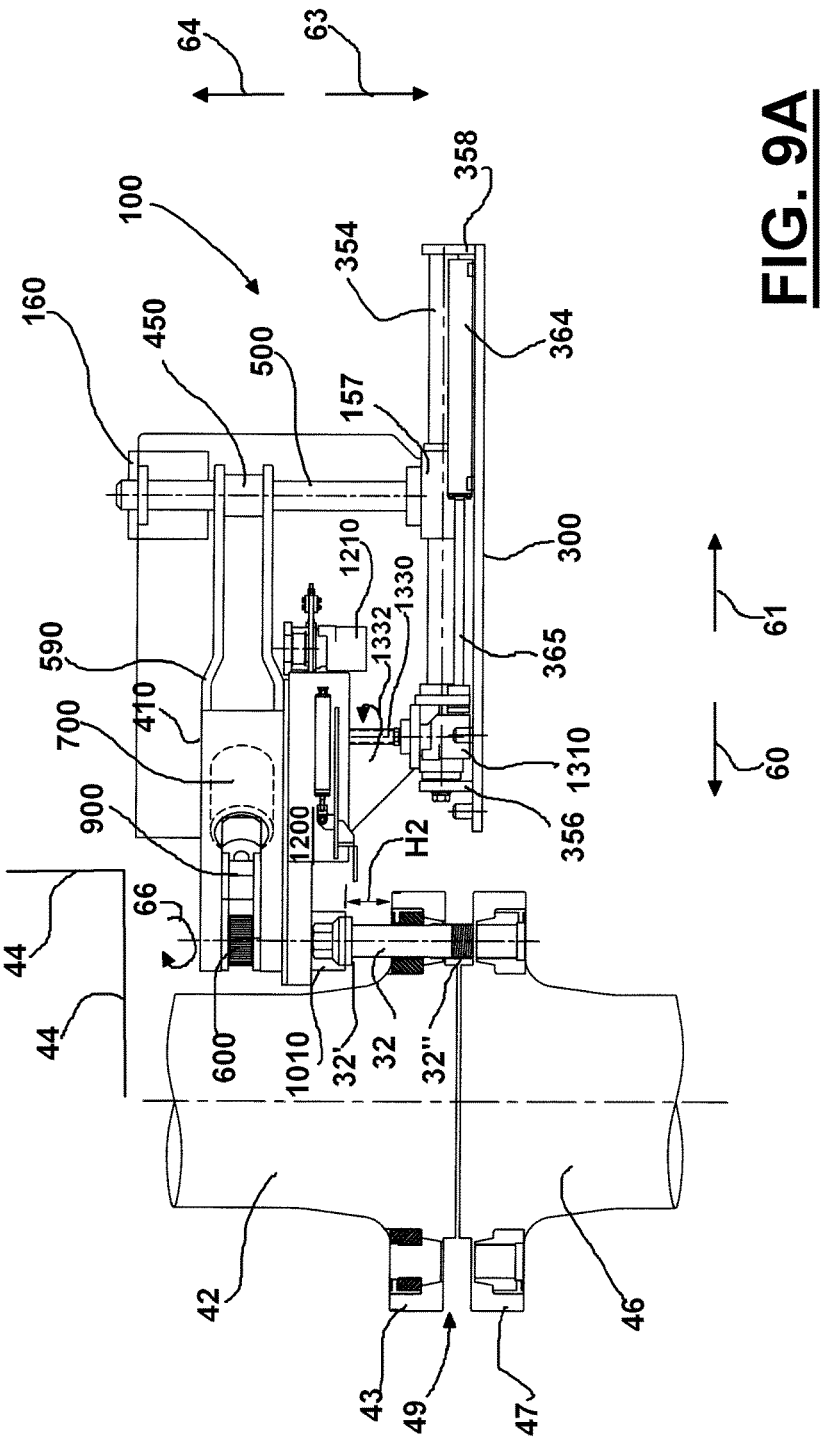

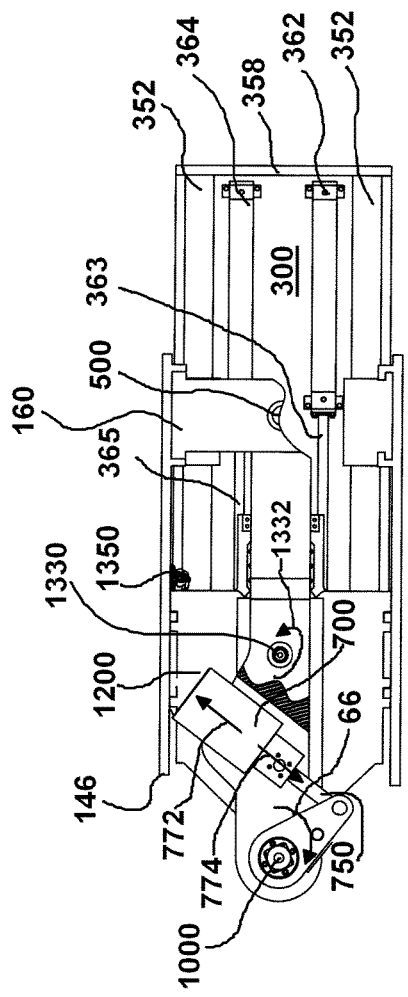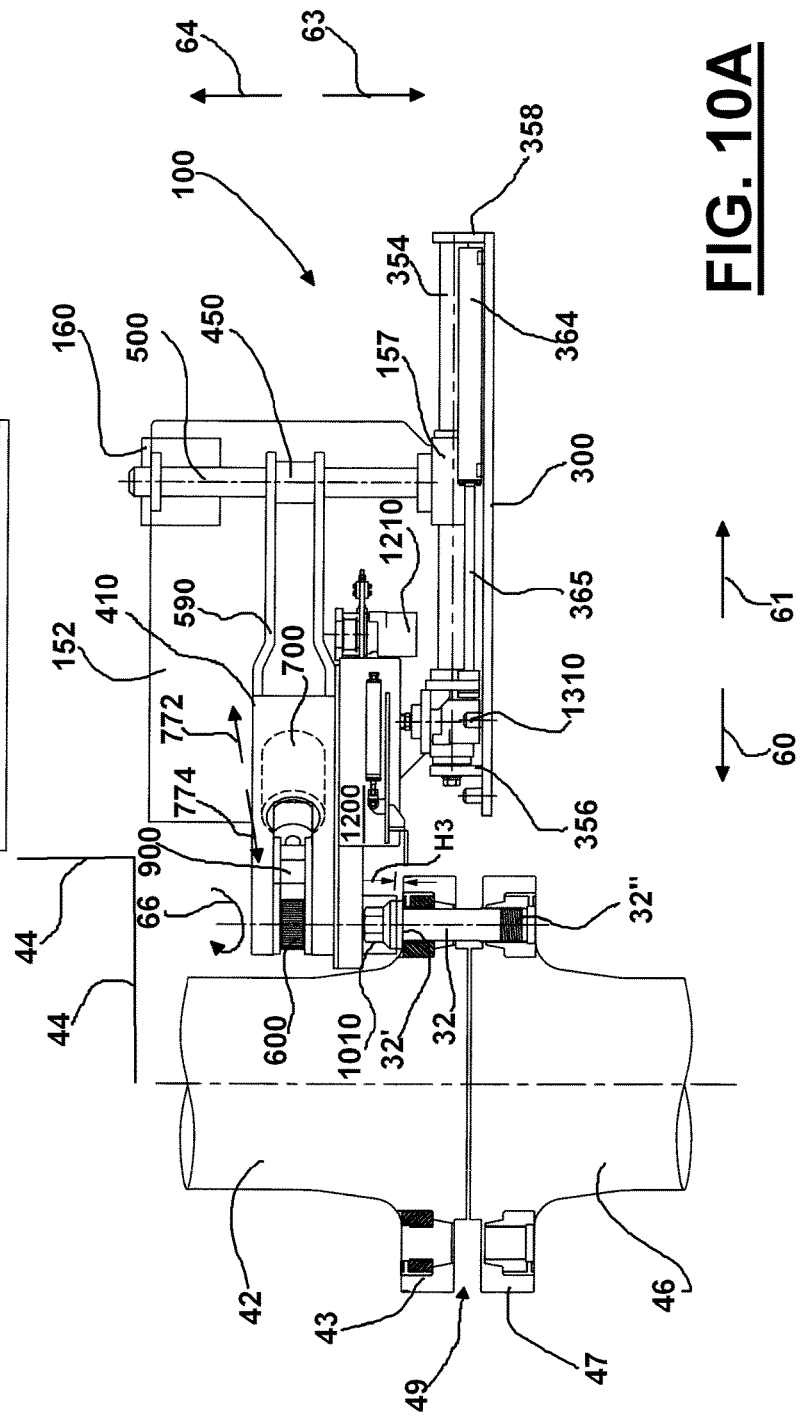

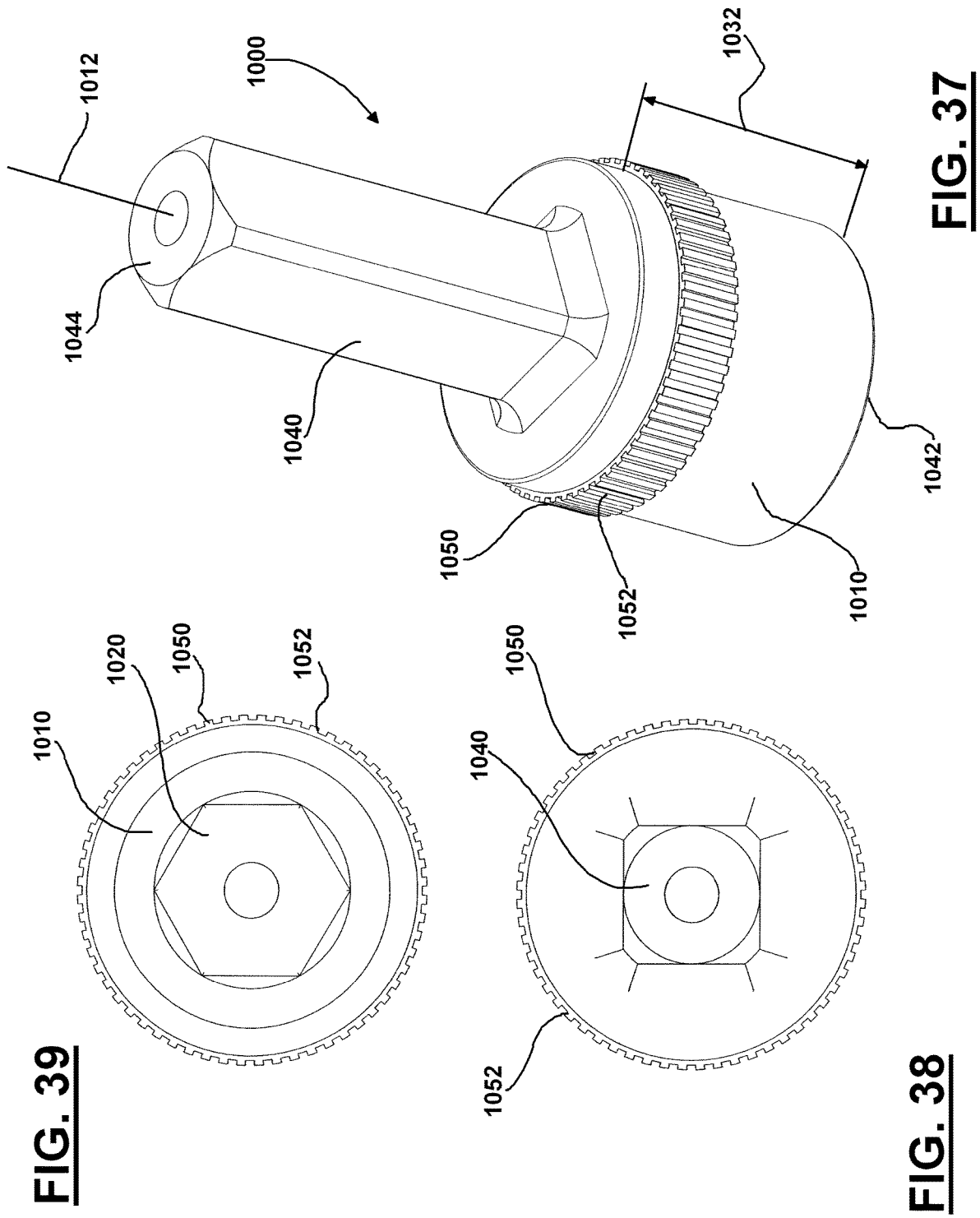

TORQUE WRENCH SYSTEM HAVING MULTIPLE TORQUE STATIONS

CROSS-REFERENCE TO RELATED APPLICATIONS

This is a continuation of U.S. patent application Ser. No. 16/594,315 filed Oct. 7, 2019 (now U.S. Pat. No. 11,085,252 on Aug. 10, 2021), which is a continuation of U.S. patent application Ser. No. 15/894,174 filed Feb. 12, 2018 (now U.S. Pat. No. 10,435,965 on Oct. 8, 2019), which is a continuation of U.S. patent application Ser. No. 14/172,096, filed Feb. 4, 2014 (now U.S. Pat. No. 9,890,599), which is a continuation of U.S. patent application Ser. No. 13/736,101, filed Jan. 8, 2013 (now U.S. Pat. No. 8,640,780), which is a continuation of U.S. patent application Ser. No. 13/448,536, filed Apr. 17, 2012 (now U.S. Pat. No. 8,347,972), which was a continuation of U.S. patent application Ser. No. 13/235,928, filed Sep. 19, 2011 (now U.S. Pat. No. 8,157,018), which was a continuation of U.S. patent application Ser. No. 12/434,861 filed May 4, 2009 (now U.S. Pat. No. 8,020,626), which claims the benefit of/was a non-provisional of U.S. Provisional Patent Application Ser. No. 61/050,067, filed May 2, 2008. Each of these applications are incorporated herein by reference. Priority of each of these applications is hereby claimed.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND

The present invention relates to torquing systems. More particularly, in one embodiment the present invention relates to an improved torque wrench system having multiple torque stations providing for the makeup and removal of a plurality of threaded bolts or nuts. In one embodiment the improved torquing system includes both high torque and low torque phases of the makeup or removal process. In one embodiment both high speed and low speed phases are provided.

In the makeup or break down of large structures, such as, for example rig risers, the sections of the riser are flanged together with bolts threadably engaging the flanges on the end of each section, and made up very tightly to complete the structure. There are numerous other types of structures which use this same system of makeup, i.e., very large bolts through flanges connecting sections of structures.

Flanged riser joints use specially designed bolts that must be torqued to a precise preload. Typically, flanged riser connectors in the offshore drilling industry use six (6) bolt flanges with each bolt straddling an auxiliary line position. During the operation of running the blow out preventer or "BOP" (e.g., initially installing the BOP and riser), an upper flange of a riser joint in the riser string can be landed and supported on the riser spider (e.g., with the spider dogs in an extended state). A new riser joint can stabbed or placed on top of the supported riser joint and the plurality of riser bolts can be turned down and torqued thereby making up the connection. This process can be repeated as many times as needed until the riser string reaches the sea floor and can be attached to the wellhead.

In a typical rig riser structure the flanged sections of the risers include six (6) holes radially spaced apart in about sixty (60) degree increments (around the 360 degree bolt circle of the riser section flanges). The riser string typically extends from the drilling rig above the surface of the water to the wellhead located at sea floor. In deepwater installations the depth of water typically exceeds 5,000 feet. Riser sections are typically provided in 75 foot lengths, yielding a minimum of 67 riser sections or joints and 67 multiplied by 6 (or 402) bolts which must be properly tightened or made up (when installing the riser) or loosened or broken out (when removing the riser).

Presently, when installing or removing riser sections or joints, torque wrenches are manually positioned and operated to individually tighten or loosen each of the six bolts for each riser section or joint. In an effort to speed up the process two torque wrenches operated by two operators can be used addressing two bolts at the same time. However, each operator must individually position and operate his torque wrench on the head of each bolt when tightening or loosening. The operator continues around the flange until all six bolts have been torqued. Additionally, after completing each bolt, the operator must manually remove the torque wrench from the made up bolt and position the torque wrench on the next bolt. After all bolts are torqued down, the spider dogs are retracted and the riser string (e.g., plurality of riser joints and BOP) is lowered to allow the placement and make-up of the connection to the next riser joint section.

This manual process is time consuming and slows down both the initial installation along with the removal of the riser. Additionally, the operators of these torque wrenches can become tired slowing down the process, making mistakes, damaging equipment, and/or causing injury. Due to increasing rig day rates and improved HSE requirements, it is desirable to create a tool that can preload each riser flange connection quicker and without human presence at the well center. This would improve rig operational efficiency as well as safety performance. In a typical yearly operation of a drilling rig the riser string can be retrieved (tripping out) and installed (tripping in) between two and twenty four times.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

One embodiment of the method and apparatus solves the problems confronted in the art in a simple and straightforward manner. What is provided is an improved method and apparatus for robotically and simultaneously installing or removing a plurality of bolts from the flanged joints of a rig's riser or the like wherein the apparatus includes a plurality of torque stations each having positionable variable torque wrenches for engaging the heads of the plurality of bolts and rotating the bolts during two torque phases including a low-torque phase (which has lower torques but higher rotational speeds), and a high-torque phase (which has higher torques but lower rotational speeds).

In one embodiment is provided a plurality of torque wrenches for rotating a plurality of bolts; a positioning mechanism for positioning and removing each wrench on, with, and/or off of the bolts during each successive cycle of tightening or loosening, and a source of fluid for driving each torque wrench.

In one embodiment is provided a hydraulically actuated riser spider that sits on the floor of the drilling rig such as on top of the gimbal or rotary table. In one embodiment the spider will have a wrench system attached to the spider (which can be welded or bolted on top of the spider).

In one embodiment the wrench system can include a plurality (e.g., six or eight) torquing stations and their operating systems. In one embodiment hydraulics to the riser spider and wrench system can come from a control panel that is located adjacent or next to the spider and wrench system (e.g., on the drill floor). In one embodiment the control panel for the wrench system can be located remote from the torquing stations. In one embodiment the control panel can be located in the drillers shack.

In one embodiment the wrench system can be placed on the spider and be moved with the spider to and from the riser. In one embodiment the wrench system can sit on the spider. In one embodiment the wrench system is connected to (e.g., bolted) to the spider.

In one embodiment operation of the wrench system (and/or spider) will require a single individual standing at the control panel, which can be strategically positioned to observe operation of the tool. In one embodiment no technicians will be required to be on the wrench system and/or spider and/or around the riser joint during flange make-up or break-out. In one embodiment the control panel for the wrench system can be located remote from the torquing stations. In one embodiment the control panel can be located in the driller's shack.

In one embodiment the spider can include retractable bearing surfaces that will hold the upper flange of a riser joint section, and transmit the weight of the riser string and BOP stack to the gimbal top plate or rotary table.

Makeup

In one embodiment the wrench system can comprise six (6) torque stations with the ability to preload all six riser bolts simultaneously during make-up. In one embodiment each torque station will torque each riser bolt to substantially the same torque value. In one embodiment each bolt will be torqued to within an acceptable range of a specified make-up torque value. In one embodiment the acceptable range is within about 1, 2, 3, 4, 5, 6, 7, 8, 9, 10, 11, 12, 13, 14, 15, 16, 17, 18, 19, 20, 21, 22, 23, 24 and/or 25 percent of each other. In various embodiments the acceptable range is between about any two of the above specified percentages.

In one embodiment a record (which can be computer generated) can be kept for the makeup value of each bolt in the riser string.

In one embodiment the make up sequence for each riser joint can include the following steps: (a) extending the spider legs (which can be controlled by the control panel) to support a riser string; (b) lowering the riser string until the top flange lands on spider dogs; (c) activating the torquing sequence of the wrench system from the control panel; (d) having the plurality of torquing stations engaging their respective bolts; (e) having the plurality of torquing stations spinning down their respective bolts from the lower flange on the upper riser section to the upper flange on the lower riser section; (f) having the plurality of torquing stations torquing down their respective bolts to a desired torque or torque range; (g) having the plurality of torquing stations disengaging the plurality of bolts and providing clearance for the riser string to be lowered, supported by the spider, and a new riser joint to be stabbed on top of the riser string; (h) lowering the made up portion of the riser string and stabbing a new riser joint on top of the lowered riser string; and (i) extending the spider legs to support the riser string.

In one embodiment the during step "d" the plurality of torquing stations move from retracted positions to radially extended positions. In one embodiment the plurality of torquing stations in step "d" move from upper positions to lower positions. In one embodiment the move from retracted to radially extended positions occurs before the move from upper positions to lower positions.

In one embodiment steps "c" through "g" are completed within less than a set period of time. In one embodiment the set period of time is less than 5, 4.5, 4, 3.5, 3, 2.5, 2, 1.5, and 1 minutes. In various embodiments the set period of time is between any two of the above specified periods of time.

In one embodiment when first radially extended the upper part of the torque wrench is located within a projected circle of a flotation unit attached to the upper riser section, but also located between the floatation unit and the head of the bolt. In this way the torque wrench clears the floatation attachment without damaging same.

In one embodiment in step "d" the plurality of torquing stations simultaneously first engage the plurality of bolts. In one embodiment in step "d" at least of the plurality of torquing stations first engage the plurality of bolts at a different time then at least one of the other of the plurality of torquing stations.

In one embodiment during step "e" each bolt can freely vertically drop between the threads of the upper flange section and lower flange section of the two riser sections being attached. In one embodiment during this free drop the head of the bolt can remain engaged with the drive socket. In one embodiment the rotational speed of the drive socket can remain constant during the free drop of the bolt. In one embodiment the vertical speed of the drive socket can remain constant during the free drop.

In one embodiment during step "e" the spinning down can include a high speed/low torque rotation of the bolts, and during step "f" the torquing down can include a low speed/high torque rotation of the bolts, where high torque is substantially higher than low torque, and high speed is substantially higher than low speed.

In one embodiment step "e" can include first and second rotational high speeds, where the second rotational high speed is higher than the first rotational high speed, and both first and second rotational high speeds are substantially higher than the low speed of step "f." In one embodiment the first rotational high speed is 15, 20, 25, 30, 35, 40, 45, 50, 55, 60, 65, 70, and/or 75 percent of the second rotational high speed. In various embodiments the first rotational high speed is between about any two of the above specified percentages in relation to the second rotational high speed.

In one embodiment the rate of vertical speed of the drive socket head of each torquing station changes with the rotational speed of the drive socket. In one embodiment the rate of vertical speed of the drive socket is synchronized with the rotational speed of the drive socket. In one embodiment step "e" can include first and second vertical high speeds, where the second vertical high speed is higher than the first high speed, and both first and second vertical high speeds are substantially higher than the low vertical speed of step "f." In one embodiment the first vertical high speed is 15, 20, 25, 30, 35, 40, 45, 50, 55, 60, 65, 70, and/or 75 percent of the second vertical high speed. In various embodiments the first vertical high speed is between about any two of the above specified percentages in relation to the second vertical high speed.

In one embodiment first and second rotational high speeds of step "e" can be switched based on the height of the drive socket of each torquing station. In one embodiment first and second rotational high speeds of step "e" can be switched based on the height of the bolt being spun down. In one embodiment the switch can be based on the bolt engaging at least two threads of in the lower flange of the two sections of riser joints being attached. In one embodiment the switch from first to second high speeds can occur simultaneously with a plurality of torquing stations (or with all torquing stations). In one embodiment there can be a pause between the switch from first to second rotational high speeds of all torquing stations. In various embodiments the pause can be ½, ¾, 1, 1½, 2, 3, 4, and 5 seconds. In various embodiments the pause can be between any two of the above specified time periods.

In one embodiment the switch from step "e" to step "f" can be switched based on the height of the drive socket of each torquing station. In one embodiment the switch from step "e" to step "f" can be based on the height of the bolt being spun down. In one embodiment the switch can be based on the shoulder of the bolt engaging the upper flange of the two sections of riser joints being attached. In one embodiment the switch from step "e" to step "f" can occur simultaneously with a plurality of torquing stations (or with all torquing stations). In one embodiment there can be a pause between the switch from step "e" to step "f" for all torquing stations. In various embodiments the pause can be ½, ¾, 1, 1½, 2, 3, 4, and 5 seconds. In various embodiments the pause can be between any two of the above specified time periods. In one embodiment during the pause the rotational control of the drive sockets are relaxed so as not to attempt to rotate the bolts. In one embodiment the vertical location controls of the drive sockets are relaxed. In one embodiment the radial positioning controls are relaxed.

In one embodiment step "f" can simultaneously start with a plurality of torquing stations (or with all torquing stations). In one embodiment step "f" can simultaneously start with one half of the torquing stations (e.g., torquing stations 110A-C) and then simultaneously start the second half of the torquing stations (e.g., stations 110D-F). In one embodiment step "f" can simultaneously start with two of the torquing stations (e.g., torquing stations 110A-B), and then simultaneously start with a second two of the torquing stations (e.g., stations 110C-D), and then simultaneously start with a third two of the torquing stations (e.g., stations 110E-F).

In one embodiment each of the torquing stations can continue in step "f" until the individual torquing station reaches a desired make up torque for its respective bolt. In one embodiment the desired make-up torque can be based on the stalling hydraulic pressure sent to the low speed high torque system of the particular torquing station.

In one embodiment the switch from step "f" to step "g" can occur simultaneously for each of the torquing stations. In one embodiment the switch from step "f" to step "g" can occur simultaneously for a plurality of the torquing stations. In one embodiment the switch from step "f" to step "g" can occur separately for each of the torquing stations, and can be based on the individual torquing stations torquing up its respective bolt to the desired torque.

In one embodiment, a warning signal is sent if one or more torquing stations are not able to torque up its respective bolt to a desired torque. In one embodiment this warning signal is sent after a set period of time after the particular torquing station entered high torque mode (i.e., step "f").

In one embodiment the during step "f" the plurality of torquing stations move from extended positions to radially retracted positions. In one embodiment the plurality of torquing stations in step "f" move from lower positions to upper positions. In one embodiment the move from lower to upper positions occurs before the move from radially extended to radially retracted positions. In one embodiment, after raising a specified vertical height both radial retraction and raising of the drive socket can occur at a torquing stations. In one embodiment the set height is based on adequately clearing the station's respective head of its made up bolt.

In one embodiment during step "h" the riser string can be supported by the draw works of the rig or the top drive of the rig.

In one embodiment steps "a" through "i" are repeated until enough riser joints or sections are connected to the riser string so that the string can be attached to a well head.

Break-Out

In one embodiment the break out (or riser retrieval) sequence for each riser joint can include the following steps: (a) extending the spider legs/dogs (which can be controlled by the control panel) to support a riser string; (b) raising the riser string until an upper flange lands on spider dogs; (c) activating the torquing sequence of the wrench system from the control panel; (d) having the plurality of torque stations engaging their respective bolts; (e) having the plurality of torque stations breaking out their respective bolts from the upper flange on the lower riser section to the lower flange on the upper riser section; (f) having the plurality of torque stations spinning up bolts from the lower flange; (g) having plurality of torque stations lifting their respective bolts to the upper flange; (h) having the plurality of torque stations spinning their respective bolts into a storage position on the upper flange; (i) having the plurality of torque stations disengaging the plurality of bolts and providing clearance for the riser string to be raised; (j) retrieving the disconnected riser section; (k) raising the remaining portion of the riser string; and (l) extending the spider legs/dogs and supporting the remaining portion on the spider legs/dogs.

In one embodiment the during step "d" the plurality of torquing stations move from retracted positions to radially extended positions. In one embodiment the plurality of torquing stations in step "d" move from upper positions to lower positions. In one embodiment the move from retracted to radially extended positions occurs before the move from upper positions to lower positions. In one embodiment, for at least a portion of step "d" the move vertical and radial movement occur simultaneously.

In one embodiment steps "c" through "i" are completed within less than a set period of time. In one embodiment the set period of time is less than 5, 4.5, 4, 3.5, 3, 2.5, 2, 1.5, and 1 minutes. In various embodiments the set period of time is between any two of the above specified periods of time.

In one embodiment when radially extended the upper part of the torque wrench is located within a projected circle of a flotation unit attached to the upper riser section, but also located between the floatation unit and the head of the bolt. In this way the torque wrench clears the floatation attachment without damaging same.

In one embodiment in step "d" the plurality of torquing stations simultaneously first engage the plurality of bolts. In one embodiment in step "d" at least of the plurality of torquing stations first engage the plurality of bolts at a different time then at least one of the other of the plurality of torquing stations.

In one embodiment, during step "d" each of the drive sockets at their respective torquing stations can rotate at a first high rotational speed until dropping down to a first vertical height as determined by a height sensor. In one embodiment a first vertical height of the socket head corresponds to the drive socket being located on the bolt head.

In one embodiment each drive socket is rotated at the first rotational speed until the drive socket reaches a second vertical height at which time the high speed low torque motor is stopped and hydraulically relaxed. At this same time vertical movement of the drive socket head is stopped and the hydraulic motor driving the vertical positioning screw is hydraulically relaxed for a set period of time. In one embodiment the set period of time can be ½, ¾, 1, 1½, 2, 3, 4, and 5 seconds. In various embodiments the set period of time can be within a range of between any two of the above set periods of time.

In one embodiment steps "d" and "f" can include first and second rotational high speeds, where the second rotational high speed is higher than the first rotational high speed, and both first and second rotational high speeds are substantially higher than the low speed of step "e." In one embodiment the first rotational high speed is 15, 20, 25, 30, 35, 40, 45, 50, 55, 60, 65, 70, and/or 75 percent of the second rotational high speed. In various embodiments the first rotational high speed is between about any two of the above specified percentages in relation to the second rotational high speed.

In one embodiment if a first vertical height of drive socket is not achieved within a set period of time at a particular torquing station, at least one locating high torque stroke is made on the drive socket to assist in locating the drive socket on the bolt head and a further check on the vertical height of the socket head is made to determine engagement of the bolt head by the drive socket. In one embodiment after the first iteration of the locating drive stroke is made and the locating high torque stroke is not achieved for the drive socket, a second iteration of locating drive stoke is made and the vertical height of the drive socket is checked. In various embodiment multiple iterations of locating high torque strokes can be made along with checks of the vertical heights of the drive sockets, until engagement of the bolt head is determined.

In various embodiments, before each locating high torque stroke is made, vertical movement of the drive socket is stopped. In one embodiment the vertical control system is also relaxed before each locating high torque stroke is made.

In various embodiments, before each locating high torque stroke is made, rotation of the drive socket is stopped. In one embodiment the high speed rotational motor is also relaxed before each locating high torque stroke is made. In one embodiment pressure is maintained on the rotational motor to assist in positioning each drive socket after it has located the head of its particular riser bolt.

In various embodiments, before each locating high torque stroke is made, the radial positioning system for the drive socket is relaxed.

In one embodiment, a warning signal is sent if one or more torquing stations are not able to be located on their respective bolt head within a set period of time (i.e., step "d"), or within a set number of high torque locating strokes.

In one embodiment, after reaching the first vertical height, the vertical positioning screw moves the drive socket to a second vertical height and holds the drive socket at this height. In one embodiment at the time the vertical position-ing screw is stopped, the drive socket head enters a high torque break-out mode (step "e").

In one embodiment during the high torque break out mode (step "e"), the high torque cylinder is cycled for a set number of cycles. In one embodiment the set number of cycles can be 1, 2, 3, 4, 5, 6, 7, 8, 9, 10, 11, 12, 13, 14, 15, 16, 17, 18, 19, 20, 21, 22, 23, 24, 25, 30, 35, 40, 45, and 50. In various embodiments the set number of cycles can be within a range of between any two of the above set number of cycles. In one embodiment after its last cycle, the high torque system fully retracts. In one embodiment full retraction is determined by a timing sequence using the high torque hydraulic cylinder, such as extension hydraulic pressure for a set period of time which can be ½, ¾, 1, 1½, 2, 3, 4, and 5 seconds. In various embodiments the set period of time can be within a range of between any two of the above set periods of time.

In one embodiment each of the drive sockets are started in the high torque mode simultaneously (step "e"). In one embodiment step "e" can simultaneously start with a plurality of torquing stations (or with all torquing stations). In one embodiment step "e" can simultaneously start with one half of the torquing stations (e.g., torquing stations 110A-C) and then simultaneously start the second half of the torquing stations (e.g., stations 110D-F). In one embodiment step "e" can simultaneously start with two of the torquing stations (e.g., torquing stations 110A-B), and then simultaneously start with a second two of the torquing stations (e.g., stations 110C-D), and then simultaneously start with a third two of the torquing stations (e.g., stations 110E-F).

In one embodiment each of the torquing stations can continue in step "e" until the individual torquing station reaches a desired rotation of the respective bolt being broken out. In one embodiment the desired turn can be based on a number of strokes of the high torque system.

In one embodiment during the high torque mode the drive socket is not moved vertically upward. In this embodiment vertical movement of the drive head is taken up by a vertical angular turning of the torque wrench body. In one embodiment this differential vertical angular turning of the torque wrench body is relieved when the bolt leaves the threads of the lower flange, and is located in the gap between the upper and lower flanges, and is being raised by the lifting fork. In one embodiment the arms of the lifting fork are about set distance below the tip of the drive socket. In one embodiment the set distance is ¼, ⅜, ½, ⅝, ¾, ⅞, 1, 1¼, 1⅜, 1½, 1⅝, 1¾, 1⅞, 2 inches. In various embodiments the set distance can be within a range of between any two of the above specified distances.

In one embodiment the high torque mode is switched to low torque mode after a specified lower back pressure is achieved on the high torque system. In one embodiment a check can be made on the low torque high speed to see if it stalls when breaking out the bolt. In one embodiment the stalling condition is determined based on reaching a specified back pressure for the motor. In one embodiment the stalling condition is determined upon falling below a specified flow rate through the motor.

In one embodiment the switch from high torque to low torque modes for each of the modules are done simultaneously.

In one embodiment the rate of vertical movement of each drive socket head remains constant during vertical lifting of the drive sockets during break out. In one embodiment the rotational speed of the drive socket head remains constant during vertical lifting.

In one embodiment at a set vertical height the lifting fork is extended. In one embodiment full extension of the lifting fork is determined by a timing sequence using the lifting fork hydraulic cylinder(s), such as extension hydraulic pressure for a set period of time which can be ½, ¾, 1, 1½, 2, 3, 4, and 5 seconds. In various embodiments the set period of time can be within a range of between any two of the above set periods of time.

In one embodiment the lifting fork remains extended until the drive socket head reaches a second vertical height at which height the lifting fork is retracted. In one embodiment full retraction of the lifting fork is determined by a timing sequence using the lifting fork hydraulic cylinder(s), such as by retraction hydraulic pressure for a set period of time which can be ½, ¾, 1, 1½, 2, 3, 4, and 5 seconds. In various embodiments the set period of time can be within a range of between any two of the above set periods of time.

In one embodiment rotation of the drive socket is stopped simultaneously with the start of retraction of the lifting fork.

In one embodiment after start of retraction of the lifting fork, the drive socket is sent to a home position for retracted vertical and retracted horizontal positioning.

In one embodiment the retracted vertical mode is achieved before the start of retraction in a horizontal mode. In one embodiment the drive socket is not spun either in high speed or in high torque during retraction. In one embodiment retraction vertically is checked by a vertical height sensor. In one embodiment retraction horizontally is by a pre-set time period. The horizontal radially retracted home position can be checked by a timing sequence using the body slide cylinders, such as retraction hydraulic pressure for a set period of time which can be 1, 2, 3, 4, 5, 6, 7, 8, 9, and 10 seconds of retraction pressure. In various embodiments the set period of time can be within a range of between any two of the above set periods of time. Fully retracted positions can be controlled by fully retracted body slide cylinders, or by a retraction catch, or a combination of the two. In one embodiment there can be an adjustable body retraction stop for each body module in the retraction step.

In one embodiment the rate of vertical speed of the drive socket head of each torquing station changes with the rotational speed of the drive socket. In one embodiment the rate of vertical speed of the drive socket is synchronized with the rotational speed of the drive socket.

In one embodiment the during step "i" the plurality of torquing stations move from extended positions to radially retracted positions. In one embodiment the plurality of torquing stations in step "i" move from lower positions to upper positions. In one embodiment the move from lower to upper positions occurs before the move from radially extended to radially retracted positions. In one embodiment, after raising a specified vertical height both radial retraction and raising of the drive socket can occur at each torquing stations. In one embodiment the set height is based on adequately clearing the station's respective head of its broken out bolt.

In one embodiment during steps "j" and "k" the broken out riser flange is removed, and the riser is raised until a new flange is revealed to be broken out. In one embodiment the above specified steps are repeated for newly revealed flange connection.

In one embodiment the above specified steps are repeated until the length of riser has been removed.

In one embodiment during step "k" the riser string can be supported by the draw works of the rig or the top drive of the rig.

In one embodiment steps "a" through "1" are repeated until the entire riser is retrieved.

General Operation

Multiple Bolts Simultaneously

In one embodiment the method includes simultaneously tightening (making up) or loosening (breaking out) a plurality of bolts.

In one embodiment a plurality of at least 3, 4, 5, and/or 6 bolts are simultaneously tightened or loosened.

In one embodiment is provided a plurality of independently operated torque drivers. In one embodiment a plurality of at least 3, 4, 5, or 6 torque drivers are provided.

In one embodiment the plurality of bolts are in a bolt circle. In one embodiment the plurality of bolts are symmetrically and radially spaced apart by about 60 degrees each.

In one embodiment the plurality of bolts will or have connected two riser sections or joints of a riser string.

In one embodiment a plurality of drivers are provided each individually positionable both generally laterally and/or vertically.

In one embodiment a plurality of at least 3, 4, 5, and/or 6 drivers are positionable together to tighten (make up) or loosen (break out) respective bolts.

Method Steps at Individual Torque Stations

In one embodiment the method includes the driver moving vertically upward or downward when the bolt is being loosened or tightened.

In one embodiment a visual check is made of the existence and/or position of each bolt to be tightened (make up) or loosened (break out). If the visual check is satisfied the making up or breaking out sequences can begin.

Tightening (or Making Up)

In one embodiment a second section of riser is positioned next to a first section of riser, the second section of riser including a plurality of bolts.

In one embodiment a plurality of drivers are moved horizontally closer to a respective plurality of bolts to be tightened (made up).

In one embodiment a plurality of drivers are moved vertically closer to the respective plurality of bolts to be tightened (made up).

In one embodiment a plurality of drivers are turned to tighten the respective plurality of bolts to be tightened (made up).

In one embodiment a plurality of high speed/low torque systems control the turning of the respective plurality of bolts to be tightened. In one embodiment control can be switched between high and low torque systems as many times as needed or desired.

In one embodiment a plurality of low speed/high torque systems can transition to control over the turning of the respective plurality of bolts to be tightened. In one embodiment control can be switched between high and low torque systems as many times as needed or desired.

In one embodiment a plurality of drivers are moved vertically downward with the respective plurality of bolts to be tightened (made up) as the bolts move downward.

In one embodiment a plurality of drivers are moved vertically downward at a different vertical speeds with the respective plurality of bolts to be tightened (made up) as the bolts move downward.

In one embodiment each driver can be independently controlled in both controlling driver (high or low speed), and speed of vertical movement.

In one embodiment the first and second sections of risers are lowered and a third riser joint or section is positioned next to the second riser joint or section, and the third riser joint or section including a plurality of bolts to be made up.

In one embodiment the above tightening steps are repeated until a riser string spans from adjacent the sea floor (e.g., wellhead or blow out preventers) to the rig or platform.

In one embodiment the method includes the step of allowing a bolt to drop a distance while the bolt head is still retained in the driver. In one embodiment multiple bolts are allowed to drop a distance.

In one embodiment, after each of the plurality of bolts have been spun down so that shoulder to shoulder contact exists, each torque station simultaneously begins the final high torque makeup of their respective bolts. Simultaneously performing the final high torque make-up is believed to provide a more uniform make up connection between the riser sections or joints (e.g., keeping the flanges of the riser joints or section more parallel).

In one embodiment, at each torque station, the tightening cycle for each bolt is stopped after a desired torque on the bolt is reached (e.g., the high torque driver system stalls based on supply pressure), and the driving system is removed from the bolt.

In one embodiment the method includes the driver moving vertically downward when the bolt is being tightened.

In one embodiment, the retraction and disengagement of the driving system at each torque station includes the step of raising the driver so that it can at least clear the bolt head and moving away the driver radially from the bolt.

In one embodiment the vertical height of the system is limited to prevent the system from damaging the floatation/insulation found on each riser section or joint.

Loosening (or Breaking Out)

In one embodiment a plurality of drivers are moved horizontally closer to a respective plurality of bolts to be loosened (broken out) from second and first sections of riser.

In one embodiment a plurality of drivers are moved vertically closer to the respective plurality of bolts to be loosened (broken out).

In one embodiment a plurality of drivers are turned to loosen the respective plurality of bolts to be loosened (broken out).

In one embodiment a plurality of high speed/low torque systems control the turning of the respective plurality of bolts to be loosened. In one embodiment control can be switched between high and low torque systems as many times as needed or desired.

In one embodiment a plurality of low speed/high torque systems can transition to control over the turning of the respective plurality of bolts to be loosened. In one embodiment control can be switched between high and low torque systems as many times as needed or desired.

In one embodiment a plurality of drivers are moved vertically upward with the respective plurality of bolts to be loosened (broken out) as the bolts move upward.

In one embodiment a plurality of drivers are moved vertically upward at a different vertical speeds with the respective plurality of bolts to be loosened (broken) as the bolts move upward.

In one embodiment each driver can be independently controlled in both controlling driver (high or low speed), and speed of vertical movement.

In one embodiment the method includes the step of using a fork to lift a bolt to a vertical distance while the bolt head is still retained in the driver.

In one embodiment the driving cycle of each bolt is stopped after a desired height of the bolt is reached (e.g., the head of the bolt reaches a specified storage height), and the driving system is disengaged from the bolt.

In one embodiment the first riser section or joint is retrieved, and the remaining riser string is raised to reveal another riser section or joint to be retrieved, along with another plurality of bolts to be loosened.

In one embodiment the above retrieval steps are repeated until each riser section or joint in the riser string is retrieved.

In one embodiment the removal of the driving system includes the step of raising the driver so that it can at least clear the bolt head and moving away the drive radially from the bolt.

In one embodiment the method includes the driver moving vertically upward when the bolt is being loosened.

In one embodiment, at each torque station, the loosening cycle for each bolt is stopped after a desired height for the bolt is reached (e.g., a specified storage height for the bolt), and the driving system is disengaged and retracted from the bolt for the next loosening cycle.

In one embodiment, the retraction and disengagement of the driving system at each torque station includes the step of raising the driver so that it can at least clear the bolt head and move away the driver radially from the bolt.

In one embodiment the vertical height of the system is limited to prevent the system from damaging the floatation/insulation found on each riser section or joint.

Type of Control

In one embodiment a plurality of torque drivers are robotically controlled. In one embodiment a plurality of at least 3, 4, 5, and/or torque drivers are controlled. In one embodiment the control is simultaneous.

In one embodiment a plurality of torque drivers are computer controlled. In one embodiment a plurality of at least 3, 4, 5, and/or torque drivers are controlled. In one embodiment the control is simultaneous.

In one embodiment a plurality of torque drivers are automatically controlled. In one embodiment a plurality of at least 3, 4, 5, and/or torque drivers are controlled. In one embodiment the control is simultaneous.

In one embodiment a plurality of torque drivers are remotely controlled. In one embodiment a plurality of at least 3, 4, 5, and/or torque drivers are controlled. In one embodiment the control is simultaneous.

Items which are Controlled

Position of Driver

In one embodiment the control includes controlling the position of the driver. In one embodiment each of the plurality of torque drivers are positionable laterally (or radially towards or away from its respective bolt) and/or vertically (toward or away from its respective bolt).

In one embodiment each torque driver has a controlled vertical downward motion when tightening (making) up bolt. In one embodiment the controlled vertical motion of the driver is performed by a lifting and lower mechanism.

In one embodiment the lifting and lowering mechanism approximates the vertical movement of the bolt being tightened or loosened. In one embodiment each torque driver can move vertically substantially same as bolt which is engaged by the torque driver.

In one embodiment the vertical distance moved by the bolt is approximated by calculating the number of turns of the bolt and the pitch of the threads for the bolt. In this manner the vertical movement can be calculated by multiplying the number of turns of the bolt by the pitch. In one embodiment, at each torque station, the vertical speed of the driver is slightly greater than the vertical speed of the bolt being tightened, and motor controlling vertical movement of the driver stalls when it overshoots the vertical distance traveled by the bolt, and restarts when the bolt again moves ahead of the driver. In this manner the driver can be continuously maintained on the head of the bolt during tightening.

In one embodiment, at each torque station, the vertical speed of the driver is slightly lower than the vertical speed of the bolt being lowered, and motor controlling vertical movement of the driver can be speeded up when the bolt overshoots the vertical distance traveled by the driver. In this manner the driver can be continuously maintained on the head of the bolt during loosening.

In one embodiment the driver is slidingly connected to rig floor such that it can move in a substantially horizontal direction. In one embodiment a track system is used to guide movement of the driver. In one embodiment a linear bear or rod and bushing system is used.

Rotational Speed and Torque on Driver

In one embodiment at each torque station is provided torque drivers with both a high torque driving system and a low torque driving system. In one embodiment the low torque driving system drives at a faster rotational speed compared to the high torque driving system. In one embodiment both high torque driving system and low torque driving system are operatively connected to same driver for bolt.

In one embodiment the low torque driver system can have a plurality of driving speeds (such as fast, medium, and slow speeds), where the plurality of speeds are faster than the driving speed of the high torque driving system.

In one embodiment the both the high speed/low torque system and low speed high torque system are simultaneously operatively connected to the driver. In this vein when the high speed/low torque assembly is operating the driver, the low speed/high torque system will not inhibit movement of the driver because of a reverse ratcheting effect. Similarly, when the low speed/high torque system controls the driver (e.g., the high speed/low torque motor has stalled or been set to a non-energized state), the high speed/low torque system allows operation of the low speed/high torque assembly by turning along with the driver being turned by the low speed/high torque assembly.

In one embodiment each wrench includes a high speed/low torque motor controlling the high speed/low torque phase.

In one embodiment the rotational speed of the high speed/low torque driver is about 100 revolutions per minute. In one embodiment the high speed driver can have a programmable lower speeds such as 5 or 10 percent of the max speed.

In one embodiment each wrench includes a low speed/high speed torque wrench controlling the low speed/high torque phase.

In one embodiment one or more of the wrenches include mechanisms for automatically switching between the high speed/low torque phases and the low speed/high torque phases based on the individual torque requirements of the plurality of bolts being tightened or loosened.

Both Systems Energized Simultaneously

In one embodiment, both the high speed/low torque system can be energized simultaneously with the low speed/high torque system (because neither driving system in a non-operating state, or in a reduced operating state, will not interfere with the other driving assembly in the operating state).

In this embodiment switchover between the two systems depends on which system is controlling rotation of the bolt at any given instant.

In one embodiment both high and low torque drivers continue for substantially all of the processes when tightening (making up) or loosening (breaking out) a plurality of bolts.

Switchover by Height

In one embodiment transition between the high torque driver and low torque driver occurs when height of driver reaches a predetermined position.

In one embodiment both high and low torque drivers continue for predetermined amounts of process for (making up) or loosening (breaking out) a plurality of bolts.

In one embodiment the predetermined amount for continuance of high with low is one predetermined amount and the predetermined amount for continuance of low with high is a second predetermined amount.

Switchover by Pressure

In one embodiment the back pressure of the high speed/low torque motor can be sensed to determine a switchover point to the low speed/high torque system. This is a switchover can be made when the high speed/low torque motor is determined to be in a stalled condition.

In one embodiment the back pressure of the low speed/high torque assembly can be sensed to determine a switchover point to the high speed/low torque system. This is a switchover can be made when the back pressure in the low speed/high torque system is determined to be below a specified minimum pressure. In one embodiment the high speed low torque system can be energized/pressurized (but in a stalled condition) even when the low speed/high torque system is controlling the driver, but the low speed/high torque system is set to non-energized condition when it is determined that the high speed/low torque motor is no longer in a stalled condition (e.g., the back pressure from the high speed/low torque motor drops below a specified stalled pressure).

In one embodiment the stalling of the high speed/low torque motor in a particular wrench of the plurality of wrenches causes a transition to the low speed/high torque phase for such particular wrench.

In one embodiment falling below a specified resistance torque on the low speed/high torque wrench causes a transition to the high speed/low torque phase.

Structure of Wrenches

In one embodiment, at each torque station, the torque driver can comprise:
- a body having a high torque wrench assembly, the high torque assembly being operatively connected to a main driver;
- a high torque wrench assembly, the high torque assembly being operatively connected to the main driver and rotating the main driver; and
- the driver being adjustable both in lateral and vertical directions, the lateral direction being substantially perpendicular to the vertical direction.

In one embodiment each torque driver includes a low torque assembly, the low torque assembly being operatively connected to the main driver and rotating the main driver, wherein the maximum torque of the low torque assembly is less than the maximum torque of the high torque assembly and the speed of the low torque assembly is greater than the speed of the high torque assembly.

One Way/Two Way Torque Wrench

In one embodiment a plurality of one way high torque wrench drivers are used.

In one embodiment to switch from tightening for (making up) or loosening (breaking out) body of toque wrench can be flipped.

In one embodiment a plurality of two way torque wrenches are used to avoid the necessity of turning the plurality of torque wrench bodies between loosening and tightening modes.

Fork Lift for Lifting Bolt During Loosening (or Breakout)

In one embodiment a bolt lifting mechanism is operatively connected to each driver.

In one embodiment the bolt lifting mechanism is slidingly connected to body of torque wrench.

In one embodiment the bolt lifting mechanism is controlled through a piston, or through a plurality of pistons.

In one embodiment the bolt lifting mechanism vertically travels with body of torque wrench.

In one embodiment the bolt lifting mechanism is a fork

Final Torque

In one embodiment a check is made regarding the final torque on each bolt (e.g., 32A-F) during the tightening process. Such final torque can be calculated based on the back pressure (e.g., the stalling or back pressure of the hydraulic piston 740) during the high torque phase. In one embodiment a check is made against a minimum torque (such as by a calculation of the torque from the stalling or back pressure) and if the minimum torque is not achieved on one or more of the pistons 740A-F and cylinders 700A-F a warning signal is made. In one embodiment a record is kept of the torquing on each bolt during the make up (and/or break out procedure) for a substantial portion (or the entire riser).

In one embodiment a maximum of 40,000 foot pounds of torque can be obtained. In one embodiment the final torque of the driver is about 18,000 foot pounds.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 3 through 10 show various sequence steps in a make up process for one of the torque stations.

FIG. 3 is a top view showing one embodiment of the torque wrench system during make up with all six of the torque stations (110A-F) in horizontally retracted states (and station 110A in a partially broken out view).

FIG. 4 is a top view showing one embodiment of the torque wrench system during make up with all six of the torque stations (110A-F) in horizontally extended states (and station 110A in a partially broken out view).

FIG. 5A is a schematic side view one of the torque stations ready for the beginning of a make up or break out sequence as the driver socket is completely retracted horizontally and moved to its highest vertical position which will clear a bolt previously placed in a storage condition for a riser joint along with being below the lowest point of the insulation or floatation for the upper riser section or joint.

FIG. 5B is a top view of the torque station of FIG. 5A shown in partially broken out view.

FIG. 6A is a schematic side view the torque station of FIG. 5 where the driver socket has moved horizontally over a bolt and is rotating for tightening, the driver socket is also moving downwardly, and is about to engage the bolt head. FIG. 6B is a top view of the torque station of FIG. 6A shown in partially broken out view.

FIG. 7A is a schematic side view of the torque station of FIG. 5 where driver socket has engaged the bolt and begun to spin down the bolt through the upper flange and into the gap. FIG. 7B is a top view of the torque station of FIG. 7A shown in partially broken out view.

FIG. 8A is a schematic side view of the torque station of FIG. 5 after the driver socket has spun down the bolt, and the bolt is now allowed a free fall through the gap between the flanges, and the head of the bolt has vertically dropped in relation to the drive socket. FIG. 8B is a top view of the torque station of FIG. 8A shown in partially broken out view.

FIG. 9A is a schematic side view of the torque station of FIG. 5 after the driver socket has spun down the bolt, allowed a free fall of the bolt through the gap between the flanges, and spun down the bolt to the lower flange by about two threads in the lower flange. FIG. 9B is a top view of the torque station of FIG. 9A shown in partially broken out view.

FIG. 10A is a schematic side view of the torque station of FIG. 5 after the driver socket has spun down the bolt until shoulder to shoulder contact between the upper flange and the bolt head has occurred, and the torque station to go into a high torque mode where the piston and drive gear controls rotation of the driver. After the desired make up torque is achieved the driver socket will be moved upward and retracted to the position shown in FIG. 5 and be ready for the next make up cycle. FIG. 10B is a top view of the torque station of FIG. 10A shown in partially broken out view.

FIG. 11 is a top view showing one embodiment of the torque wrench system during break out with all six of the torque stations (110A-F) in horizontally retracted states (and station 110A in a partially broken out view).

FIG. 12 is a top view showing one embodiment of the torque wrench system during break out with all six of the torque stations (110A-F) in horizontally extended states (and station 110A in a partially broken out view).

FIG. 13 is a schematic side view one of the torque stations ready for the beginning of a break out sequence as the driver socket is completely retracted horizontally and moved to its highest vertical position which will clear the bolt being broken out along with being below the lowest point of the insulation or floatation for the upper riser section or joint.

FIG. 14 is a schematic side view one of the torque stations moving to a locating position for the drive socket on the bolt head and showing how the drive socket has been radially extended and also moved vertically down before being located above the head of the bolt to be broken out.

FIG. 15 is a schematic side view of the torque station of FIG. 13 illustrating the step of locating the drive socket on the bolt head for break out. Both low torque rotation along with high torque stroking is schematically shown for locating the drive socket on the bolt head prior to the high torque break out step.

FIG. 16 is a schematic side view of the torque station of FIG. 13 where the driver socket is engaged with the bolt, and the bolt has shoulder to shoulder contact with the upper flange, and the driver socket or socket is beginning the breakout process so that the torque station will go into the high torque mode with the drive gear.

FIG. 17 is a schematic side view of the torque station of FIG. 13 where the driver tip or socket has partially broken out the bolt, spun out the bolt to where a free spinning mode has been entered because the threads of the bolt are between the threads in the upper and lower flanges.

FIG. 18 is a schematic side view of the torque station of FIG. 13 where the lifting fork has engaged the freely spinning bolt and begun lifting the bolt so that its threads can engage the threaded portion of the upper flange.

FIG. 19 is a schematic side view of the torque station of FIG. 13 where the lifting fork has lifted the bolt enough to now engage the threaded portion of the upper flange, and the lifting fork can later retract.

FIG. 20 is a schematic side view of the torque station of FIG. 13 where the lifting fork has retracted and the bolt has been additionally spun up compared to its position in FIG. 19, and is now located in the bolt's vertical position for retrieval of the section riser.

FIG. 21 is a schematic side view of the torque station of FIG. 13 where the driver socket has stopped rotating and has been vertically raised above the head of the bolt.

FIG. 37 is a perspective view of a drive socket which can be operatively connected to the high speed low torque driver along with the high torque low speed driver.

FIG. 38 is a top view of the socket of FIG. 37.

FIG. 39 is a bottom view of the socket of FIG. 37.

DETAILED DESCRIPTION

Figure 1:
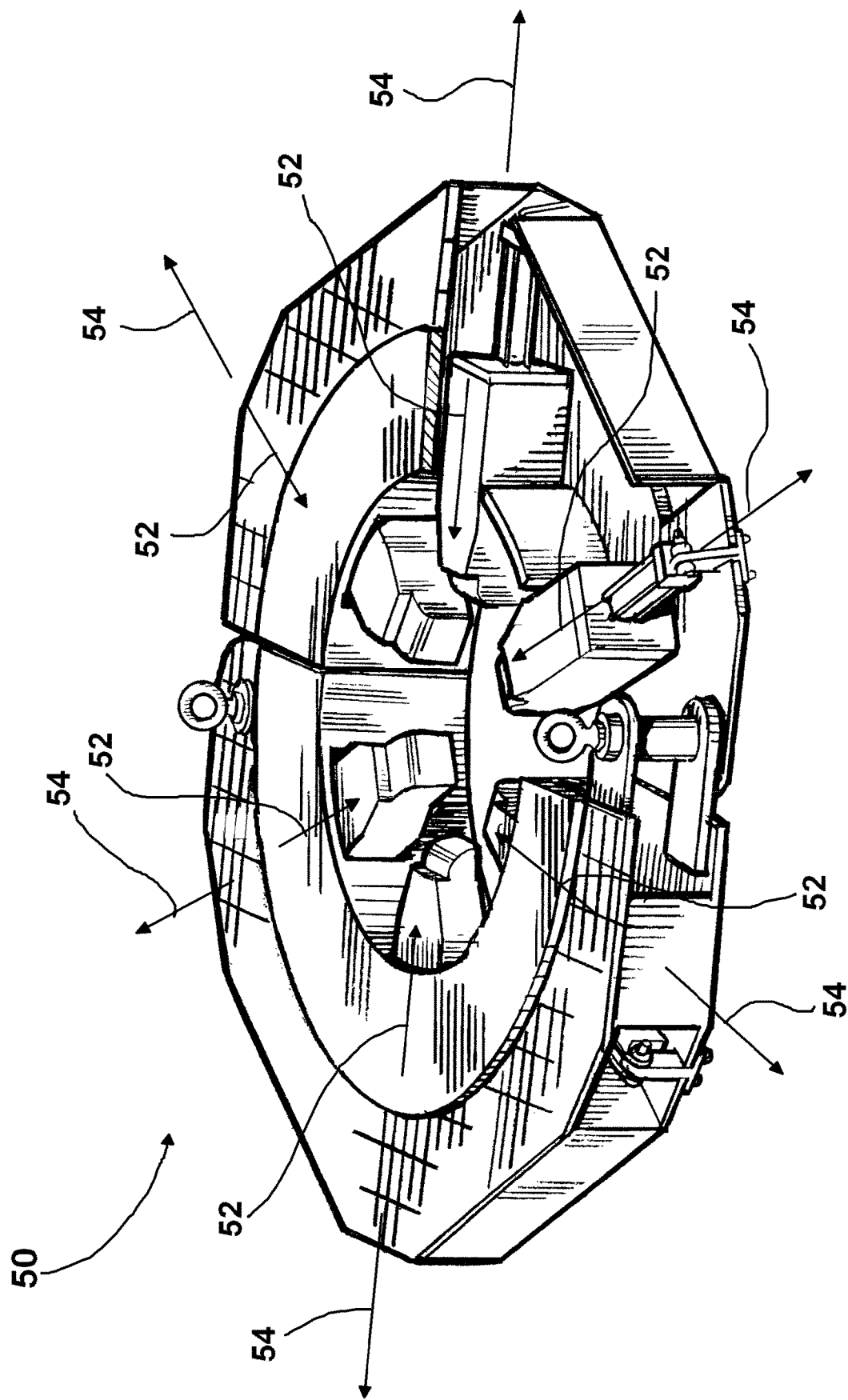
FIG. 1 is a top view of the rig floor with the spider dogs in an extended state supporting the riser string with the upper flange of a riser joint exposed.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

U.S. Pat. Nos. 7,146,880; 6,553,873; and 6,382,059 are incorporated herein by reference.

U.S. patent application Ser. No. 09/525,465, filed Mar. 13, 2000 is incorporated herein by reference.

Plurality of Wrenches

Hydraulic wrench apparatus 100 can comprise a plurality of torque stations each of which can include dual high and low torque wrenches (e.g., 110A, 110B, 110C, 110D, 110E, and 110F) for tightening (making up) or loosening (breaking out) a plurality of bolts.

Each wrench (e.g., 110A, 1101B, 110C, 110D, 110E, and 110F) can be constructed in a substantially similar manner and, therefore, only one wrench 110 will be described below.

As indicated by vertical arrows 64 and 63 and horizontal arrows 60 and 61, each wrench 110 (and driver 1000) can be robotically moved in both vertical and horizontal directions allowing the wrenches to be cycled in and out during successive tightening or loosening activities of bolts in different sections of a riser 40.

Generally, each wrench 110 can include a wrench 400 which is adjustably mounted in a sliding housing 140. Wrench 400 can be adjusted vertically relative to sliding housing 140 as schematically indicated by arrows 64 and 63. Additionally, sliding housing 140 can be adjustably mounted on a base 300. Sliding housing 140 can be adjusted horizontally relative to base 300 as schematically indicated by arrows 60 and 61. In this manner driver tip or socket 1010 of wrench 400 can be both vertically and horizontally adjustable when tightening or loosening a bolt 32.

In a preferred embodiment hydraulic wrench apparatus 100 will include six (6) torque wrenches (e.g., 110A, 110B, 110C, 110D, 110E, and 110F) spaced radially apart in sixty degree increments around the bolt circle of two riser sections.

Structural Components

FIGS. 1 through 47 show one embodiment of wrench 100 having a plurality of torque stations.

FIG. 1 is a top view of the rig floor 20 with the spider dogs in an extended state supporting the riser string 40 with the upper flange 47 of a riser joint 46 exposed.

Figure 2:
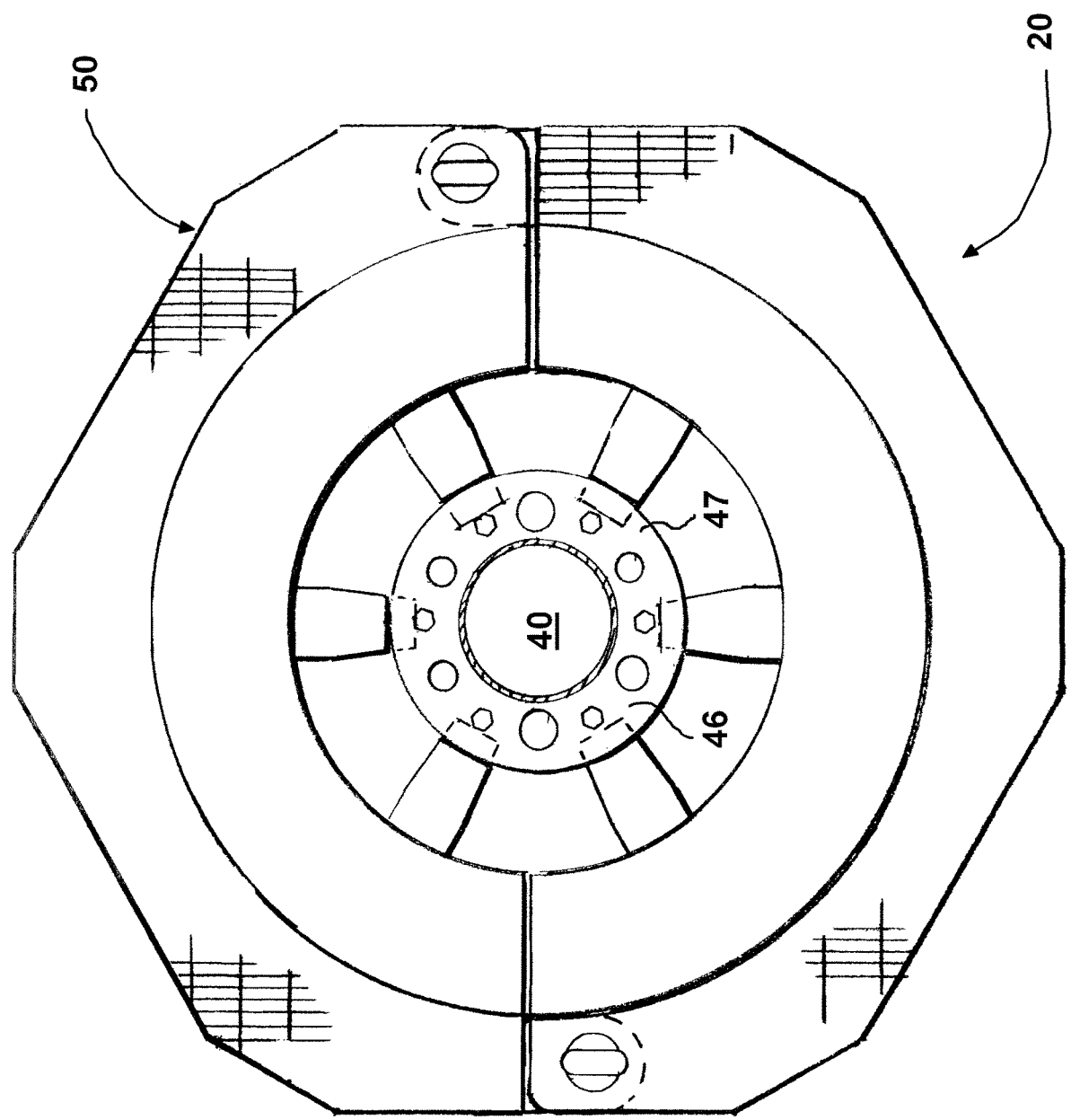
FIG. 2 is a perspective and sectional view of the spider showing the spider dogs in an extended state.

FIG. 2 is a perspective and sectional view of the spider 50 showing the spider dogs in an extended state.

Figure 3:
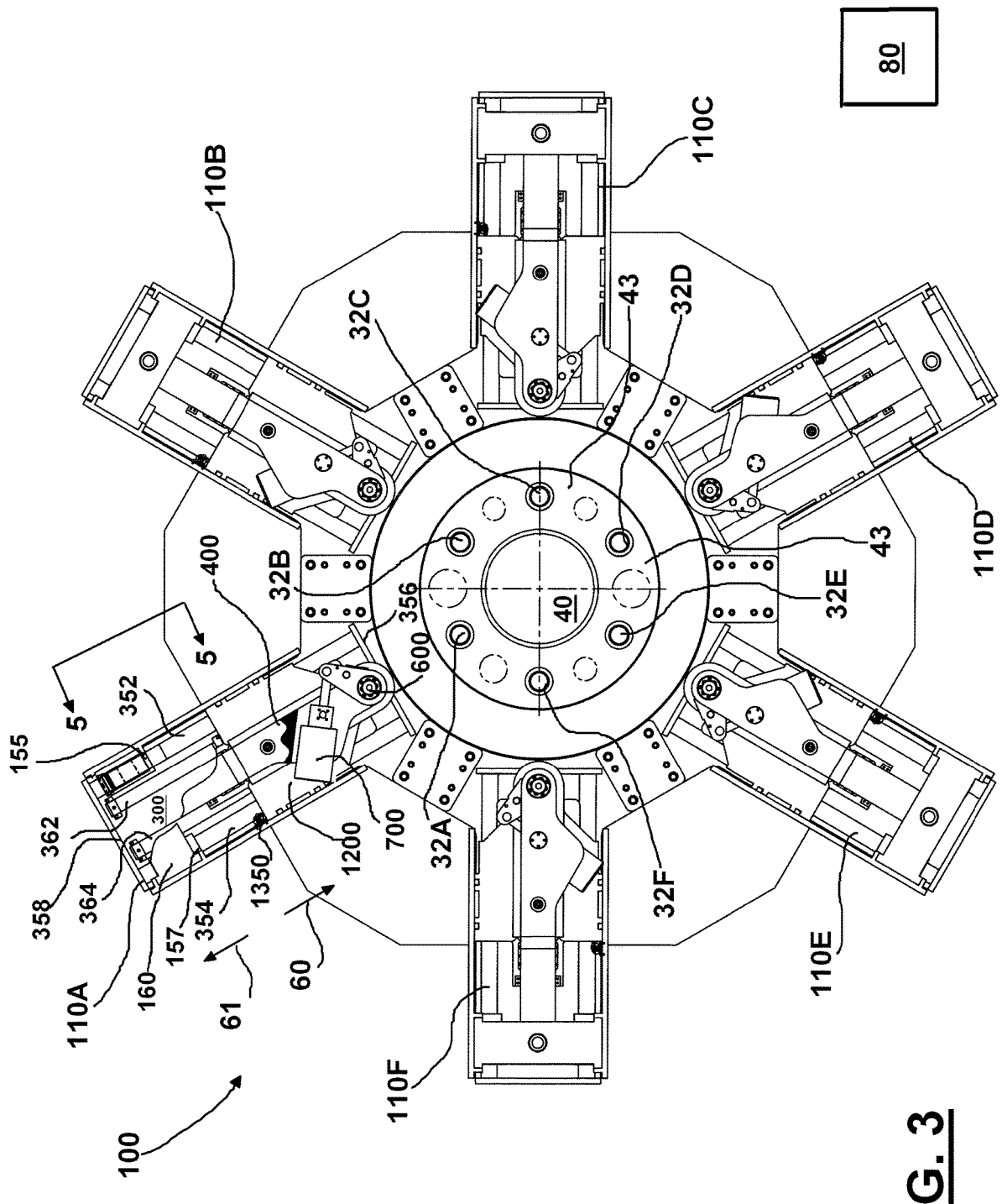
Figure 4:
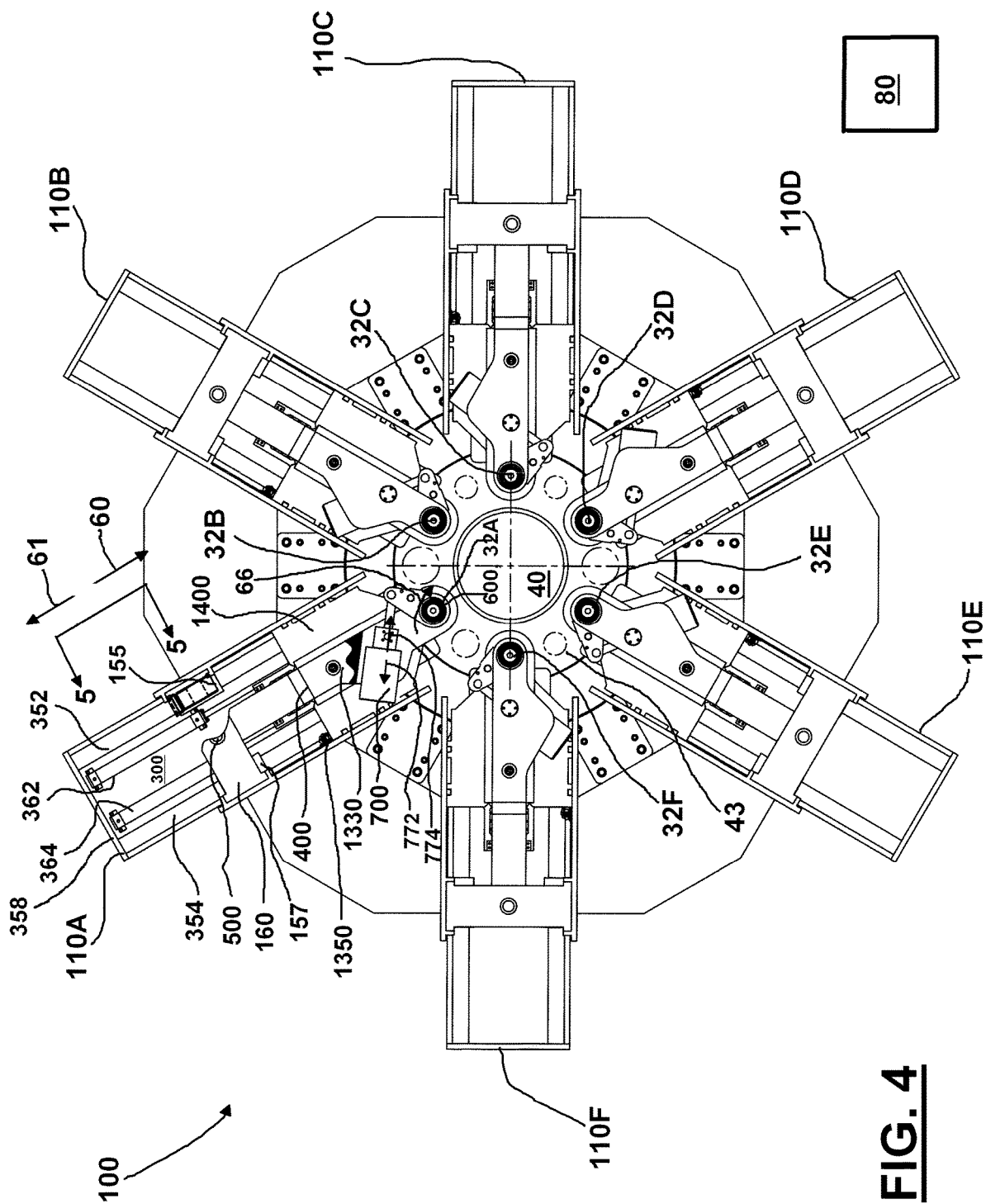

FIGS. 3 and 4 are top views showing one embodiment of the torque wrench system 100 in horizontally retracted and extended states in a make up mode. Preferably, all six stations (110A, 110B, 110C, 110D, 110E and 110F) will simultaneously extend and retract.

FIGS. 5 through 10 show various sequence steps for one of the torque stations 110 during make up. Because all six torque stations (110A, 110B, 110C, 110D, 110E and 110F) are substantially the same and operate similarly, only one representative torque station 110 will be described in detail. However, it should be understood that the detail description of the one applies equally to all six.

Figure 11:
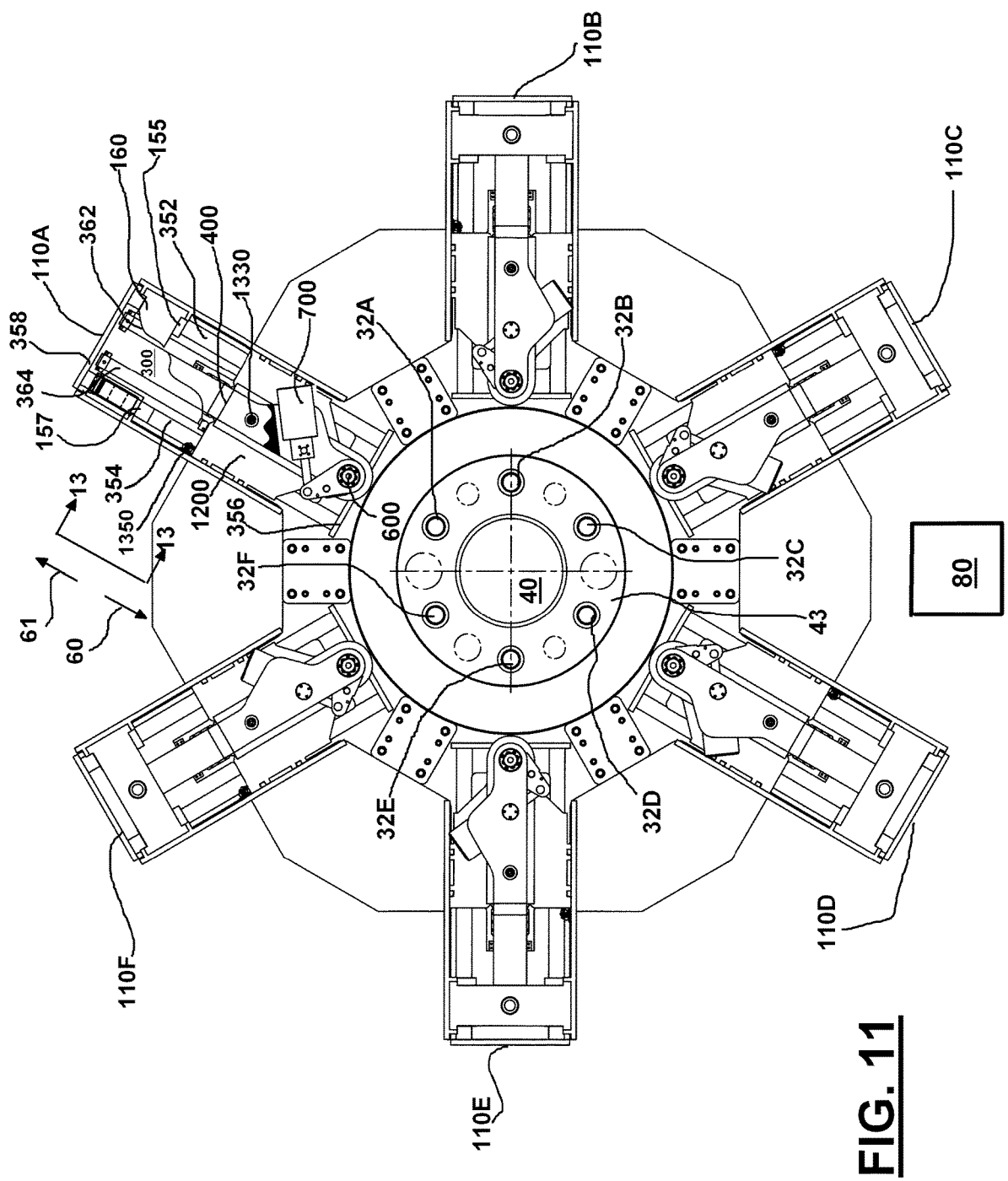
FIGS. 11 through 21 show various sequence steps in a break out process for one of the torque stations.
Figure 12:
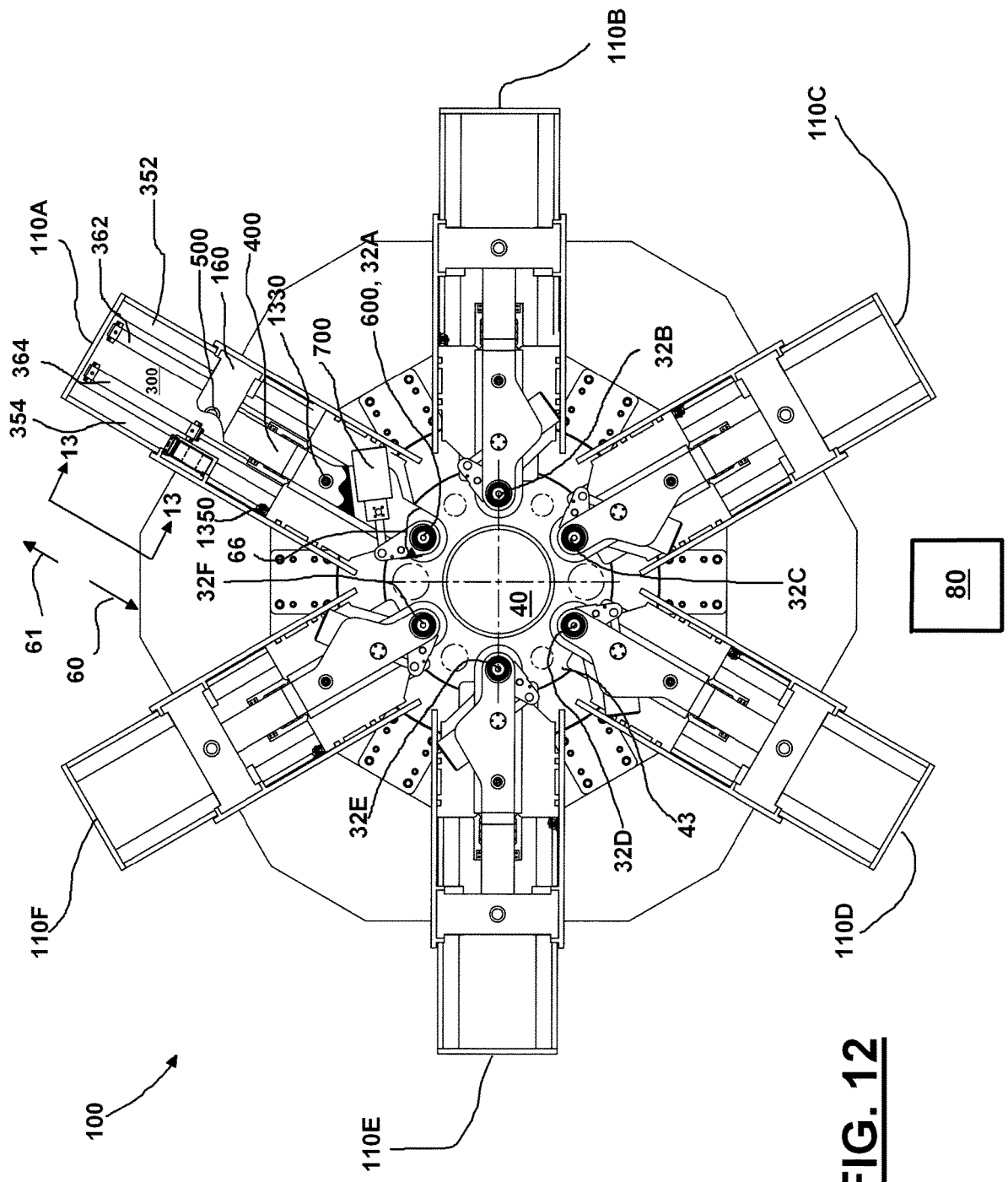

FIGS. 11 and 12 are top views showing one embodiment of the torque wrench system 100 in horizontally retracted and extended states in a break out mode. Preferably, all six stations (110A, 110B, 110C, 110D, 110E and 110F) will simultaneously extend and retract.

FIGS. 13 through 22 show various sequence steps for one of the torque stations 110 during break out. Because all six torque stations (110A, 110B, 110C, 110D, 110E and 110F) are substantially the same and operate similarly, only one representative torque station 110 will be described in detail. However, it should be understood that the detail description of the one applies equally to all six.

FIGS. 23 through 44 are perspectives view of various components of one of the torque stations 110 in multiple positions and performing multiple functions.

Figure 23:
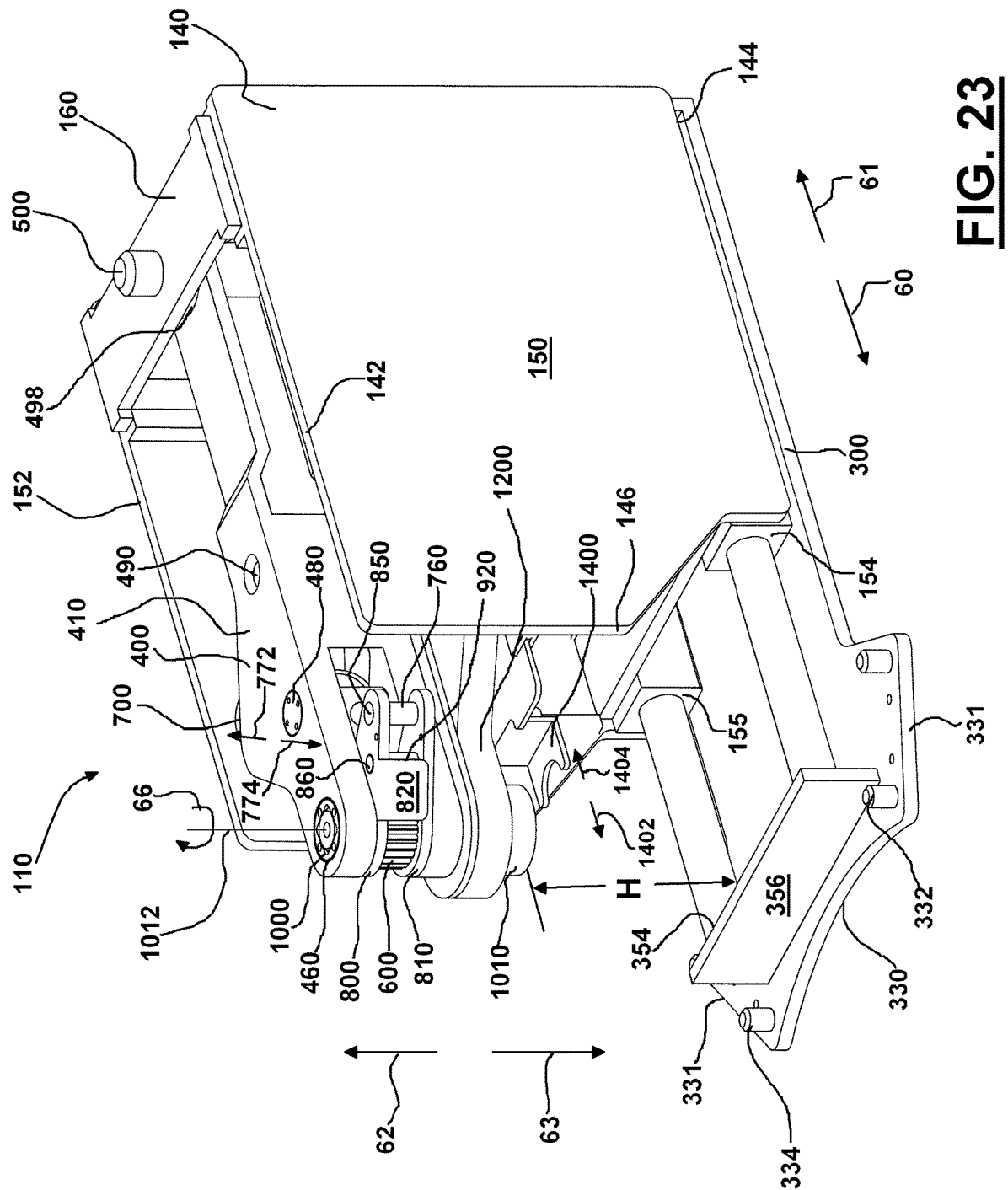
FIG. 23 is a front perspective view of a torque station where the wrench is set for tightening, and shown in a horizontally retracted position with the drive socket in the top most vertical position, and also showing the lifting fork in a retracted position.

FIG. 23 is a front perspective view of a torque station 110 where the wrench 400 is set for tightening, and shown in a horizontally retracted position (direction of arrow 61) with the driver tip 1010 in the top most vertical position (schematically in the direction of arrow 64), and also showing the lifting fork 1400 in a fully retracted position (in the direction of arrow 61).

Figure 24:
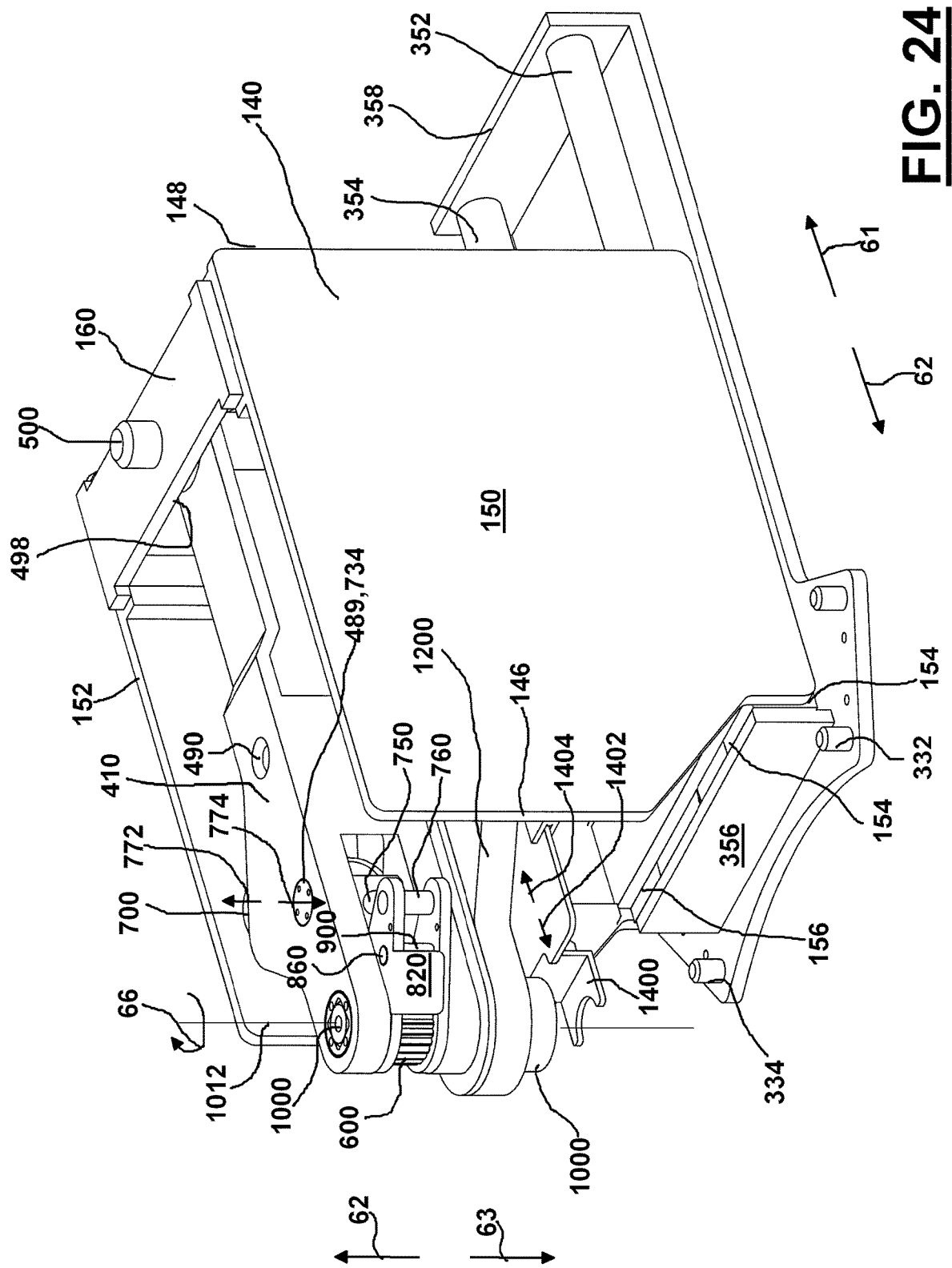
FIG. 24 is a front perspective view of the torque station of FIG. 23 now shown in a horizontally extended position, and the lifting fork is also shown in an extended position.

FIG. 24 is a front perspective view of torque station 110 now shown in a horizontally extended position (direction of arrow 60), and the lifting fork 1400 is also shown in an extended position (direction of arrow 60).

Figure 25:
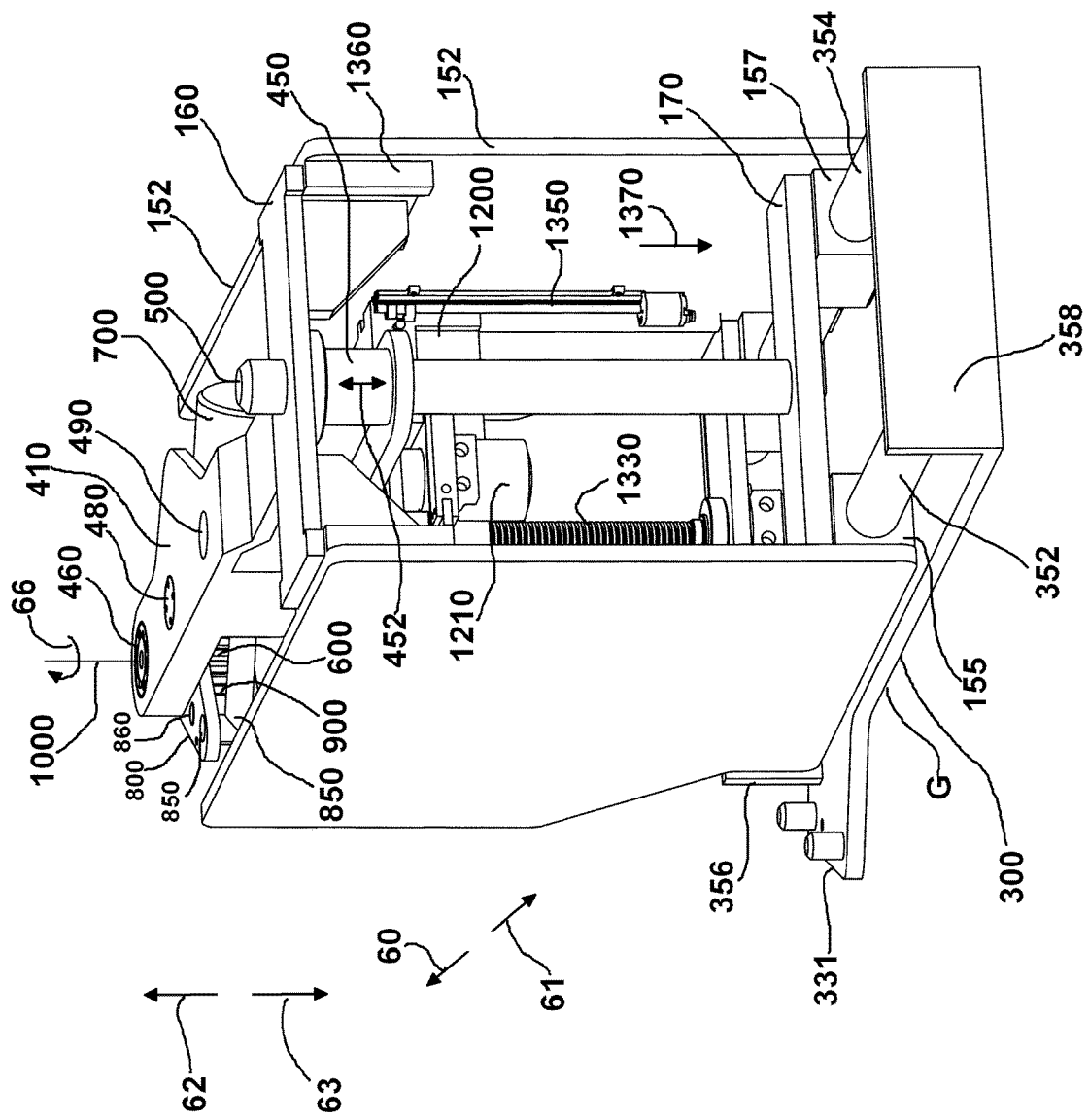
FIG. 25 is a rear perspective view of the torque station of FIG. 23 now shown in a horizontally extended position.

FIG. 25 is a rear perspective view of torque station 110 now shown in a horizontally extended position (direction of arrow 60).

Figure 26:
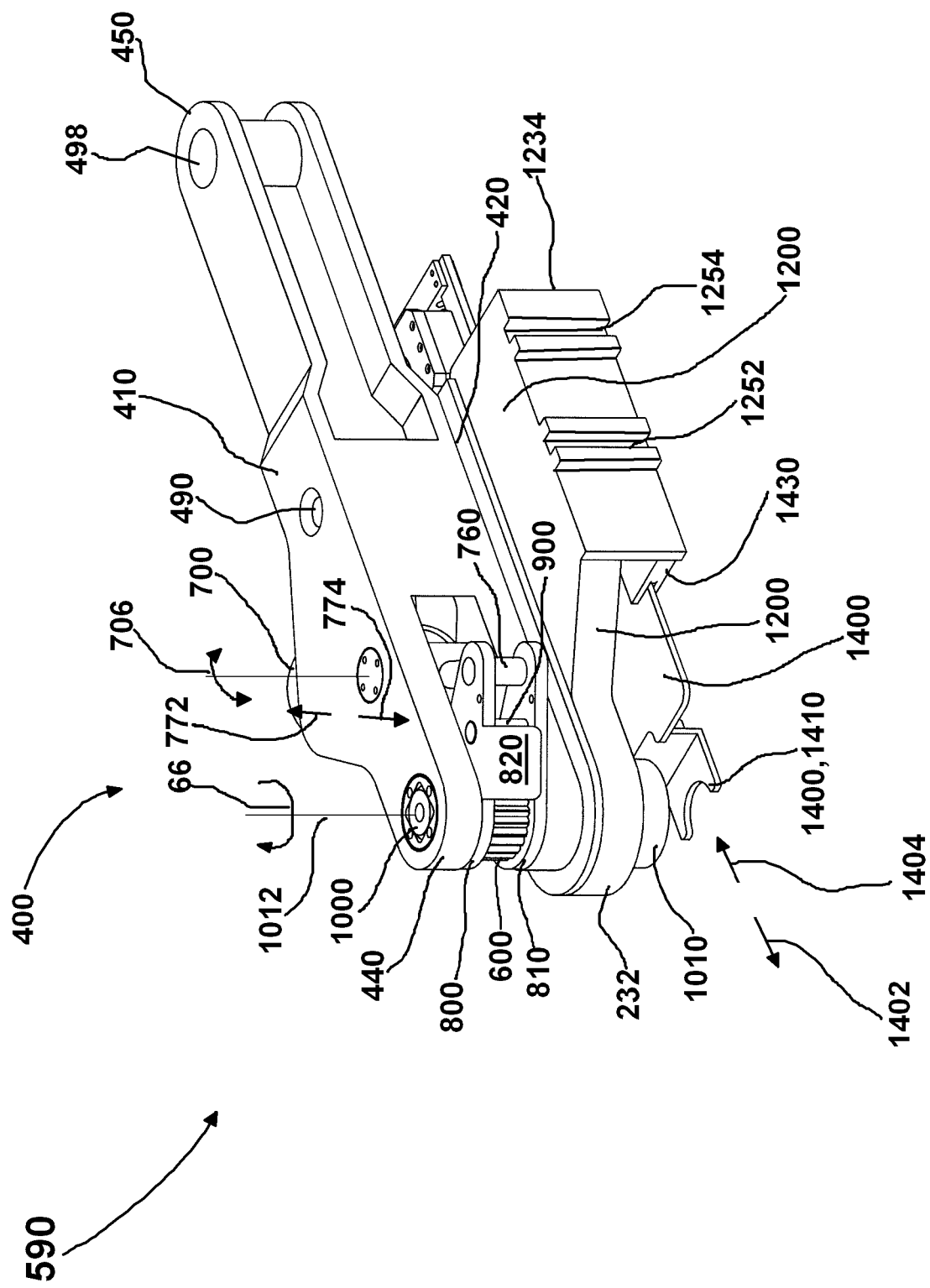
FIG. 26 is a side perspective view of the wrench and elevator portion of the torque station of FIG. 23 where the wrench is set for tightening, and the lifting fork is shown in an extended position.

FIG. 26 is a side perspective view of the wrench portion 400 of torque station 110 where the wrench 400 is set for tightening, and the lifting fork is shown in an extended position (arrow 1402).

Figure 27:
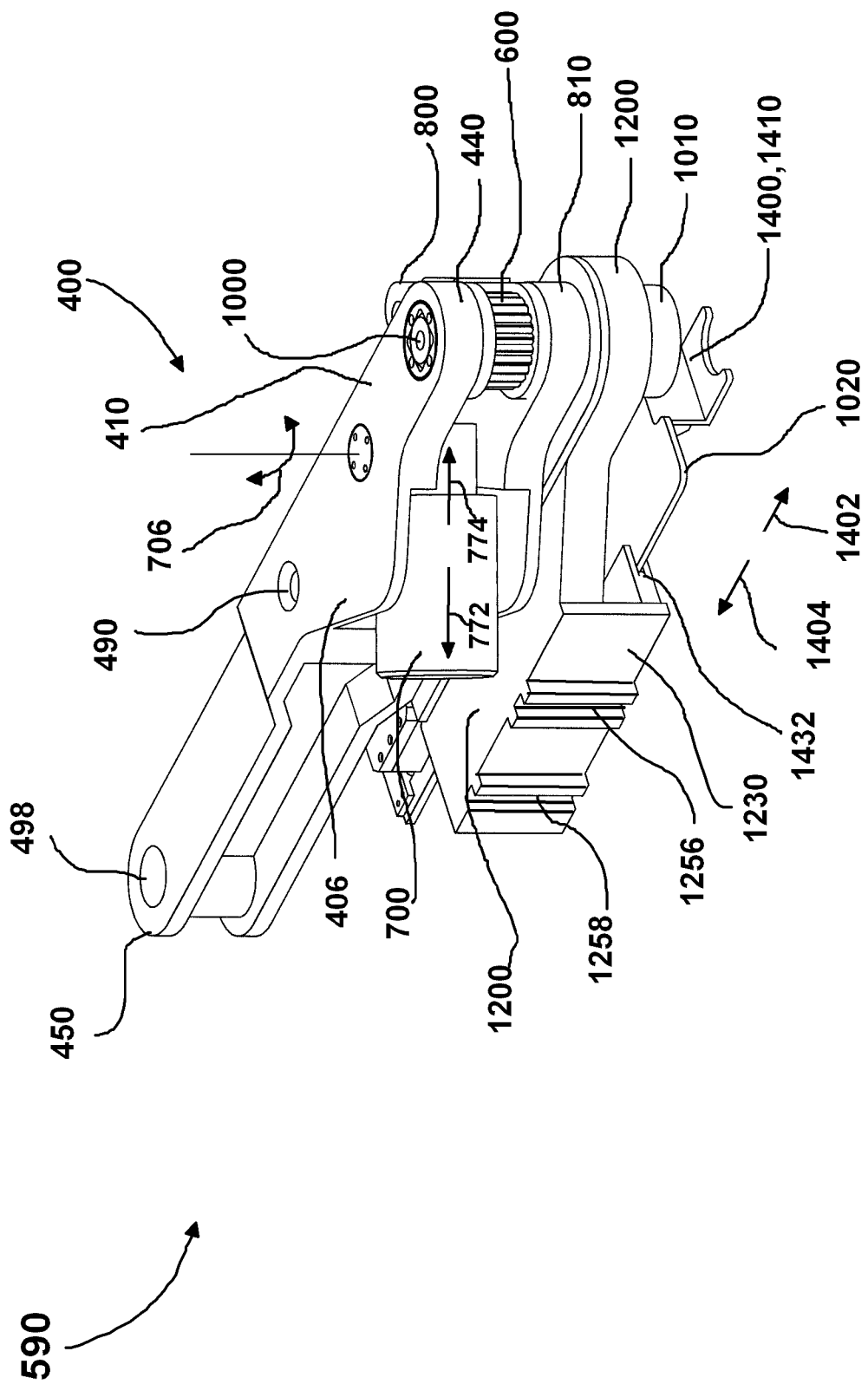
FIG. 27 is a side perspective view of the wrench and elevator portion of FIG. 26 but shown from the opposite side.

FIG. 27 is a side perspective view of the wrench portion 400 but shown from the opposite side.

Figure 28:
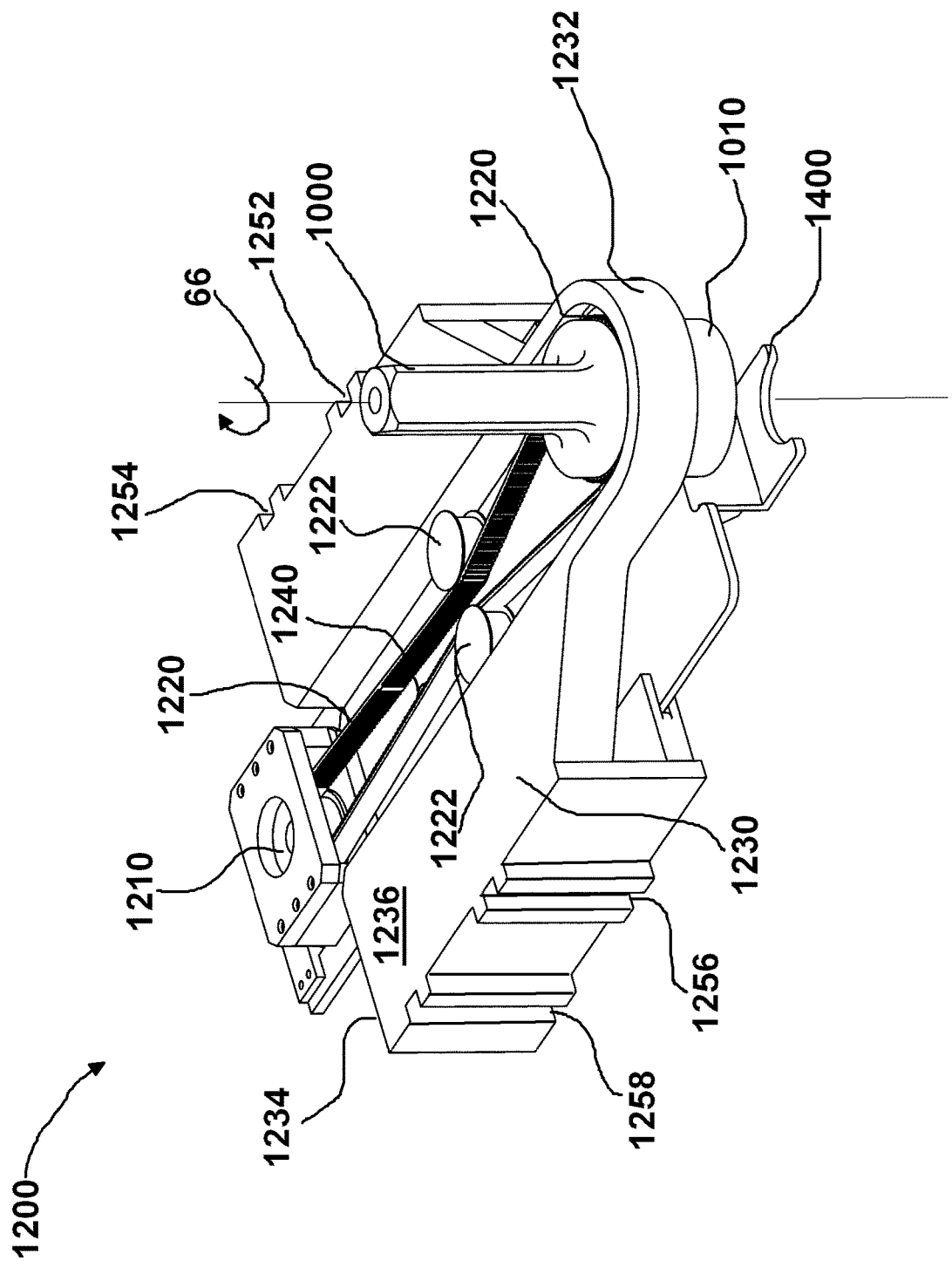
FIG. 28 is a top perspective view of the elevator portion shown in FIG. 26.
Figure 29:
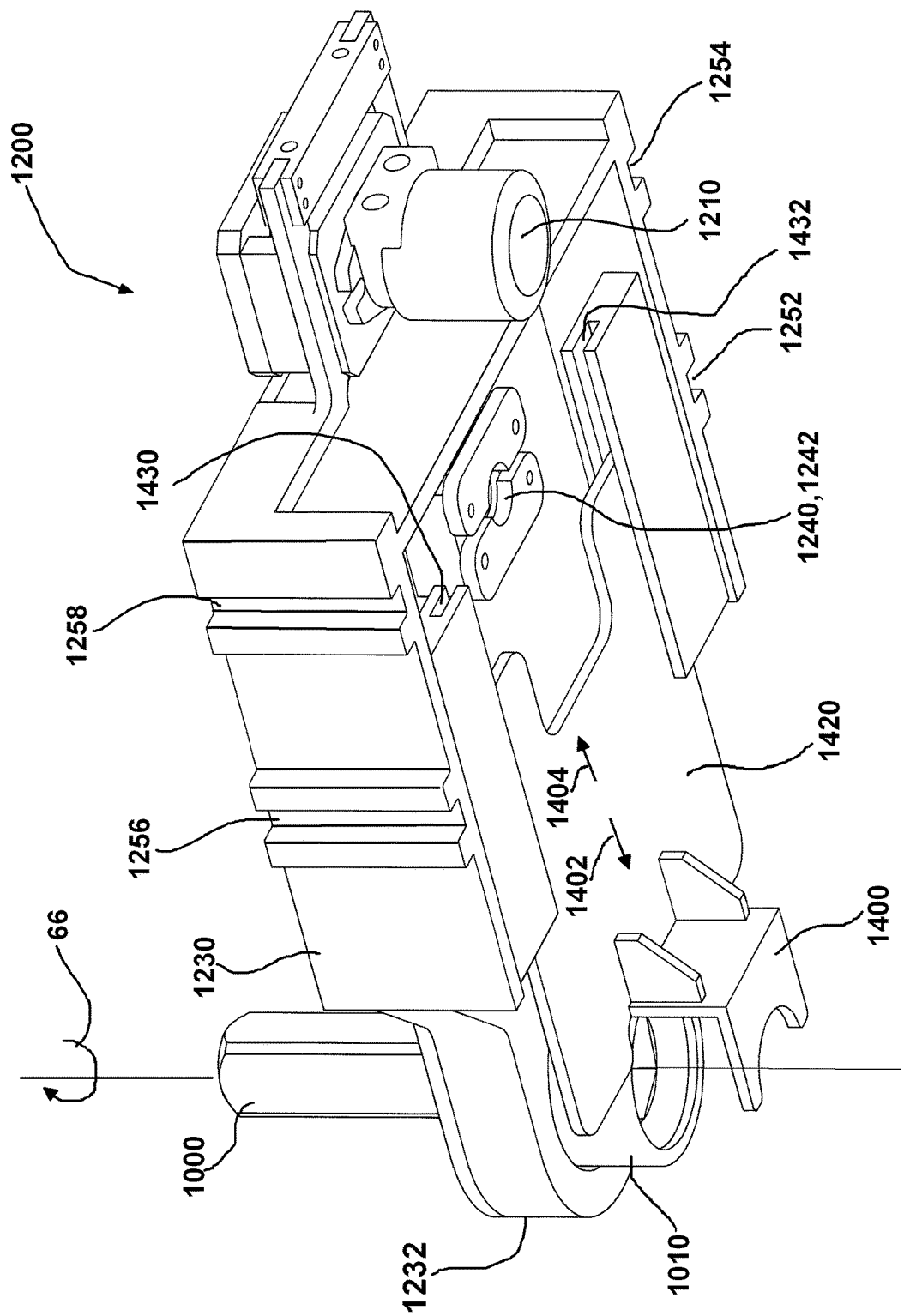
FIG. 29 is a bottom perspective view of the elevator portion shown in FIG. 26 however with the lifting fork cylinders omitted for clarity.

FIG. 28 is a top perspective view of the high speed/low torque driver 1200 of wrench 400, and shown operatively connected to driver 1000 by means of belt 1220. Idler pulleys 1222 can maintain proper tension of belt 1220. FIG. 29 is a bottom perspective view of high speed/low torque driver 1200 showing motor 1210 which is operatively connected to driver 1000 through belt 1220. Although not shown one or more hydraulic cylinders and pistons can be operatively connected to fork 1400 to extend it (arrow 1402) or retract it (arrow 1404). Tracks 1252, 1254, 1256, and 1258 of housing 1230 slidably connected to tracks 192, 194, 196, and 198 of sliding housing 140 allowing housing 1230 to vertically slide (arrows 64 and 63) relative to sliding housing 140 (see FIGS. 23-25).

Figure 30:
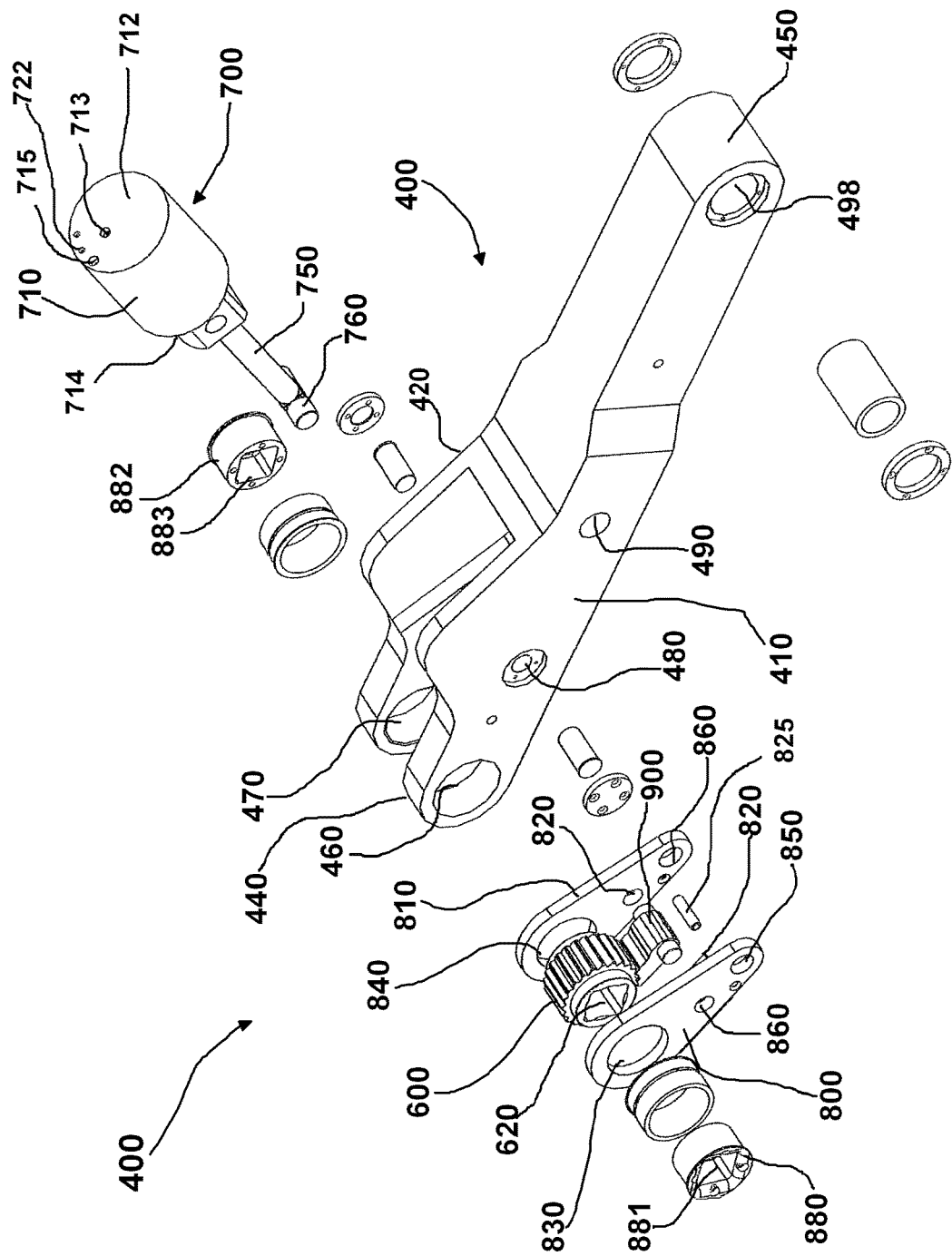
FIG. 30 is an exploded perspective view of the high torque wrench portion.
Figure 31:
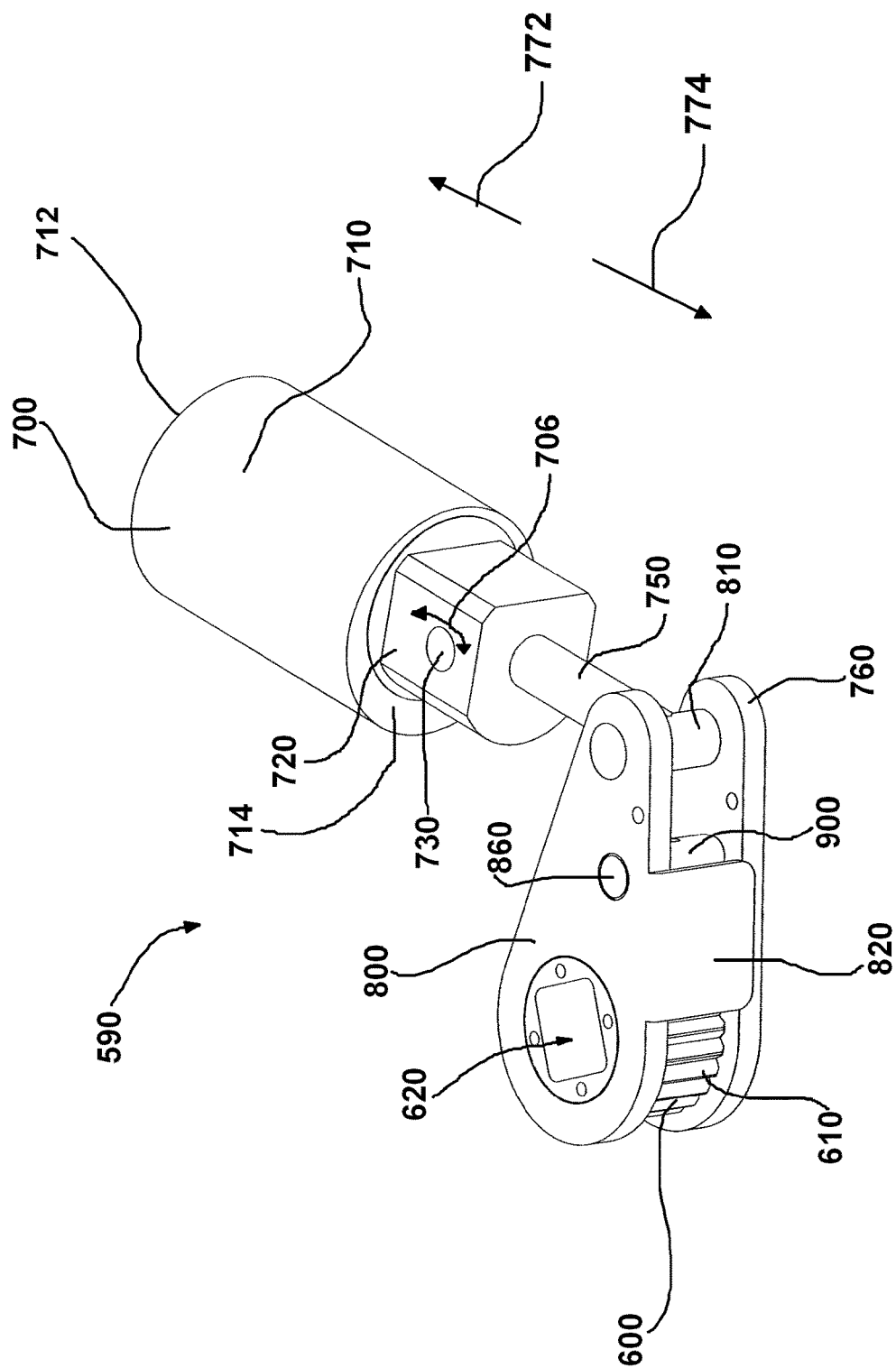
FIG. 31 is a top perspective view of a portion of the high torque driver of the wrench of FIG. 30.
Figure 32:
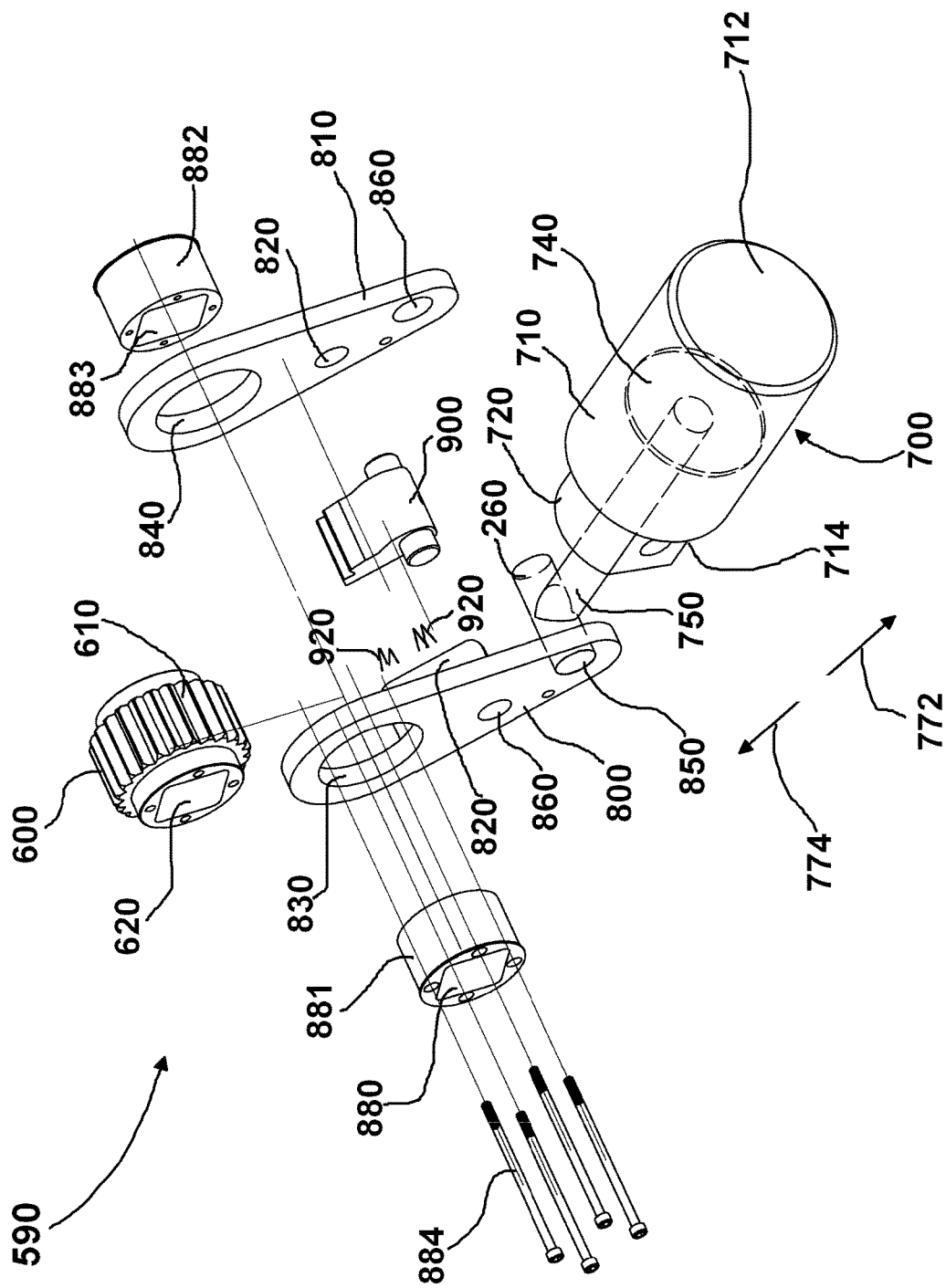
FIG. 32 is an exploded perspective view of the high torque driver of the wrench of FIG. 30.
Figure 33:
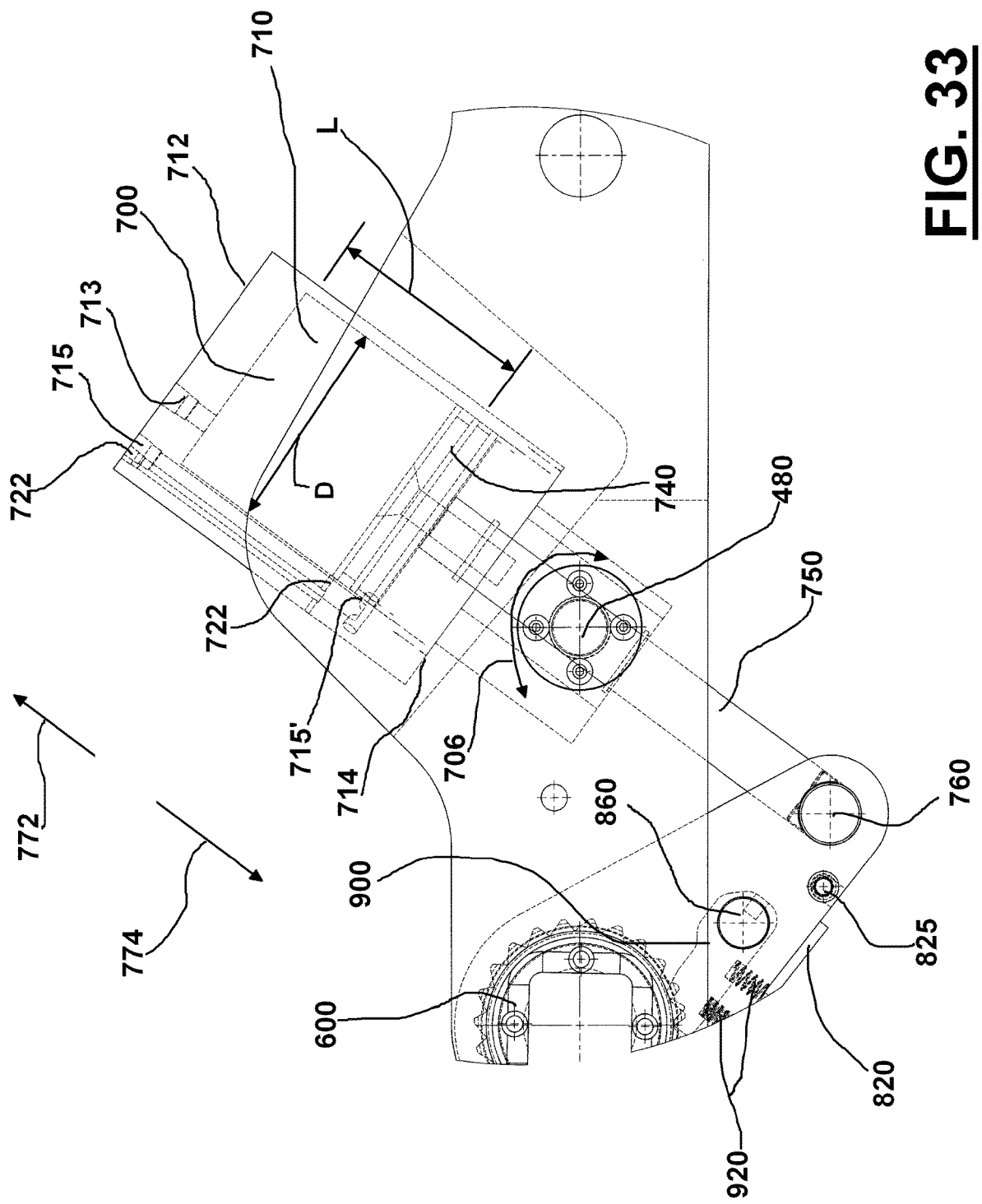
FIG. 33 is a enlarged top view illustrating the cylinder and piston arrangement of the high torque driver of FIG. 30.

FIG. 30 is an exploded perspective view of a portion of the high torque driver 590 of wrench 400. FIG. 31 is an assembled perspective view of the high torque driver 590. FIG. 32 is a perspective exploded view of the high torque driver 590.

FIG. 37 is a side perspective view of driver 1000 which can include tip or socket 1010, opening 1020 for bolt 32, and a maximum depth of penetration 1030 for the head of bolt 32. FIGS. 38 and 39 are respectively top and bottom views of the driver 1000.

Figure 40:
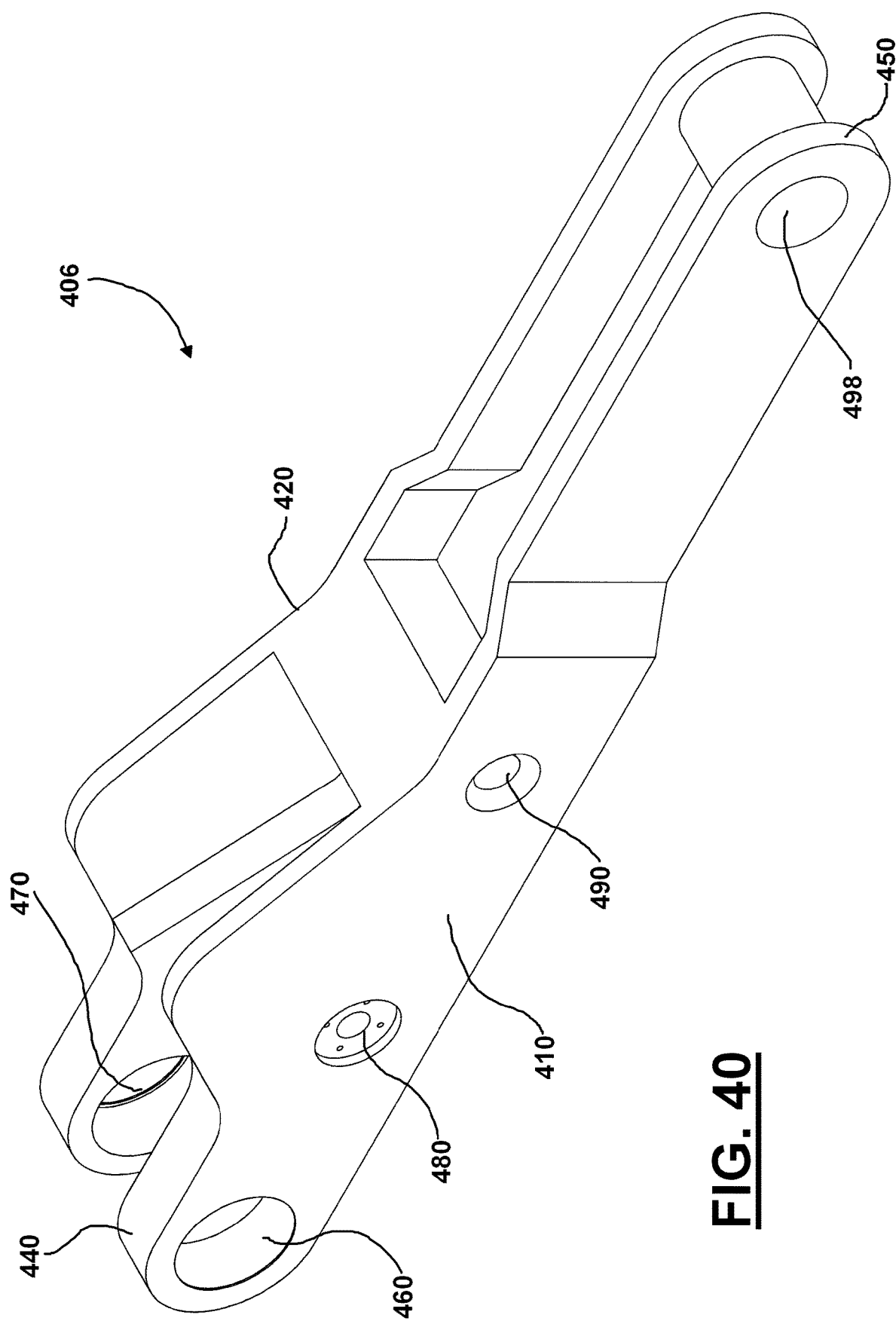
FIGS. 40 and 41 are respectively top and bottom views of the high torque driver shown in FIG. 30.
Figure 41:
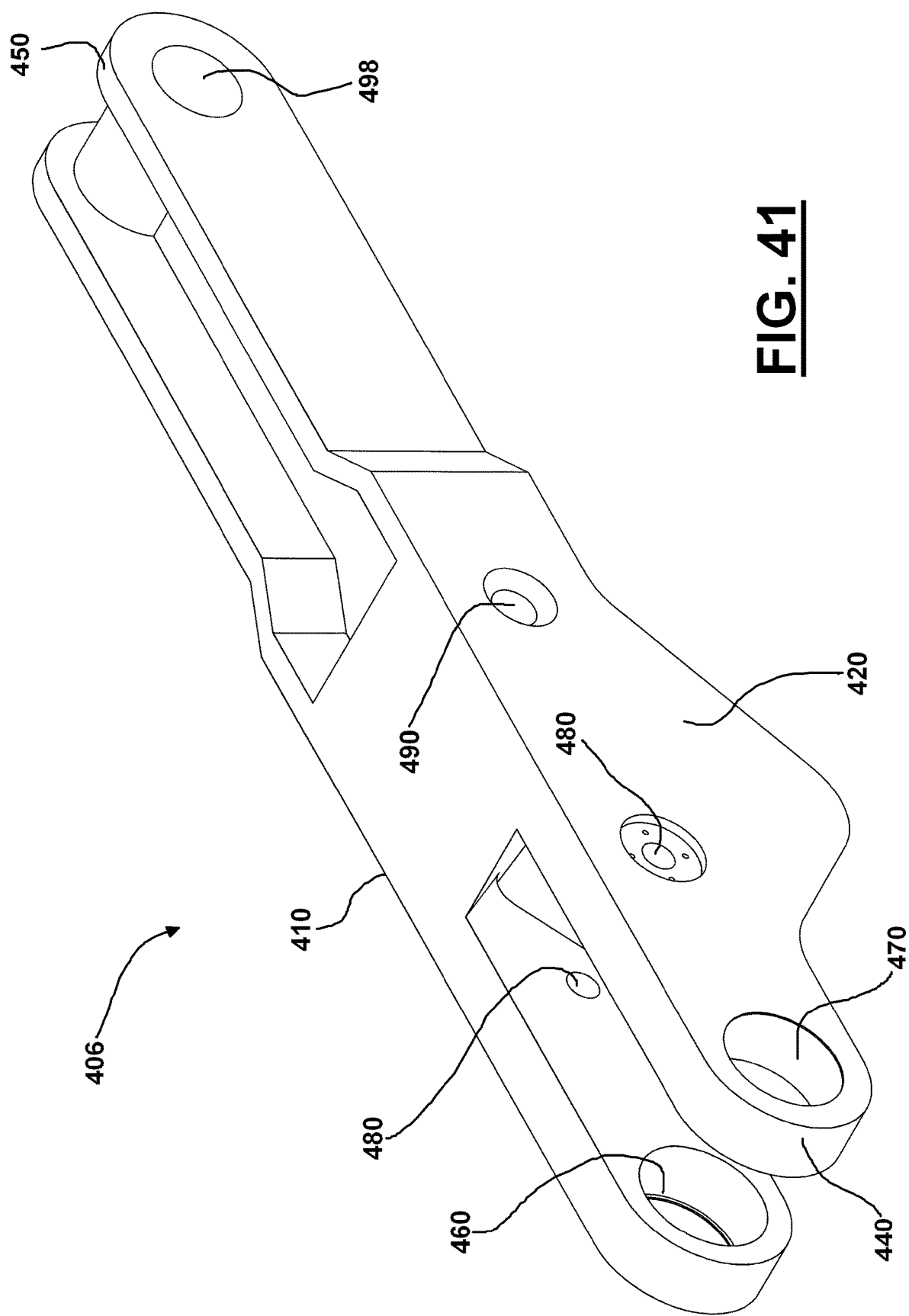

FIG. 40 is a perspective view of wrench body 406 used in torque station 110. FIG. 41 is another perspective view of wrench body 406 taken from the opposite side as that shown in FIG. 40.

Figure 42:
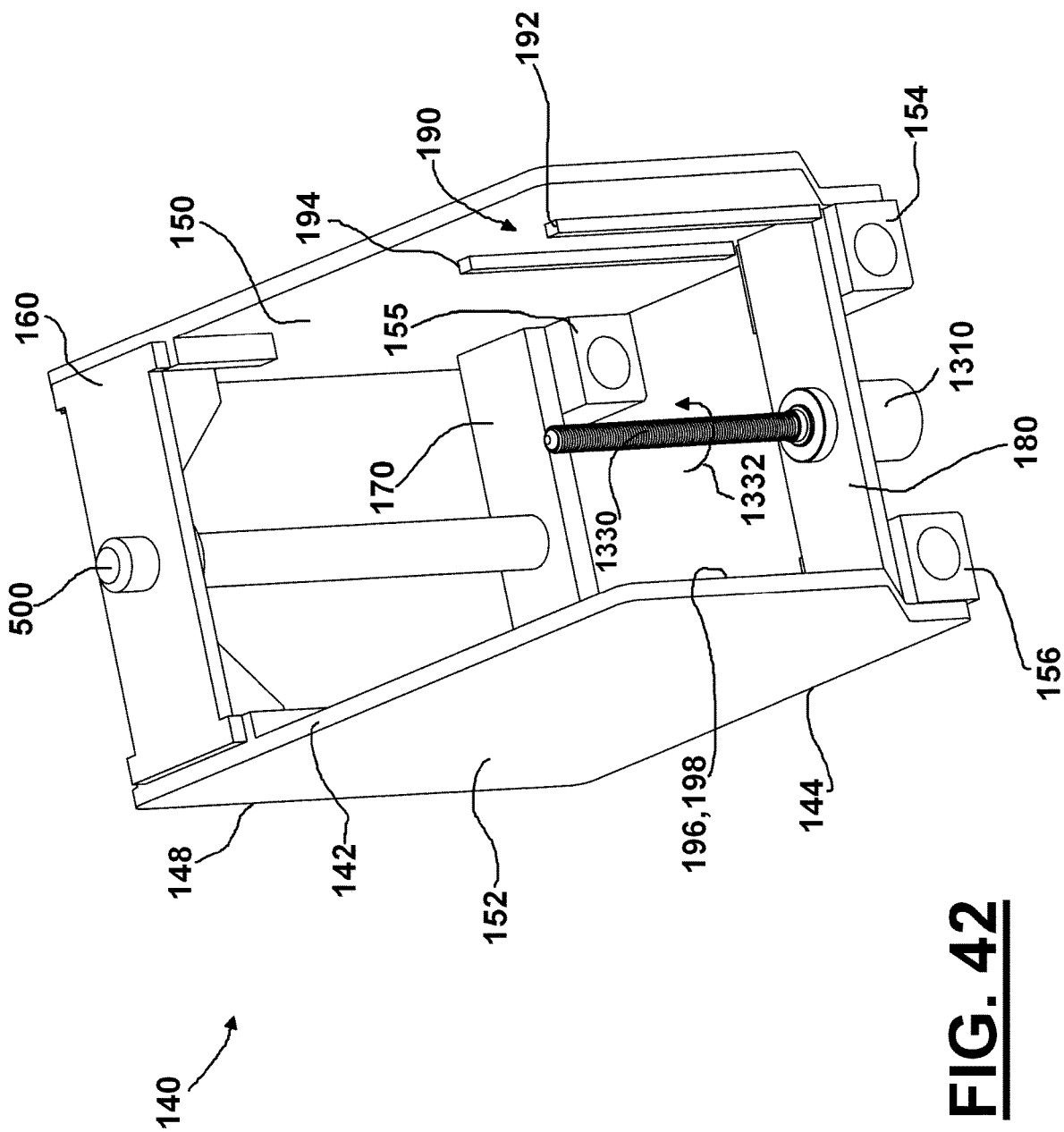
FIG. 42 is a top perspective view of the sliding housing, reaction bar, and vertical lifting and lowering mechanism of FIG. 23.
Figure 43:
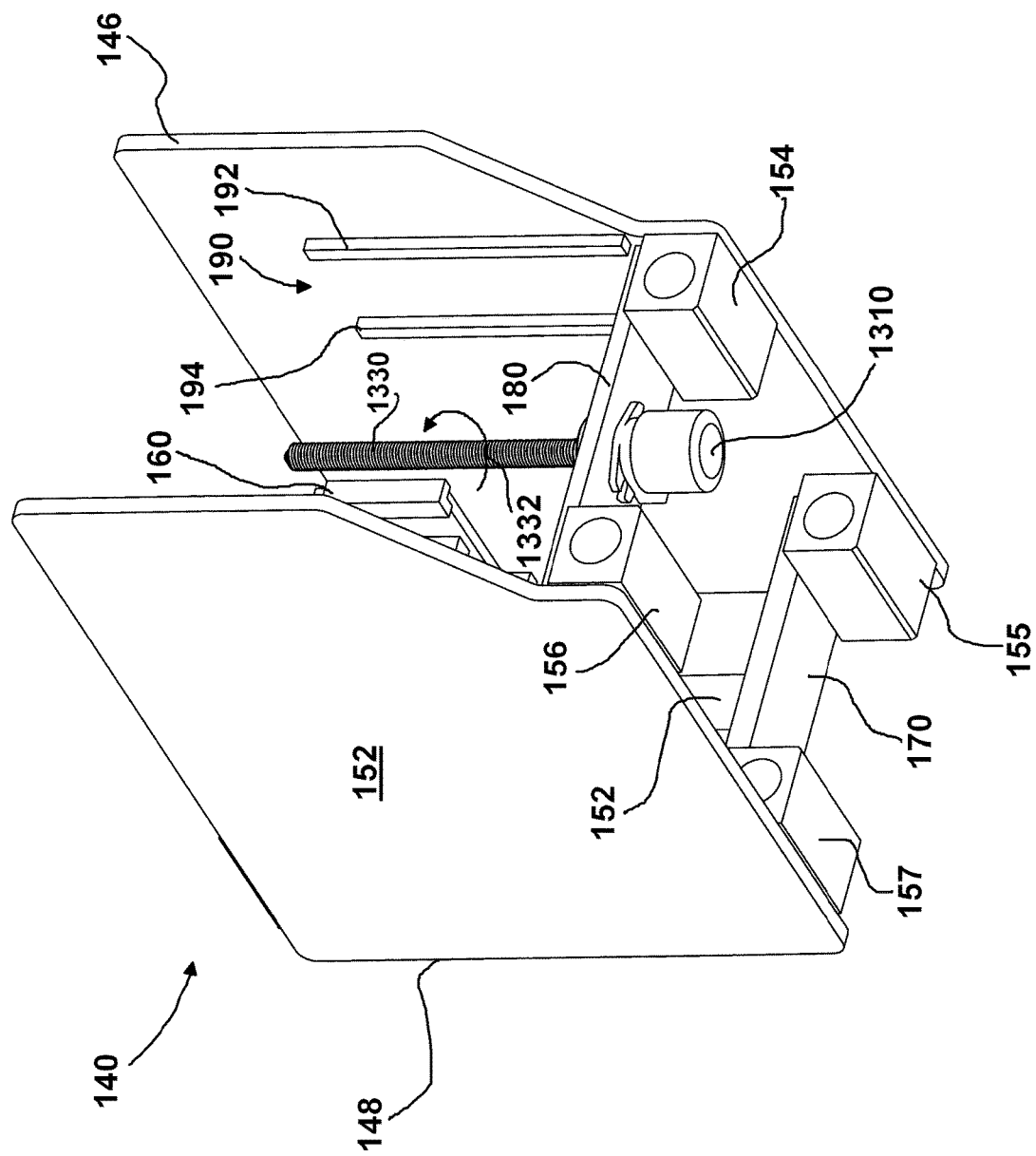
FIG. 43 is a bottom perspective view of the sliding housing, reaction bar, and vertical lifting and lowering mechanism of FIG. 23.
Figure 44:
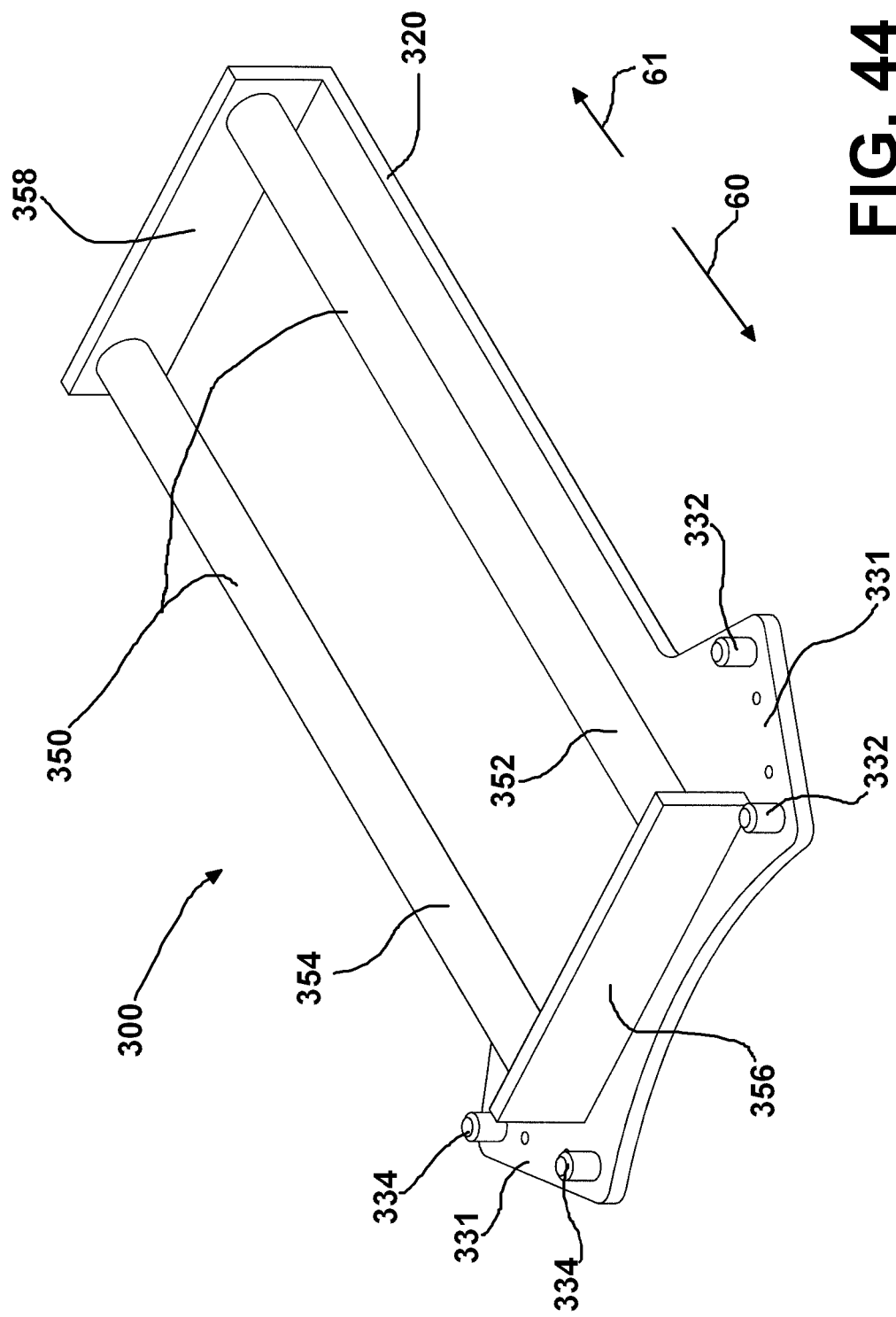
FIG. 44 is a top perspective view of the base for the sliding housing of FIG. 30.

FIG. 42 is a front perspective view of the sliding housing 140, reaction bar 500, and vertical lifting and lowering mechanism 1300. FIG. 43 is a bottom perspective view of sliding housing 140, reaction bar 500, and vertical lifting and lowering mechanism 1300. FIG. 44 is a top perspective view of base 300 for sliding housing 140.

The individual components and their operations will be described in more detail below.

Wrench 110 can comprise a body 406 including a cylinder 700 for hydraulically reciprocating a piston 740 and piston rod 750. Piston 740 being operably connected to a driver 1000. The connection between the piston 740 and driver 1000 can be a ratcheting mechanism comprising a drive gear 600.

The high torque phase can be achieved by activation of hydraulic cylinder 700 pivotally connected to wrench body 406 by pivot pin 734. Piston rod 750 is connected to piston rod tip 760 which, in turn, is respectively pivotally connected to first and second drive plates 800,810 at bores 850, 852. First and second drive plates 800,810 are pivotally connected to drive pawl 900 through bores 860,870. Drive pawl 900 is operatively connected to drive gear 600 by a plurality of angular gear teeth 610 and drive pawl springs 920. Drive plate extension 820 biases springs 920 against drive pawl 900. Driver 1000 is connected to drive gear 600 through correspondingly shaped opening 620. Extension of piston rod 750 rotates first and second drive plates 800,810; thereby rotating drive pawl 900, thereby engaging drive gear 600 and turning driver 1000 rotating driver tip or socket 110 and finally engaging bolt 32.

Drive bushings/bearings 880 and 882 are operatively connected to driver 1000 through bores 881 and 883. Drive bushings 880 and 882 fit into bores 460 and 470 of wrench body 406. Drive bushing/bearings 880 and 882 reduce friction and act as a bearing surface during rotation of driver 1000 for both high speed and high torque phases.

Wrench 400 can include a reaction bar 500 which provides a reacting force in opposition to the torque applied by driver 1000 on bolt 32. Driver 1000 can be operably connected to a driver tip or socket 1010 which itself connects to threaded fastener 32. In one embodiment there can be further included exchangeable socket tips mountable on driver 1000 for engaging a head of a threaded fastener 32 which are of different sizes.

Sliding housing 140 can slide radially, laterally, or horizontally relative to base 300 (in the directions of arrows 60 and 61). Sliding housing 140 can comprise top 142, bottom 144, front 146, and rear 146. Sliding housing can include first and second side walls 152, 154, which are connected by horizontal braces 180 and 170. On the bottom 144 can be plurality of foot connectors 154, 155, 156, and 157, each of which can include a sliding bore.

Sliding housing 140 can include reaction bar or shaft 500 which spans between brace 170 and removable brace 160.

Side wall 150 can include tracks 192 and 194. Substantially opposite of tracks 192 and 194 can be tracks 196 and 198 located on side wall 152. Male tracks 192, 194, 196, and 198 can slidably connect wrench 400 located on top of housing 1230 (in a vertical direction and cooperating with female tracks 1252,1254, 1256, and 1258) to sliding housing 140. Wrench 400 will also slide vertically relative to reaction bar or shaft 500 through cooperating bore 498.

Sliding housing 140 can be adjustably mounted on a base 300 through foot connectors 154, 155 and 156, 157 being slidably connected to shafts 352 and 354. Sliding housing 140 can be adjusted horizontally relative to base 300 as schematically indicated by arrows 60 and 61. A pair of hydraulic cylinders and pistons (not shown) can be connected to sliding housing 140 and rear plate 358 such that extension of the cylinders pushes sliding housing 140 in the direction of arrow 60 (at least until the fully extended position where front plate 356 can stop further movement in the direction of arrow 60) and retraction of the cylinders pulls sliding housing 140 in the direction of arrow 61. In one embodiment a maximum forward movement adjustment mechanism (such as a set screw) can be provided on front plate 356 to limit the amount of horizontal movement of sliding assembly (and driving tip or socket 1010) in the direction of arrow 60. For example, forward movement in the direction of arrow 60 can be stopped when foot 156 and/or 157 hits forward plate 356. In one embodiment the distance of forward movement in the direction of arrow 60 can be controlled by measuring the amount of extension of the hydraulic cylinders pushing sliding housing 140.

Vertical lifting and lowering mechanism 1300 can comprise motor 1310 and screw 1330. Hydraulic motor 1310 can be operatively connected to screw 1330. Screw 1330 can be operatively connected to wrench 400 through threaded area 1242 of housing 1230. Rotating in the direction of arrow 1332 (clockwise) would lower wrench 400 (in the direction of arrow 63), while rotating in the opposite direction (i.e., in the direction of arrow 1334 or counterclockwise) would raise wrench 400 (in the direction of arrow 64). Although not shown in the drawings, in one embodiment vertical lifting and lowering mechanism can comprise a cylinder and piston arrangement operatively connected to wrench 400 where extension of the cylinder raises wrench 400 (in the direction of arrow 64) and retraction of the cylinder lowers wrench 400 (in the direction of arrow 63). However, given the small clearance between wrench 400 and base 300 when wrench 400 is in its lowest position a telescoping arrangement may be required or the piston connection being made at the rear of wrench body 406.

In one embodiment a bolt lifting mechanism 1400 is provided. Bolt lifting mechanism 1400 can comprise lifting fork 1410 and plate 1420. Lifting fork 1410 can be slidingly connected to wrench 400 via housing 1230 by plate 1420 sliding in between tracks 1430 and 1432. A pair of hydraulic cylinders and pistons (not shown) can be connected to plate 1420 and extension of the cylinders pushes fork 1410 in the direction of arrow 1402 (at least until the fully extended position where fork 1410 is blocked from further movement in this direction such as by contacting bolt 32) and retraction of the cylinders pulls fork 1410 in the direction of arrow 1404. In one embodiment a maximum forward movement adjustment mechanism (such as a set screw) can be provided to limit the amount of horizontal movement of fork 1410 in the direction of arrow 1402. In one embodiment the distance of forward movement in the direction of arrow 1402 can be controlled by measuring the amount of extension of the hydraulic cylinders pushing fork 1410.

High and Low Torque Portions

Each wrench 110 can have both high torque and low torque driving mechanisms. Each wrench 110 can have a high speed/low torque portion 1200 for speeding up the tightening or loosening process until a higher torque is required/desired. When a higher torque is desired each wrench 110 can include a low speed/high torque portion 590 which can address final make-up torquing up of bolts 32 or the initial break out torque for breaking out bolts 32.

In one embodiment the high and low torque portions of each wrench 110 can be switched during a cycle of tightening or loosening a bolt 32. In one embodiment the switch from high to low or low to high torque options can be based on height. In one embodiment the height can be measured using a height sensor 1350 for elevator 1200 which height sensor can be commercially available. In one embodiment the height sensor 1350 can be a linear variable detection transducer.

In one embodiment the high and low torque portions of each wrench 110 can be switched as many times as needed when tightening or loosening a bolt 32. The operations of each will be described below.

In one embodiment the high and low torque portions of each wrench 110 can be simultaneously energized. During requirements of low torque, the high speed portion 1200 takes over because it spins driver tip or socket 1010 faster than the low speed/high torque 590 portion. In this case drive gear 600 merely spins faster than low speed/high torque 590 portion attempts to turn drive gear 600 (by pawl 900 performing a ratcheting motion against biasing members 920 as drive gear 600 turns faster than piston 740 and pawl 900 attempt top turn drive gear 600). During requirements of high torque, the motor 1210 from the high speed portion 1200 "stalls" and the high torque 590 takes over (albeit at a slower rotational speed). In this manner each wrench 110 can transition between high and low torque modes as frequently and as many times as needed during either tightening (making up) or loosening (breaking out) a bolt 32.

Torque wrench 110 can comprise a driver 1000 with tip or socket 1010 configured to engage a threaded connector 32 such as a bolt or nut. Socket head 1010 also comprises a plurality of faces or socket teeth radially positioned. Hydraulic wrench assembly 110 further comprises a hydraulic cylinder 700. Hydraulic cylinder 700 is configured to extend and retract a drive pawl 900 which is positioned to engage ratchet teeth 610 upon extension of pawl 900. When pawl 900 engages ratchet teeth 610, driver 1000, driver tip or socket 1010, and threaded connector 32 are rotated upon further extension of pawl 900, which will either tighten or loosen threaded connector 32 depending upon the direction of rotation of driver 1000. Pawl 900 may retracted and extended again, further rotating driver 1000 and driver tip or socket 1010, and threaded connector 32 until the desired torque is reached or until threaded connector 32 is adequately loosened.

Torque wrench 110 further comprises a high speed/low torque driver 1200 which can include a hydraulic motor 1210 which is mechanically coupled to driver 1000 (such as through a belt, toothed belt, or chain connection) so that operation of high speed driver 1200 will result in driver 1000 along with driver tip or socket 1010, and threaded connector 32 being rotated at a relatively high rotational speed. Typically, high speed/low torque driver 1200 will rotate at about 100 rpm and will be configured to provide about 500 ft lbs of torque to threaded connector 32. Driver 1200 can be used until threaded connector is snug, a condition that will be apparent when motor 1210 stalls, and driver 1000 stops turning.

In one embodiment high Speed/low torque driver 1200 will stop turning when the reaction force or torque from tightened bolt 32 equals the torque placed by driver 1200 (e.g., piston 740, piston rod 750, drive plates 800,810, and pawl 900 on drive gear 600). This state can be called "stalled" or "being torqued out." Hydraulic motor 1210 stalls out and acts as blockage in the hydraulic line feeding it. As the pressure builds up, the pressurized fluid causes hydraulic motor 1210 to rotate which allows the fluid to pass and prevents the pressure from building up further. However, if resistance from threaded connector 32 prevents motor 1210 from rotating, the pressure will continue to increase until either that obstacle is overcome and motor 1210 rotates allowing some of the fluid to pass or until relief is obtained elsewhere (such as by the high torque portion 590 taking over). As bolt 32 gets tighter, it will provide more and more resistance to rotation of motor 1210. As threaded connector 32 gets tighter and tighter, the pressure in the hydraulic line will be increased ever higher.

In one embodiment both the high speed/low torque 1200 and low speed/high torque driver 590 portions are continuously hydraulically energized. During "low torque" phases of turning bolt 32 the high speed motor 1210 will "stall" and the high torque driver 590 will continue to turn bolt 32 either until bolt 32 is made up to an acceptable torque or the torque on bolt 32 drops and the high speed motor 1210 will again take over. In one embodiment when the back pressure from motor 1210 reaches a stalled condition operation is switched to low speed/high torque wrench 410.

Reaction Torque

During both high speed and high torque phases reaction bar 500 will provide the reaction force to counteract the reaction torque generated by either tightening or loosening bolt 32. During operation a reaction torque (or force) equivalent to the torque applied by torque wrench 110 will be generated when removing or tightening bolt 32. This reaction torque must be compensated for, such as by having reaction bar 500 transmit such torque to the structure of the rig 20 and/or riser 40.

In one embodiment the reaction torque from bolt 32 is transferred to driver 1000 and wrench body 406 to reaction bar 500, and from reaction bar 500 to braces 160 and 170, to feet 155 and 157, to shafts 352 and 354, and to base 300. In one embodiment base 300 is connected to spider 50 which itself can be connected to the floor of rig 10 (even if by friction) and such reaction torque is transferred to the floor of rig 10.

In one embodiment bases 300A-F are interconnected (but sitting on the floor of rig 10 without being bolted down), and the reaction torque is ultimately transferred from each of the bolts 32A-F to one or more of the other bolts 32A-F, and to the upper and/or lower riser sections 42 and 46 through the flanges 43 and 47.

Control Units

In one embodiment a single control unit 80 is used for torque modules 110A-F. In one embodiment a control unit is used to control multiple wrenches (e.g., 2, 3, 4, 5 and/or 6). In one embodiment each wrench (e.g., 110A-F) has its own control unit.

General Sequence Steps FIGS. 3 through 10 show various sequence steps in a make up process for one of the torque stations.

FIGS. 11 through 22 show various sequence steps in a break out process for one of the torque stations.

Each process will be described below for one embodiment.

Make-Up Sequence

FIGS. 3 through 10 show various sequence steps in a make up process for one of the torque stations. Only one of the torque stations 110 is shown as all six follow substantially the same process—although each station 110 can act independently of the other stations for the described steps unless specified otherwise.

FIG. 3 is a top view showing one embodiment of the torque wrench system during make up with all six of the torque stations (110A-F) in horizontally retracted states (and station 110A in a partially broken out view).

FIG. 4 is a top view showing one embodiment of the torque wrench system during make up with all six of the torque stations (110A-F) in horizontally extended states (and station 110A in a partially broken out view).

FIG. 5A is a schematic side view one of the torque stations 110 ready for the beginning of a make up or break out sequence as the driver socket is completely retracted horizontally (arrow 61) and moved to its highest vertical position (arrow 64) which will clear a bolt 32 previously placed in a storage condition for a riser joint 42 along with being below the lowest point of the insulation or floatation (schematically indicated by numerals 44) for the upper riser section or joint 42. FIG. 5B is a top view of the torque station of FIG. 5A shown in partially broken out view.

FIG. 6A is a schematic side view of torque station 110 where drive socket 1010 has moved horizontally (arrow 60)

over a bolt 32 and is rotating for tightening (arrow 66), the drive socket or tip 1010 is also moving downwardly (arrow 63), and is about to engage the head of bolt 32. FIG. 6B is a top view of the torque station 110 shown in partially broken out view.

FIG. 7A is a schematic side view of torque station 110 where drive socket or tip 1010 has engaged the bolt 32 and begun to spin down the bolt 32 through the upper flange 47 and into the gap 49. FIG. 7B is a top view of the torque station 110 shown in partially broken out view.

FIG. 8A is a schematic side view of the torque station 110 5 after the drive socket 1010 has spun down the bolt 32, and the bolt 32 is now allowed a free fall through the gap between the flanges 43 and 47, and the head of the bolt 32 has vertically dropped in relation to the drive socket 1010. Free fall occurs and bolt 32 drops a distance such as 1 inch but its head remains in socket 1020 of tip 1010 because of excess capacity depth 1030. FIG. 8B is a top view of the torque station 110 shown in partially broken out view.

FIG. 9A is a schematic side view of the torque station 1105 after the drive socket 1010 has spun down the bolt 32, allowed a free fall of the bolt 32 through the gap 49 between the flanges 43 and 47, and further spun down the bolt 32 to the lower flange 47 by about two threads in the lower flange 47. FIG. 9B is a top view of the torque station 110 shown in partially broken out view.

FIG. 10A is a schematic side view of the torque station 110 after the drive socket 1010 has spun down the bolt 32 until shoulder to shoulder contact between the upper flange 43 and the bolt head has occurred, and the torque station 110 goes into a high torque mode where the piston 740 and cylinder 700 control rotation of the driver 1000. After the desired make up torque is achieved the driver tip 1010 will be moved upward and retracted (arrows 64 and 61) to the position shown in FIG. 5 and be ready for the next make up cycle.

Now the general method for one embodiment will be described for the make up mode.

In the beginning all six modules (110A-F) are in the fully retracted position (which can be called the home position). Previous to module 110 extension, there can be a safety check to make sure that all six modules (110A-F) are in the home position before a make-up routine can be started. The home position can be both a vertical home position (arrow 64—which can be checked by the vertical height sensor 1350) along with a horizontal radially retracted home position (arrow 60—which can be checked by a timing sequence using the body slide cylinders 362 and 364, such as retraction hydraulic pressure for a set period of time which can be 1, 2, 3, 4, 5, 6, 7, 8, 9, and 10 seconds of retraction pressure). Fully retracted positions can be controlled by fully retracted body slide cylinders 362 and 364, or by a retraction catch (e.g., rear plate 358), or a combination of the two. In one embodiment there can be an adjustable body retraction stop (e.g., rear plate 358) for each body module (110A-F) in the retraction step.

Pressing the start button (e.g., located on control panel 80) for make up causes all six modules (110A-F) to be radially extended in the directions of arrow 61 (by the body slide cylinders 362 and 364 extending) and causing the modules (110A-F) to radially extend (arrows 61A-F) such that the individual drive sockets (110A-F) will be positioned over the individual bolts (32A-F). Radial extension of modules (110A-F) occurs on both a timing control along with a radial extension stop (e.g., extension adjusters 357 on front plate 356). In one embodiment there can be an adjustable body extension stop 357 for each body module 140 in the extension step. In one embodiment radial extension (in the direction of arrow 61) can be checked by a timing sequence using the body slide cylinders (362 and 364), such as extension hydraulic pressure for a set period of time which can be 1, 2, 3, 4, 5, 6, 7, 8, 9, and 10 seconds of extension pressure.

In one embodiment, after a set period of time following the release of hydraulic pressure to each of the body slide cylinders (362 and 364), each of the drive socket 1010 is lowered (in the direction of arrow 63). In one embodiment the set period of time can be ½, ¾, 1, 1½, 2, 3, 4, and 5 seconds. In various embodiments the set period of time can be within a range of between any two of the above set periods of time.

In one embodiment, at the beginning of the lowering step (FIG. 6A), each drive socket 1010 can be rotated (in the direction of arrow 66) using the high speed/low torque driver 1200 at a first rotational speed (which is lower than a second rotational speed). In various embodiments the relative rotational speeds can be 5, 10, 15, 20, 25, 30, 35, 40, 45, 50, 55, 60, 65, 70, 75, 80, 85, 90, 95, and 100 percent of each other. In various embodiments the relative rotational speeds can be within a range of between any two of the above specified percentages.

In one embodiment the first rotational speed (in the direction of arrow 66) of each individual drive socket (1010A-F) is continued until a set height (H2 shown in FIG. 9A) of the individual drive socket head is reached. In one embodiment the switch from first to second vertical speeds (in the direction of arrow 63) corresponds with the bolt 32 dropping between the threaded sections of the two riser flanges (gap 49) and entering the threaded section of the lower riser flange 47. In one embodiment this set height of the drive socket 1010 is based on the riser bolt 32 being threadably engaged with the threads of the lower riser flange joint 47. In one embodiment this height is based on an engagement of at least 2 threads. In one embodiment each of the six modules 110 are individually controlled based on the height H of the individual drive sockets 1010.

In one embodiment the rate of vertical movement (in the direction of arrow 63) of each drive socket (1010A-F) has a first vertical speed and a second vertical speed during vertical drop (in the direction of arrow 63) of each drive socket (1010A-F). In one embodiment the first vertical speed can be lower than a second vertical speed). In various embodiments the relative vertical speeds can be 5, 10, 15, 20, 25, 30, 35, 40, 45, 50, 55, 60, 65, 70, 75, 80, 85, 90, 95, and 100 percent of each other. In various embodiments the relative vertical speeds can be within a range of between any two of the above specified percentages. In one embodiment the switch from the first vertical speed to the second vertical speed can be simultaneous with the switch from the first rotational speed to the second rotational speed.

In one embodiment each of the drive sockets (1010A-F) are checked to determine that a lower specified vertical height (H3 shown in FIG. 10A) has been achieved before a high torque mode is entered with each of the drive sockets (1010A-F). In one embodiment a set period of time is waited from the last drive socket reaching its specified ending vertical height (H3) before high toque mode is entered. In one embodiment the set period of time can be ½, ¾, 1, 1½, 2, 3, 4, and 5 seconds. In various embodiments the set period of time can be within a range of between any two of the above set periods of time.

In one embodiment each of the drive sockets (1010A-F) respectively spin down its riser bolt (32A-F) until a snug condition is achieved between the riser bolt and the joint before a high torque mode is simultaneously entered with each of the drive sockets (110A-F). In one embodiment a snug connection between the riser bolt and the joint is less than about 600, 500, 400, 300, 200, 100, 50, 25, and 0 foot pounds of torque between the riser bolt and the joint connection. In various embodiments each of the riser bolts is within the same range of between about any two of the above specified torques. In one embodiment a set period of time is waited from the last bolt reaching its snugging torque before high toque mode is entered. In one embodiment the set period of time can be ½, ¾, 1, 1½, 2, 3, 4, and 5 seconds. In various embodiments the set period of time can be within a range of between any two of the above set periods of time.

In one embodiment each of the drive sockets (1010A-F) are started in the high torque mode simultaneously. In one embodiment each of the drive sockets (1010A-F) are continued in the high torque mode until a pre-set back pressure is achieved (and the high torque mode hydraulically stalls). In one embodiment the set period of time can be 1, 2, 3, 4, 5, 6, 7, 8, 9, and 10 seconds of extension pressure. In various embodiments the set period of time can be within a range of between any two of the above set periods of time.

In one embodiment the final make-up torque between each of the riser bolts (32A-F) for a particular riser joint are within less than about 10, 9, 8, 7, 6, 5, 4, 3, 2, 1, ½ percent of each other's make-up torques. In various embodiments the final make-up torques can be within a range of between about any two of the above specified percentages.

In one embodiment a set period of time is specified for each of the drive cylinders (700A-F) of the drive sockets (1010A-F) to reach the preset torquing pressure, and if not met a warning signal is sent out. In one embodiment along with the warning sign the system is shut down for diagnostic checking.

In one embodiment where each of the drive sockets (1010A-F) reach and maintain the pre-set back pressure each of the drive sockets (1010A-F) are then sent back to the home position (retracted vertically in the direction of arrow 64 and horizontally in the direction of arrow 60). In one embodiment the retracted vertical mode is achieved before the start of retraction in a horizontal mode. In one embodiment the drive socket 1010 is not spun either in high speed or in high torque during retraction. In one embodiment retraction vertically is checked by a vertical height sensor 1350. In one embodiment retraction horizontally (in the direction of arrow 60) is by a pre-set time period. The horizontal radially retracted home position can be checked by a timing sequence using the body slide cylinders 362 and 364, such as retraction hydraulic pressure for a set period of time which can be 1, 2, 3, 4, 5, 6, 7, 8, 9, and 10 seconds of retraction pressure. In various embodiments the set period of time can be within a range of between any two of the above set periods of time. Fully retracted positions can be controlled by fully retracted body slide cylinders 362 and 364, or by a retraction catch (rear plate 358), or a combination of the two. In one embodiment there can be an adjustable body retraction stop (e.g., adjustable fasteners in rear plate 358) for each body module (110A-F) in the retraction step.

In one embodiment the made up riser flange (43 and 47) is lowered, and a new section of riser 42' is placed on the riser (on top of riser section 42) for make-up. In one embodiment the above specified steps are repeated for attaching the new section of riser (42' being attached to 42).

In one embodiment the above specified steps are repeated until the length of riser 40 spans from the sea floor (well head or blow out preventer) to the rig or platform.

Break-Out Sequence

To place torque module 110 in the breakout mode (i.e., to loosen bolt 32) compared to the make up mode, wrench 400 will have to be flipped over so that bottom 420 is now above top 410. This can be accomplished relatively easily by removal of brace 160, and sliding upward in the direction of arrow 64 wrench 400. Bores 460,470 will allow wrench 400 to slide over driver shaft of driver 1000. Bore 490 will allow wrench 400 slide over screw 1330. Bore 498 will allow wrench 400 to slide over reaction shaft or bar 500. High speed/low torque driver 1200 can maintain its position. Once flipped over (i.e., bottom 420 being above top 410), wrench 400 can again be placed on high speed/low torque driver 1200 with bores 460,470 again going over shaft of driver 1000, bore 490 over screw 1330, and bore 498 over reaction shaft or bar 500. Brace 160 is again placed over reaction bar or shaft 500.

FIGS. 11 through 22 show various sequence steps in a break out process for one of the torque stations 110. Only one of the torque stations 110 is shown as all six follow substantially the same process—although each station 110 can act independently of the other stations for the described steps unless specified otherwise.

FIG. 11 is a top view showing one embodiment of the torque wrench system during break out with all six of the torque stations (110A-F) in horizontally retracted states (and station 110A in a partially broken out view showing various individual components). FIG. 12 is a top view showing one embodiment of the torque wrench system during break out with all six of the torque stations (110A-F) in horizontally extended states (and station 110A in a partially broken out view).

Figure 13:
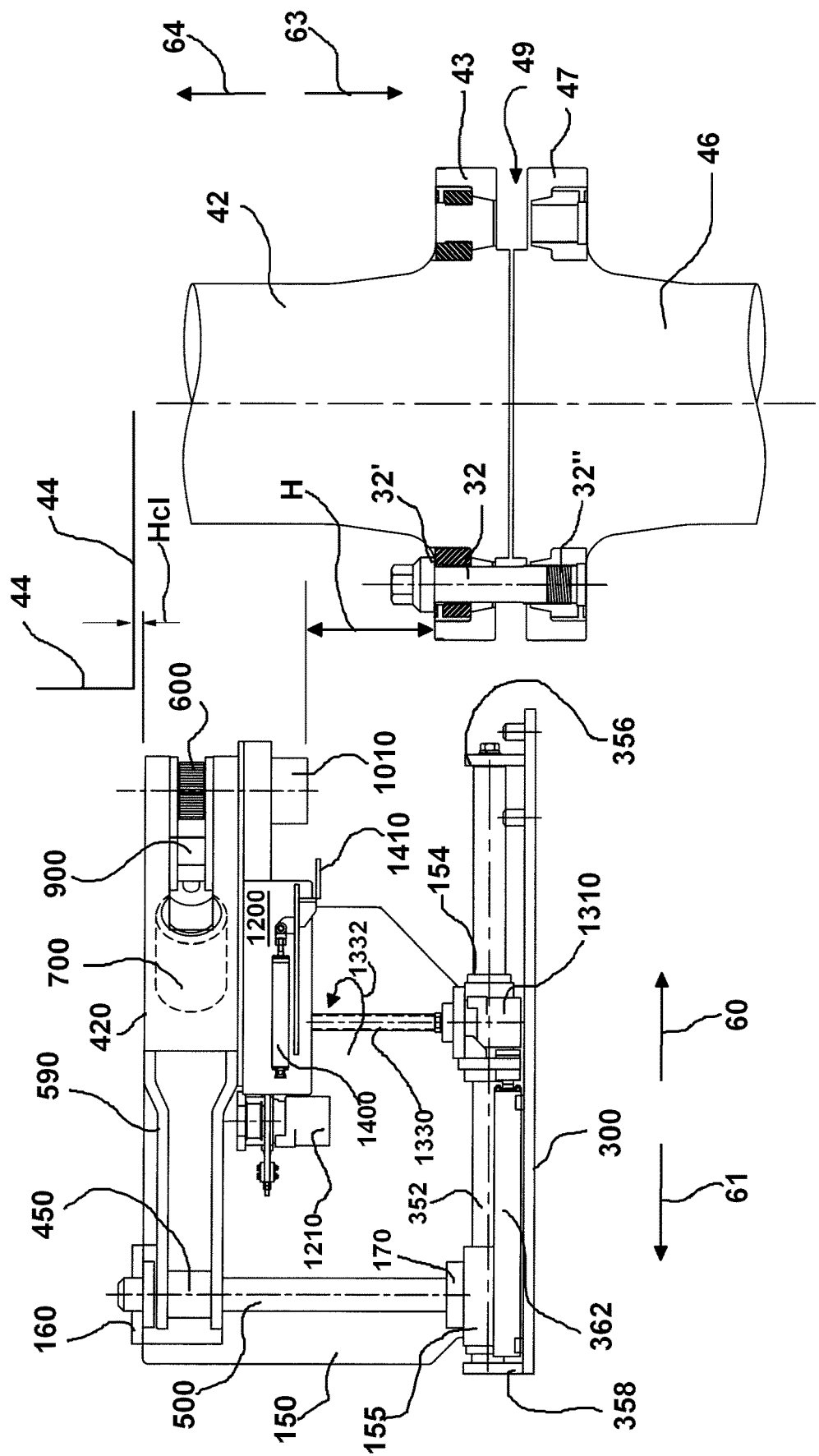

FIG. 13 is a schematic side view one of the torque stations 110 ready for the beginning of a break out sequence as the driver socket 110 is completely retracted horizontally and moved to its highest vertical position (arrow 64) which will clear the particular bolt 32 being broken out along with being below the lowest point of the insulation or floatation for the upper riser section or joint (schematically shown by lines 44). This position can be called the home position.

Figure 14:
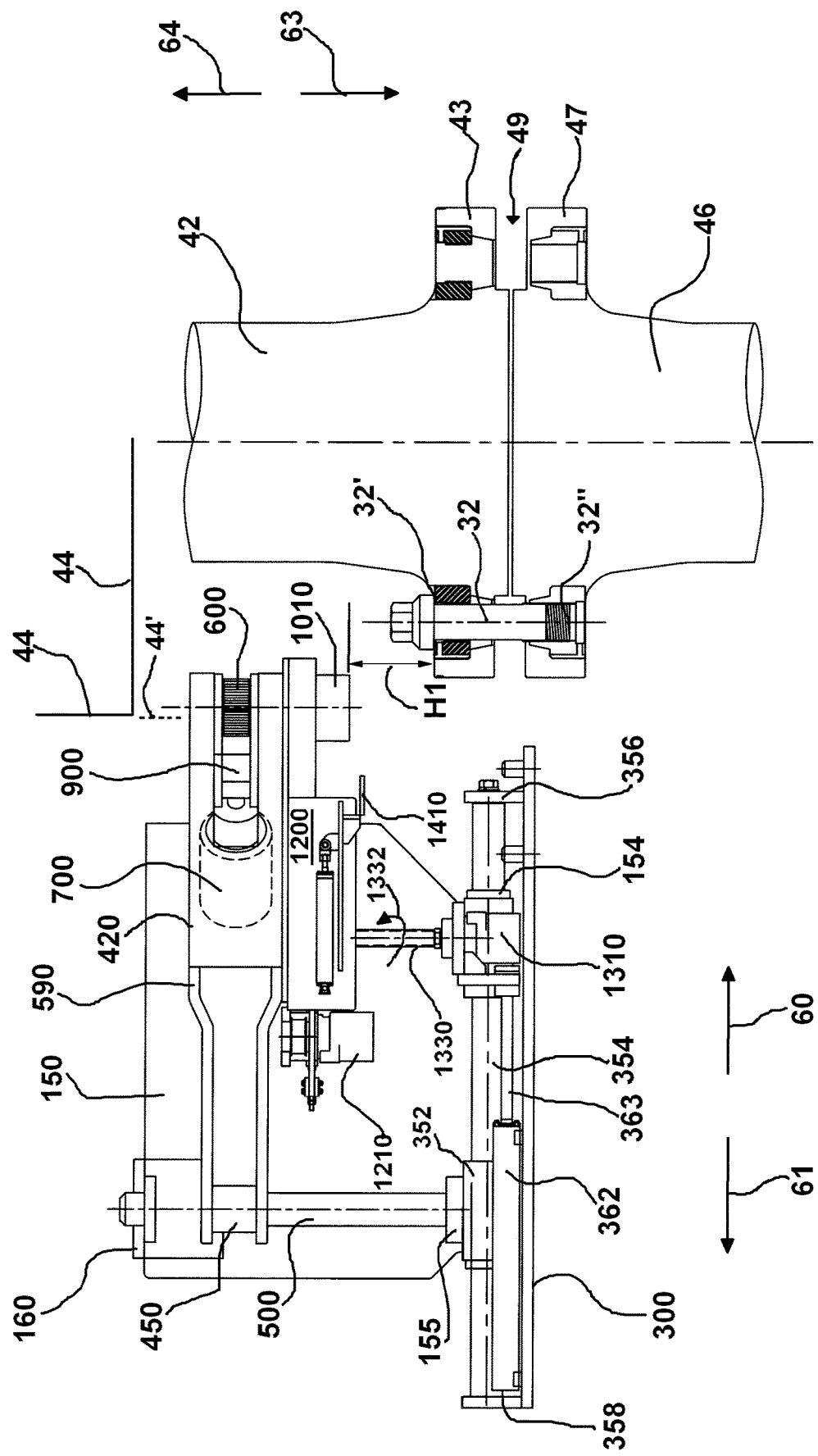

FIG. 14 is a schematic side view one of the torque stations 110 moving (schematically indicated by arrows 63 and 60) to a locating position for the drive socket 1010 on the bolt 32 head and showing drive socket 1010 after being partially radially extended (in the direction of arrow 60) to now move within a projected cylinder of the insulation 44 (schematically shown by dashed line 44'), and also moved vertically down (in the direction of arrow 63) to height H1 before being positioned above the head of its respective bolt 32 to be broken out. At height H1, drive socket 1010 can begin to be rotated at a first speed in the direction of arrow 68. In one embodiment height H1 will be about ½ inch above the top of the head of bolt 32. Also at H1, the downward speed of drive socket 1010 can be reduced (such as to 1, 2, 3, 4, 5, 6, 7, 8, 9 and/or 10 inches per minute) during the time it is being located on bolt 32.

Figure 15:
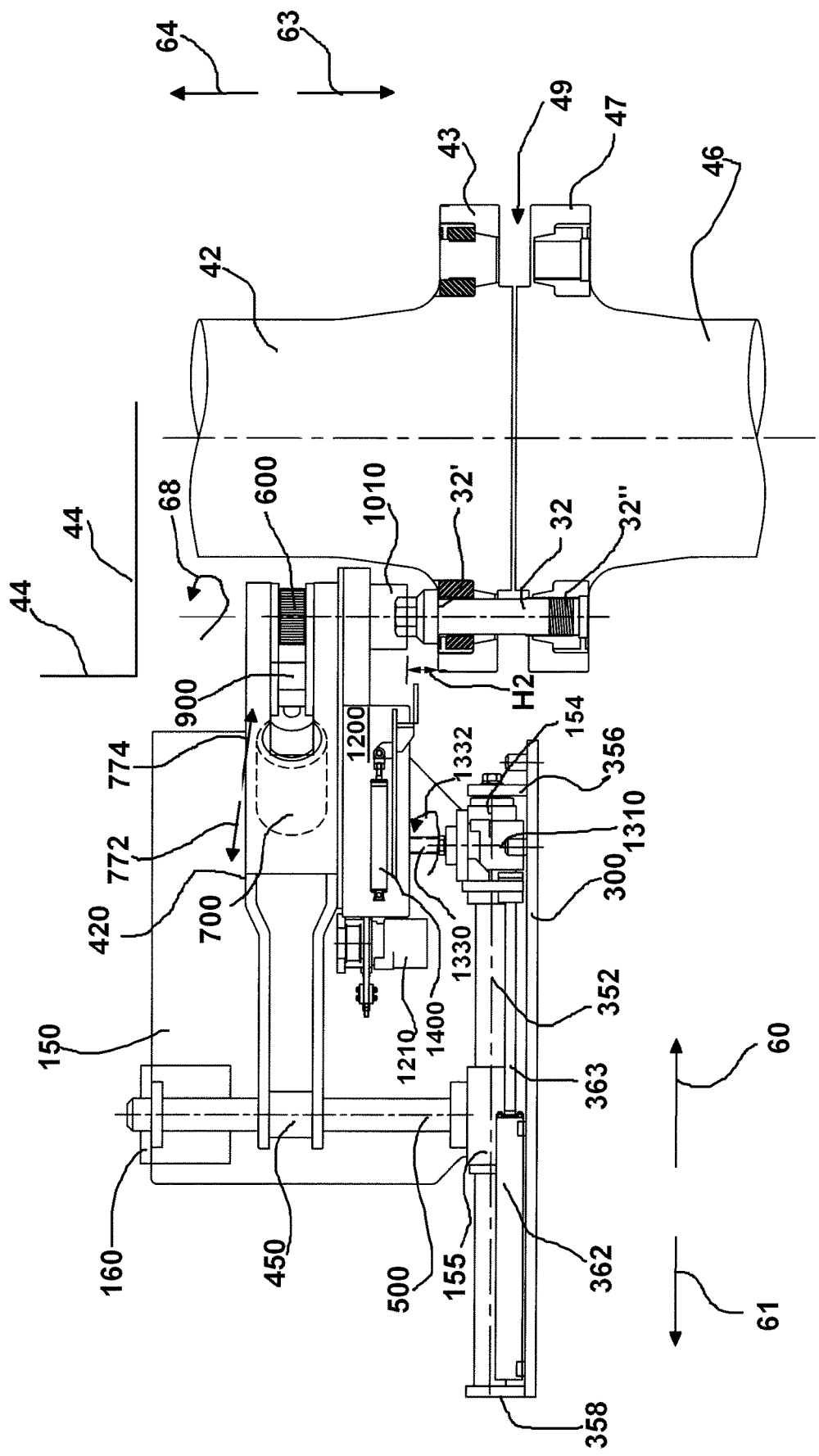

FIG. 15 is a schematic side view of the torque station 110 illustrating the step of locating (and engaging) the drive socket 1010 on the bolt 32 head for break out. As will be described below both low torque rotation using motor 1210 (schematically indicated by arrow 68) along with locating high torque stroking (schematically indicated by arrows 772 an 774) can be used during the locating step for drive socket 1010 before beginning the high torque break out step. As will be described below location of drive socket 1010 on bolt 32 can be determined when drive socket 1010 drops (in the direction of arrow 63) from height H2 (FIG. 15) to height H3 (FIG. 16).

Figure 16:
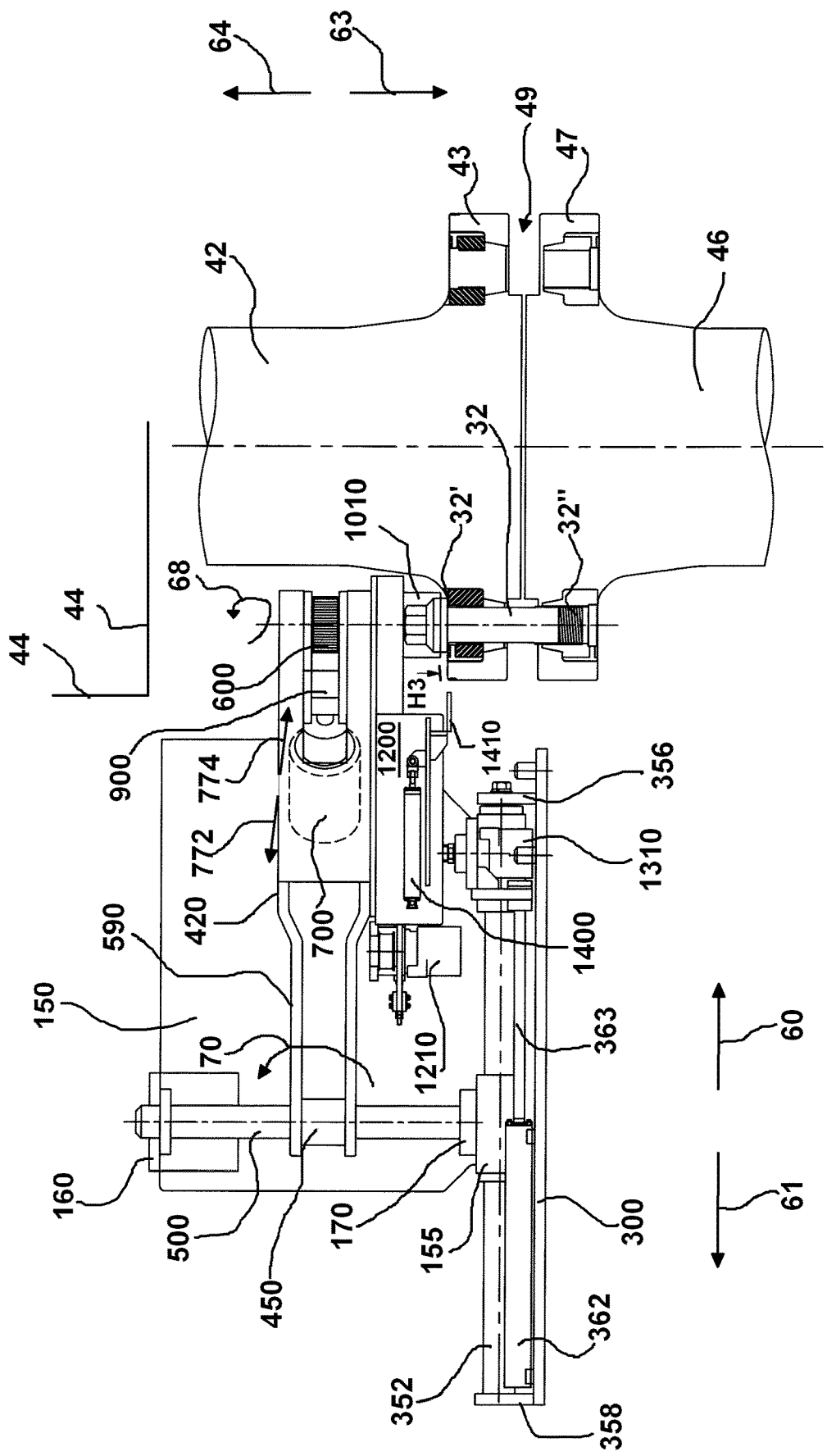

FIG. 16 is a schematic side view one of the torque stations 110 where the drive socket 1010 is located on bolt 32, bolt 32 has shoulder to shoulder contact with the upper flange 43, and the drive tip or socket 1010 is beginning the breakout process in high torque mode (arrows 772 and 774) so that the torque station 110 will go into the high torque mode with the drive gear 600.

Figure 17:
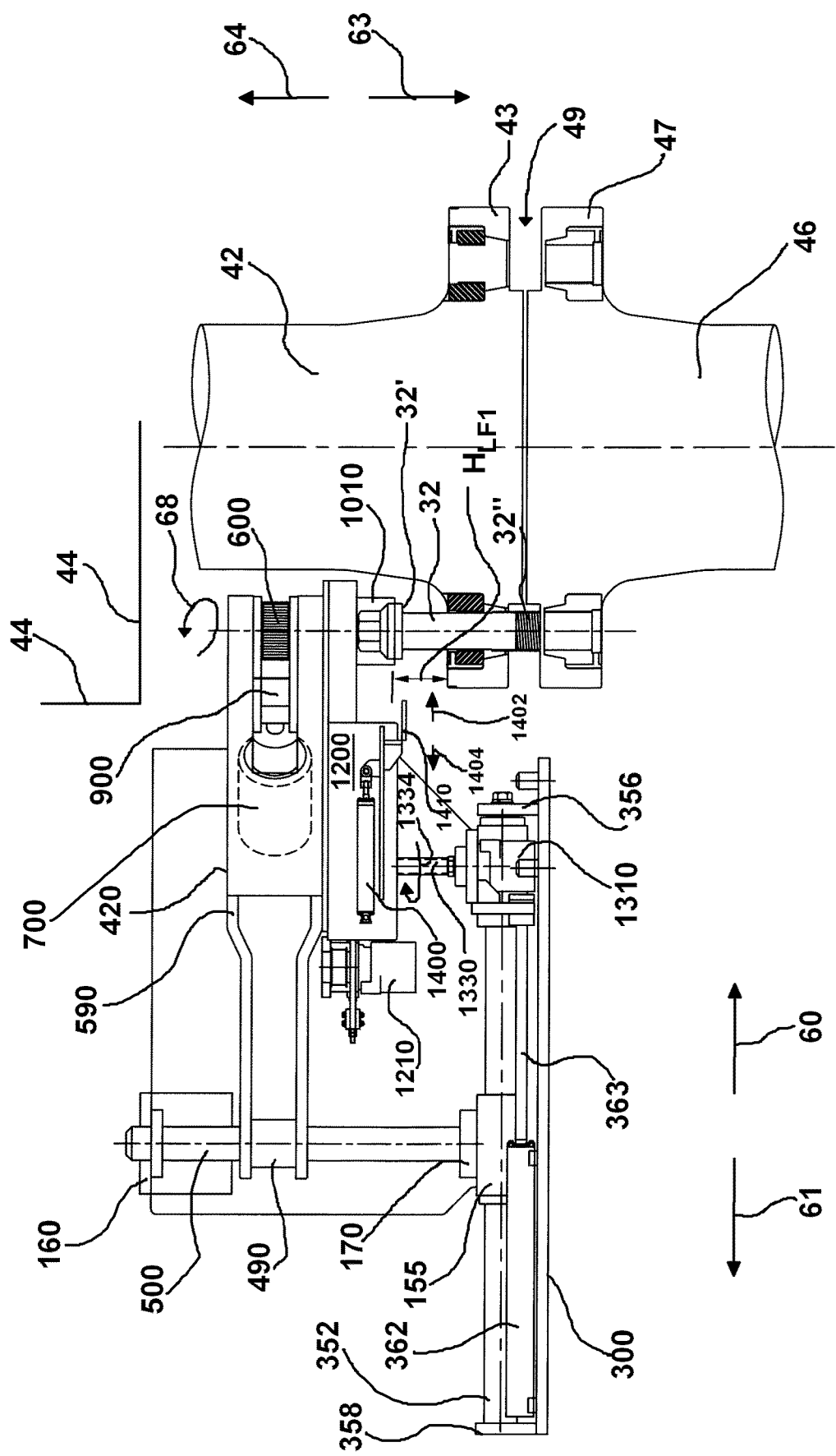

FIG. 17 is a schematic side view of torque station 110 where the drive tip or socket 1010 has partially broken out the bolt 32, spun out the bolt (arrow 68) to where a free spinning mode has been entered because the threads of the bolt 32 are in gap 49—between the threads in the upper 43 and lower 47 flanges. In this figure arrow 68 schematically indicates the spinning out of bolt 32.

Figure 18:
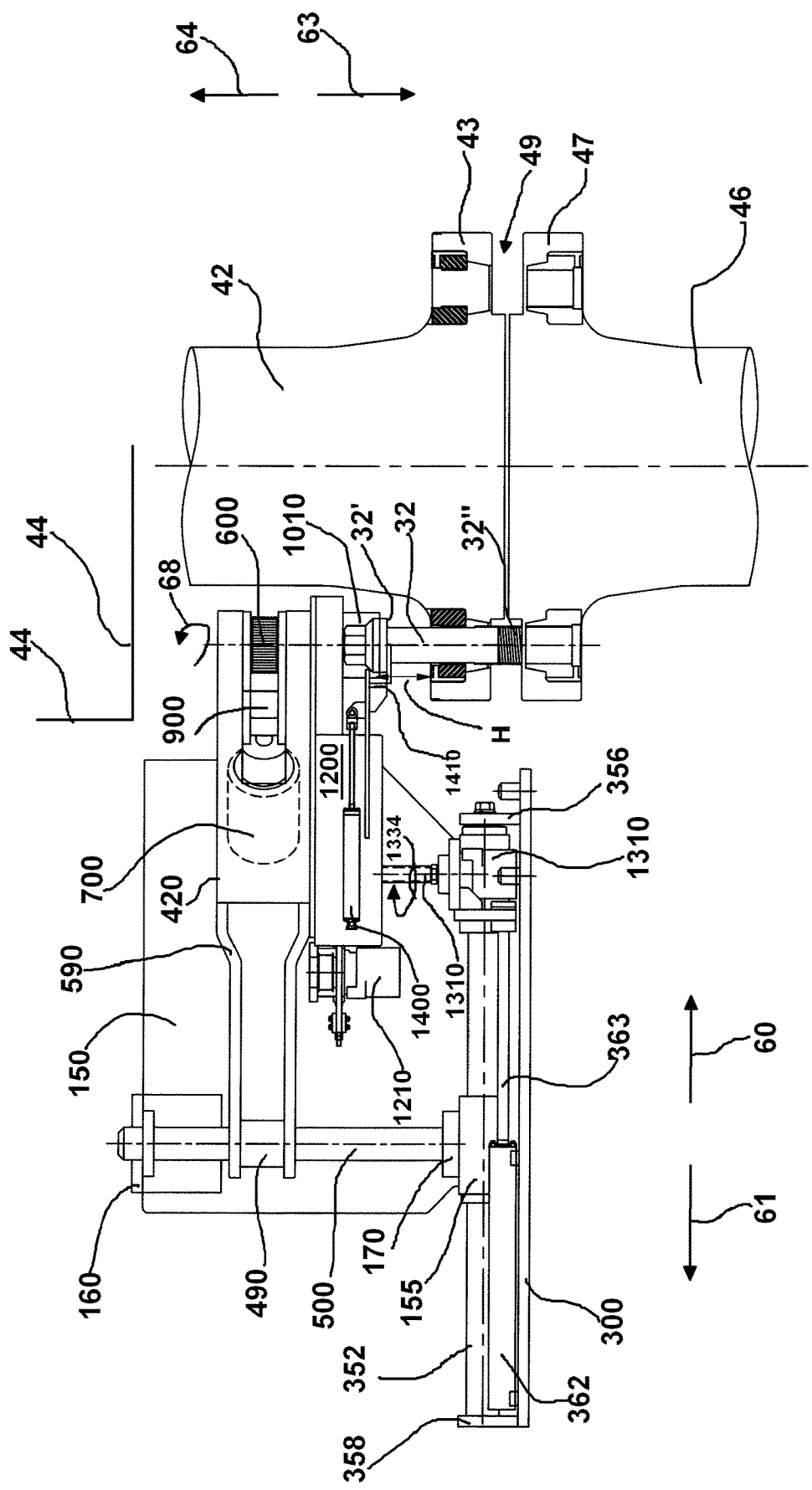

FIG. 18 is a schematic side view of torque station 110 where lifting fork 1400 has engaged the freely spinning bolt 32 (arrow 1402) and begun lifting (arrow 64) the bolt 32 so that its threads can engage the threaded portion of upper flange 43. In this figure arrow 68 schematically indicates the free spinning of bolt 32.

Figure 19:
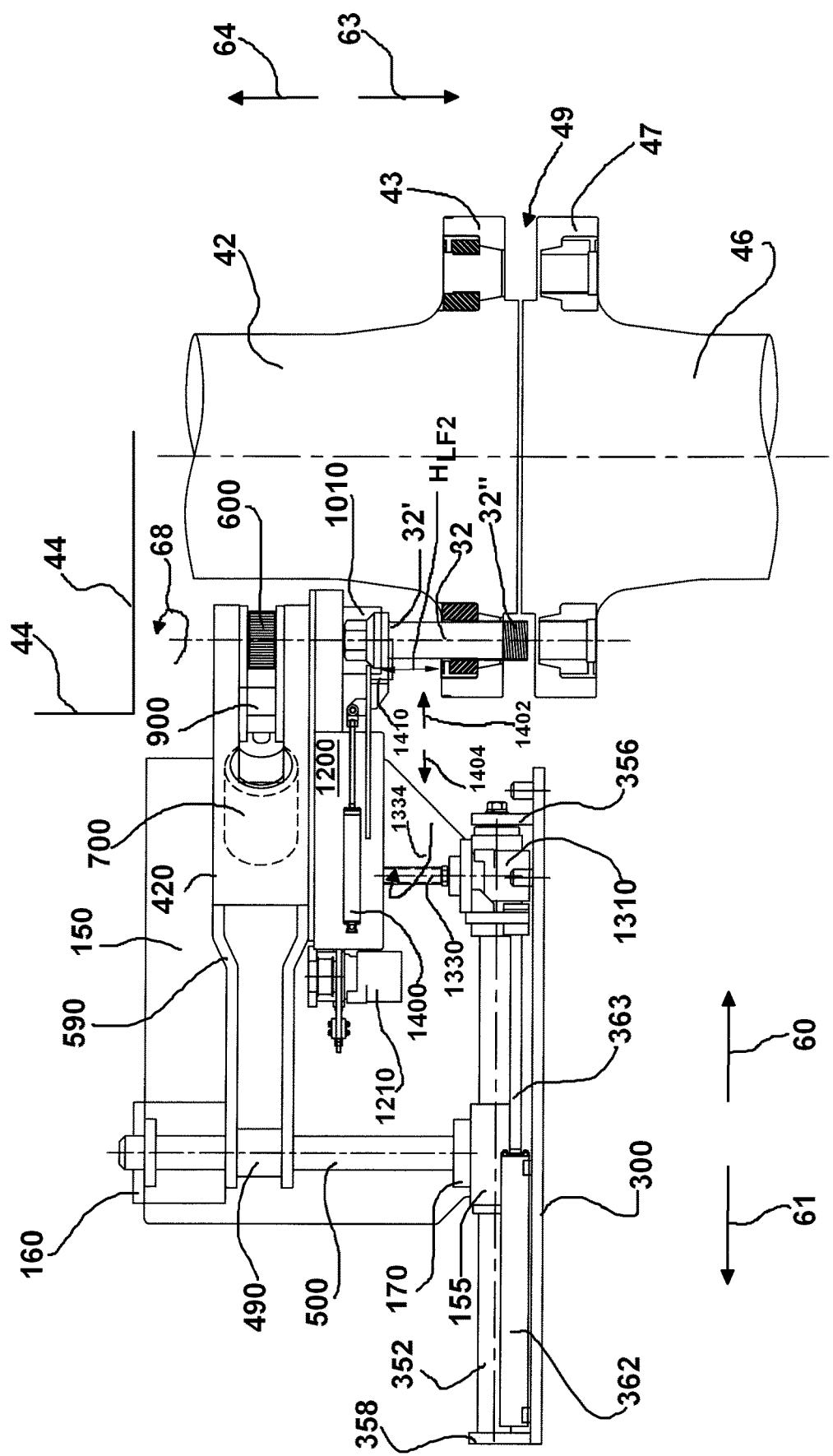

FIG. 19 is a schematic side view of torque station 110 where lifting fork 1400 has lifted (arrow 64) the bolt 32 enough to now engage the threaded portion of the upper flange 43, and the lifting fork can later retract. In this figure arrow 68 schematically indicates the spinning out of bolt 32.

Figure 20:
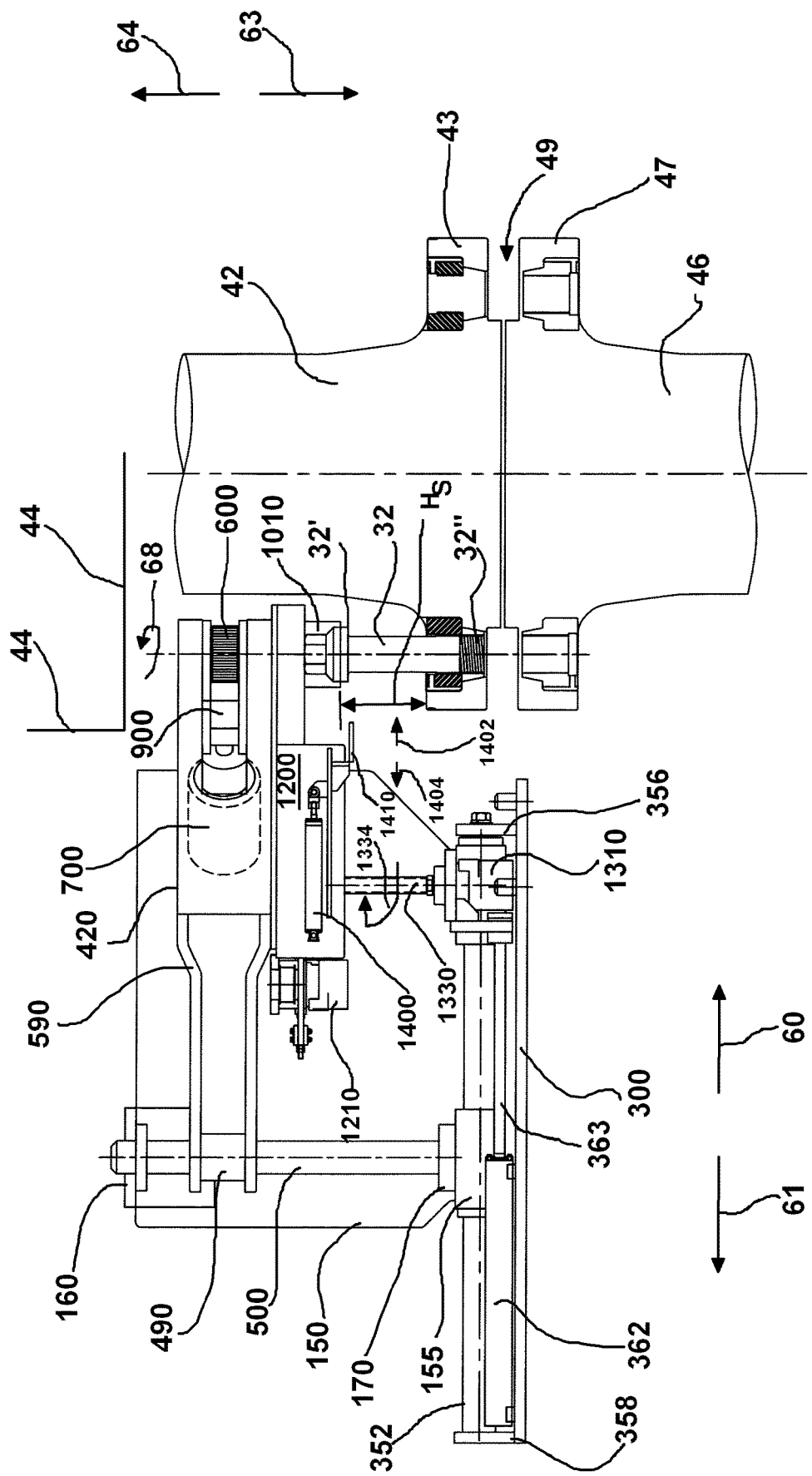

FIG. 20 is a schematic side view of torque station 110 where lifting fork 1400 has retracted (arrow 1404) and the bolt 32 has been additionally spun up (arrow 64) compared to its position in FIG. 19, and is now located in the bolt's vertical position for retrieval of the section riser 42 (H, or Hstorage). In this figure arrow 68 schematically indicates the final spinning out of bolt 32 to its storage position in flange 43.

Figure 21:
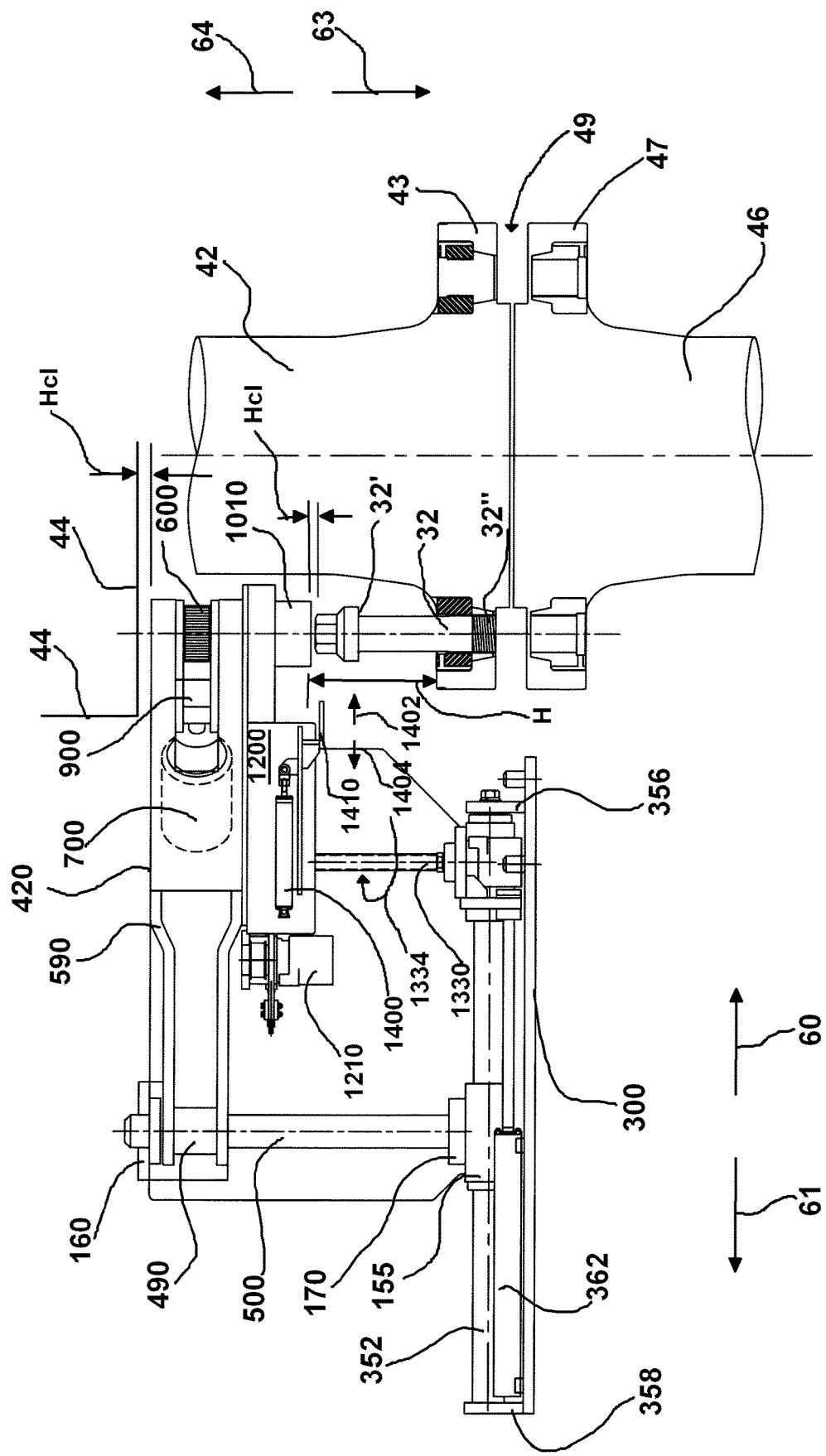

FIG. 21 is a schematic side view of the torque station 110 where the drive socket 1010 has stopped rotating and has been vertically (arrow 64) raised above the head of the bolt 32 ($H_{cl}$ or Hclearance). At this point the threaded portion of bolt 32 can be protected by flange 32 during storage. Also at this point there still is clearance under the floatation or insulation of the riser joint or section 42.

Figure 22:
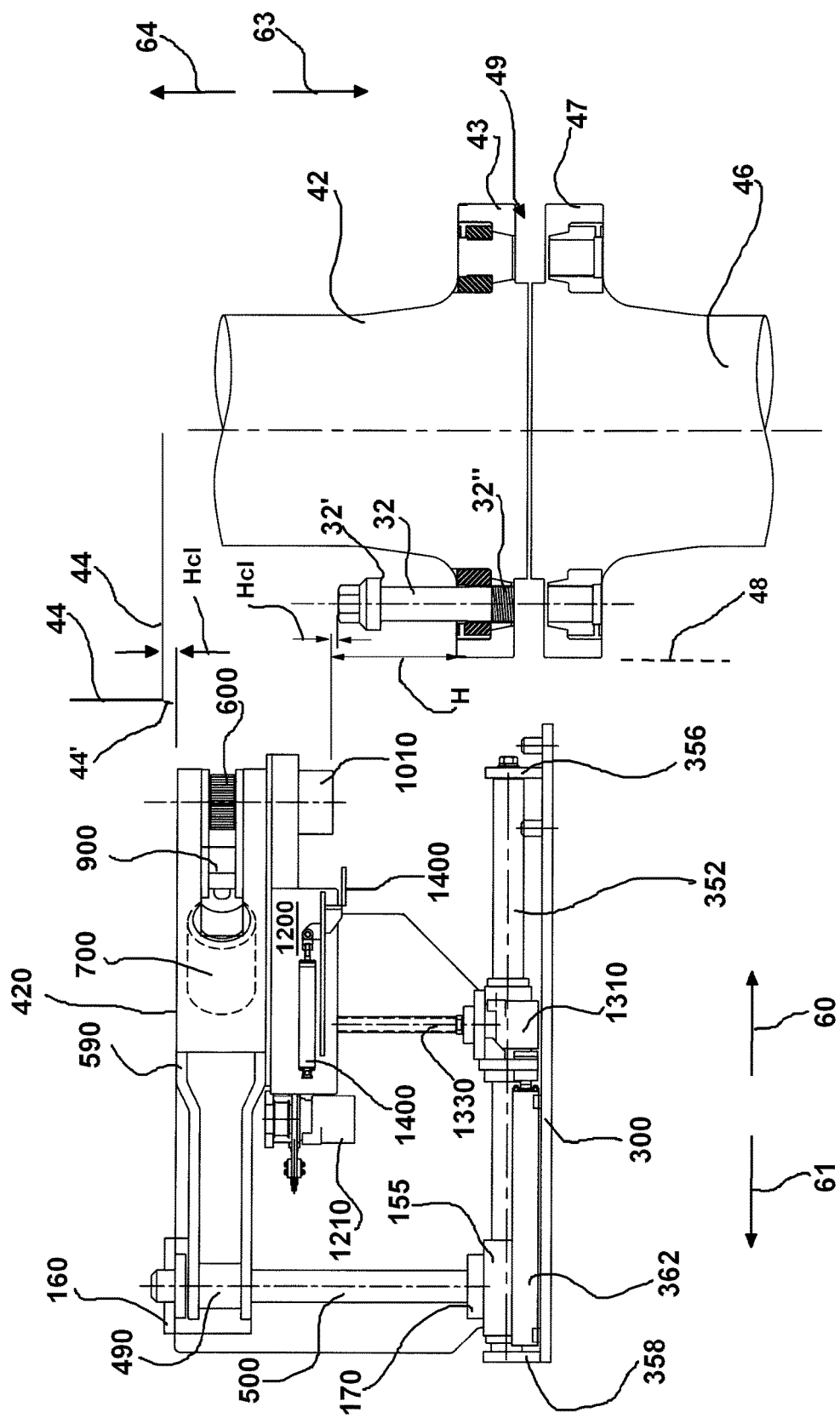
FIG. 22 is a schematic side view of the torque station of FIG. 13 where the driver socket is completely retracted both vertically and horizontally and ready for the start of the next break out cycle.

FIG. 22 is a schematic side view of torque station 110 where the drive tip or socket 1010 is completely retracted horizontally (arrow 61) and ready for the start of the next break out cycle.

In one embodiment (FIGS. 9 and 16) the height H to the driving tip or socket 1010 is positioned above the maximum height of the tightened head of bolt 32 to be loosened. Vertical positioning of driving tip or socket 1010 can be accomplished by using vertical lifting and lowering mechanism 1300. Horizontal positioning of driving tip or socket 1010 can be accomplished using adjustable sliding housing 140. In one embodiment both vertical and horizontal movement is accomplished simultaneously to reduce the amount of time before loosening can be started (and reduce the overall cycling time).

Risers 40 are made up of a plurality of riser sections 42, 46, etc) and typically come in standard sizes and specifications so that bolts 32 in a tightened condition will be at a known maximum height. Additionally, the maximum height of bolt 32 when loosened can be calculated. Accordingly, the minimum height H (FIG. 16) for driving tip or socket 1010 can be calculated relatively easily before loosening can begin. Additionally, the maximum height of the top of wrench 400 at the end of the loosening cycle should be below the bottom of the insulation or floatation 44 found on the riser 40 section being broken (otherwise the wrench 400 or torque station 110 could damage the insulation or floatation 44). The distance between the insulation or floatation 44 and the riser flange (e.g., flange 43 of upper riser section 42 shown in FIG. 9) typically is made to a specified distance and the maximum height can be easily determined. Although not shown in the drawings, in one embodiment a physical vertical limit is placed on the maximum height of high torque driver 590 to make sure that driver (or body 406 of wrench 400) does not rise above a specified level. In one embodiment this physical limit is a limiting brace on sliding housing 140.

Now the general method will be described for one embodiment in break out mode.

In the beginning all six modules (110A-F) are in the fully retracted position (horizontally in the direction of arrow 61 and vertically in the direction of arrow 64—which can be called the home position). Previous to body 140 extension, there can be a safety check to make sure that all six modules (110A-F) are in the home position before a make-up routine can be started. The home position can be both a module vertical home position (in the direction of arrow 64—which can be checked by the vertical height sensor 1350) along with a horizontal radially retracted home position (in the direction of arrow 60—which can be checked by a timing sequence using the body slide cylinders 362 and 364, such as retraction hydraulic pressure for a set period of time which can be 1, 2, 3, 4, 5, 6, 7, 8, 9, and 10 seconds of retraction pressure). Fully retracted positions can be controlled by fully retracted body slide cylinders 362 and 364, or by a retraction catch (e.g., rear plate 358), or a combination of the two. In one embodiment there can be an adjustable body retraction stop (e.g., limiter 359) for each body module (110A-F) in the retraction step.

Pressing the start button (e.g., located on control panel 80) for break-out causes all six modules (110A-F) to be radially extended (in the direction of arrow 60 by the body slide cylinders 362 and 364 extending) and causing the modules (110A-F) to radially extend (arrows 60A-F) such that the individual drive sockets (110A-F) will be positioned over the individual bolts (32A-F). Radial extension of modules (110A-F) occurs on both a timing along with a radial extension stop (e.g., extension adjusters 357 on front plate 356). In one embodiment there can be an adjustable body extension stop (357A-F) for each body module (140A-F) in the extension step. In one embodiment radial extension (in the directions of arrows 60A-F) can be checked by a timing sequence using the body slide cylinders (362A-F and 364A-F), such as extension hydraulic pressure for a set period of time which can be 1, 2, 3, 4, 5, 6, 7, 8, 9, and 10 seconds of extension pressure.

In one embodiment, during horizontal extension (in the directions of arrows 60A-F) of each of the body slide cylinders (362A-F and 364A-F), each of the drive sockets (1010A-F) can be lowered (in the direction of arrow 63). In one embodiment rotation of the drive sockets (1010A-F) at a first rotational speed (in the direction of arrow 68) begins when the individual drive socket (1010A-F) reaches a first vertical height (H1). In one embodiment, the first rotational speed can be lower than a second rotational speed during actual spin out of bolts (32A-F). In various embodiments the relative rotational speeds can be 5, 10, 15, 20, 25, 30, 35, 40, 45, 50, 55, 60, 65, 70, 75, 80, 85, 90, 95, and 100 percent of each other. In various embodiments the relative rotational speeds can be within a range of between any two of the above specified percentages. In one embodiment at the time of beginning rotation of the drive socket (110A-F) the horizontal body slide cylinders (362A-F and 364A-F) are hydraulically relaxed.

In one embodiment each drive socket 1010 is rotated at the first rotational speed (in the direction of arrow 68) until the drive socket 1010 reaches a second vertical height (H2 as shown in FIG. 15) at which time the high speed low torque motor 1200 is stopped and hydraulically relaxed. In one embodiment the second vertical height H2 is such that drive socket 1010 is about 1½, 1, or ½ inches over the bolt 32 head. At this same time vertical movement (in the direction of arrow 63) of the drive socket 1010 is stopped and the hydraulic motor 1310 driving the vertical positioning screw 1330 is hydraulically relaxed for a set period of time. In one embodiment the set period of time can be ½, ¾, 1, 1½, 2, 3, 4, and 5 seconds. In various embodiments the set period of time can be within a range of between any two of the above set periods of time.

In one embodiment, after the set period of time, the vertical positioning screw 1300 attempts to move the drive socket 1010 to a third vertical height H3 and holds the drive socket 1010 at this height H3. In one embodiment H3 is about 1½, 1, or ½ inches in the direction of arrow 63 compared to H2.

In one embodiment if the third vertical height H3 of drive socket 1010 is not achieved within a set period of time at a particular torquing station, at least one locating high torque stroke (schematically indicated by arrows 772 and 774 in FIG. 15) is made on the drive socket 1010 to assist in locating the drive socket 1010 on the bolt 32 head and a further check on the vertical height of the drive socket 1010 is made to determine engagement of the bolt 32 head by the drive socket 1010. In one embodiment the vertical positioning screw 1300 continues to attempt to pull down (in the direction of arrow 63) the drive socket 1010 while the locating high torque stroke is made. In one embodiment the set period of time can be ½, ¾, 1, 1½, 2, 3, 4, and 5 seconds. In various embodiments the set period of time can be within a range of between any two of the above set periods of time.

In one embodiment after the first iteration of the locating drive stroke is made and the locating high torque stroke is not achieved for the drive socket 1010, a second iteration of locating drive stoke is made and the vertical height (H) of the drive socket 1010 is checked to determine if the drive socket has dropped to height H3 (and been properly located on the bolt 32 head). In various embodiment multiple iterations of locating high torque strokes can be made along with checks of the vertical heights of the drive socket 1010, until engagement of the bolt 32 head is determined. In one embodiment the vertical positioning screw 1300 continues to attempt to pull down the drive socket 1010 while the locating high torque stroke is made. In various embodiments, before each locating high torque stroke is made, vertical movement of the drive socket 1010 is stopped. In one embodiment the vertical control system is also relaxed before each locating high torque stroke is made. In various embodiments, before each locating high torque stroke is made, rotation of the drive socket 1010 is stopped. In one embodiment the high speed rotational motor 1310 is also relaxed before each locating high torque stroke is made. In various embodiments, before each locating high torque stroke is made, the radial positioning system (362 and 364) for the drive socket 1010 is also relaxed. In one embodiment, a warning signal is sent if one or more torquing stations are not able to be located on their respective bolt head within a set period of time (i.e., step "d"), or within a set number of high torque locating strokes.

In one embodiment at the time the vertical positioning screw 1300 is stopped, the drive socket 1010 enters a high torque break-out mode (using high torque driver 590) and schematically indicated in FIG. 16. In one embodiment the high torque mode is cycled (strokes of wrench 400) for a set number of stroking cycles. In one embodiment the set number of cycles can be 1, 2, 3, 4, 5, 6, 7, 8, 9, 10, 11, 12, 13, 14, 15, 16, 17, 18, 19, 20, 21, 22, 23, 24, 25, 30, 35, 40, 45, and 50. In various embodiments the set number of cycles can be within a range of between any two of the above set number of cycles. In one embodiment after its last cycle, the high torque system (piston 740 and rod 750) fully retracts. In one embodiment full retraction is determined by a timing sequence using the high torque hydraulic cylinder, such as extension hydraulic pressure for a set period of time which can be ½, ¾, 1, 1½, 2, 3, 4, and 5 seconds. In various embodiments the set period of time can be within a range of between any two of the above set periods of time.

In one embodiment each of the drive sockets (1010A-F) are started in the high torque mode simultaneously. In this embodiment proper location of each of the six drive sockets is made (FIGS. 15 to 16) before the high torque break out mode for any one of the drive sockets is started.

In one embodiment the high torque mode is switched to low torque mode after a specified lower back pressure is achieved on the high torque system 590. In one embodiment a check can be made on the low torque high speed system 1200 to see if it stalls when breaking out the bolt 32. In one embodiment the stalling condition is determined based on reaching a specified back pressure for the motor 1210. In one embodiment the stalling condition is determined upon falling below a specified flow rate through the motor 1210.

In one embodiment during the high torque breakout mode the drive socket 1010 is not moved vertically upward (in the direction of arrow 64) by vertical screw 1330. Instead, in this embodiment vertical movement (in the direction of arrow 64) of the drive socket 1010 is taken up by a vertical angular turning (in the direction of arrow 70) of the torque wrench body 590. In one embodiment this differential vertical angular turning of the torque wrench body 590 is relieved when the bolt 32 leaves the threads of the lower flange 47, and is located in the gap 49 between the upper 43 and lower 47 flanges, and is being raised by the lifting fork 1410. In one embodiment the arms of the lifting fork 1410 are located a set distance below the tip of the drive socket (1010A-F). In one embodiment the set distance is about ¼, ⅜, ½, ⅝, ¾, ⅞, 1, 1¼, 1⅜, 1½, 1⅝, 1¾, 1⅞, 2 inches. In various embodiments the set distance can be about within a range of between any two of the above specified distances.

In one embodiment the switch from high torque to low torque modes for each of the modules (110A-F) are done simultaneously. In one embodiment the switch is individually done for each of the modules.

In one embodiment the rate of vertical movement (in the direction of arrow 64) of each drive socket 1010 remains constant during vertical lifting (in the direction of arrow 64).

In one embodiment the rotational speed (in the direction of arrow 68) of the drive socket 1010 remains constant during vertical lifting (in the direction of arrow 64).

In one embodiment a set vertical height ($H_{L1}$ shown in FIG. 17) the lifting fork 1410 is extended (in the direction of arrow 1402). In one embodiment full extension of the lifting fork 1410 is determined by a timing sequence using the lifting fork hydraulic cylinder(s) 1440, such as extension hydraulic pressure for a set period of time which can be ½, ¾, 1, 1½, 2, 3, 4, and 5 seconds. In various embodiments the set period of time can be within a range of between any two of the above set periods of time.

In one embodiment the lifting fork 1410 remains extended until the drive socket 110A-F) reaches a second vertical height in the direction of arrow 64 (HLF$_2$ shown in FIG. 18) at which height the lifting fork 1410 is retracted (in the direction of arrow 1404). In one embodiment full retraction of the lifting fork 1410 is determined by a timing sequence using the lifting fork hydraulic cylinder(s) 1440, such as by retraction hydraulic pressure for a set period of time which can be ½, ¾, 1, 1½, 2, 3, 4, and 5 seconds. In various embodiments the set period of time can be within a range of between any two of the above set periods of time.

In one embodiment rotation of the drive socket 1010 in the direction of arrow 68 is stopped simultaneously with the start of retraction (in the direction of arrow 1404) of the lifting fork 1410.

In one embodiment after start of retraction (in the direction of arrow 1404) of the lifting fork 1410, the drive socket 1010 is sent to a home position for retracted vertical (in the direction of arrow 64) and retracted horizontal (in the direction of arrow 61) positioning.

In one embodiment the retraction in a vertical mode (raising drive socket 1010 in the direction of arrow 64) is achieved before the start of retraction in a horizontal mode (in the direction of arrow 61). In one embodiment the drive socket 1010 is not spun either in high speed or in high torque during retraction. In one embodiment retraction vertically (in the direction of arrow 64) is checked by a vertical height sensor 1350. In one embodiment retraction horizontally (in the direction of arrow 61) is by a pre-set time period. The horizontal radially retracted home position can be checked by a timing sequence using the body slide cylinders (362 and 364), such as retraction hydraulic pressure for a set period of time which can be 1, 2, 3, 4, 5, 6, 7, 8, 9, and 10 seconds of retraction pressure. In various embodiments the set period of time can be within a range of between any two of the above set periods of time. Fully retracted positions can be controlled by fully retracted body slide cylinders, or by a retraction catch, or a combination of the two. In one embodiment there can be an adjustable body retraction stop 358 (e.g., adjustment screws 359) for each body module 140 in the retraction step.

In one embodiment the broken out riser joint 42 is removed, and the remaining riser string (lower riser joints 46 etc.) is raised until a new flange is revealed to be broken out. In one embodiment the above specified steps are repeated for newly revealed flange connection between two riser joint sections.

In one embodiment the above specified steps are repeated until the length of riser has been removed.

Tightening or Make Up Sequence

Various additional embodiments are described below for the make up mode.

In one embodiment (FIGS. 5 and 6) the height H to the driving tip or socket 1010 is such that it is positioned above (giving a clearance Hcl) the maximum height of the non-tightened head of bolt 32 which will be tightened by wrench 110.

Vertical positioning of driving tip or socket 1010 can be accomplished by using vertical lifting and lowering mechanism 1300 which includes elevator 1200. Horizontal positioning of driving tip or socket 1010 can be accomplished using adjustable sliding housing 140 and control cylinders 362 and 364.

Risers 40 are made up of a plurality of riser sections 42, 46, etc., and typically come in standard sizes and specifications so that bolts 32 in a non-tightened condition will be at a known maximum height. Accordingly, the minimum height H (FIGS. 5 and 6) for driving tip or socket 1010 can be calculated relatively easily. Additionally, the maximum height of the top of wrench 400 should be below the bottom of the insulation found on the riser section being make up (otherwise the wrench 400 could damage the insulation). The distance between the insulation and the riser typically is made to a specified distance and the maximum height can be easily determined.

Driving tip or socket 1010 can be moved horizontally in the direction of arrow 60 until driving tip or socket 1010 is directly over the head of bolt 32.

Vertical lifting and lowering mechanism 1300 (with elevator 1400) can begin to lower driving tip or socket 1010 downward in the direction of arrow 63.

For tightening driving tip or socket 1010 is turned clockwise in the direction of arrow 66.

Initially, turning in the direction of arrow 66 can be at a relatively slow speed until driving tip or socket 1010 engages the head of bolt 32.

After engagement the speed of driving tip or socket 1010 can be increased using the high speed/low torque driver 1200 to initially tighten bolt 32.

As bolt 32 is tightened it will move vertically downward (in the direction of arrow 63). To compensate for such downward movement, vertical lifting and lowering mechanism 1300 can also lower wrench 400. The amount of lowering of wrench 400 (and drive tip or socket 1010) can be calculated based on the rotational speed with which bolt 32 is being turned by driver tip or socket 1010. Because the pitch of bolt 32 will be known, the amount of vertical movement can be calculated once the rotational speed of bolt 32 is known. The rotational speed of bolt 32 can be approximated by the nominal rotational speed of the high speed/low torque driver 1200 (which this controls) or the low speed/high torque driver 590 (when this controls). In this manner engagement between driver tip or socket 1010 can be achieved during the entire tightening process. In one embodiment a height sensor 1350 can be used which tracks movement of elevator 1300 (and therefore drive tip or socket 1010).

In one embodiment motor 1310 can be set to rotate lifting screw 1330 such that lifting screw 1330 tends to move housing 1230 (and driver tip or socket 1010) more rapidly downwardly in the direction of arrow 63 than bolt 32 (being tightened by tip 1010) moves downwardly. In this embodiment, when bolt 32 does not drop as fast as lifting screw 1330 attempts to move downwardly housing 1230 of high speed/low torque driver 1200, the head of bolt 32 will prevent tip 1010 (and housing 1230) from being moved downward in the direction of arrow 63, and motor 1310 of vertical lifting and lowering mechanism will stall based on the resistance to screw 1330 trying to pull down housing 1230 when bolt 32 and tip 1010 is holding up housing 1230—at least until bolt 32 is tightened enough (i.e., rotated by tip 1010) to allow tip 1010 and housing 1230 to also move downwardly in the direction of arrow 63 thereby freeing motor 1310 to again start turning screw 1330 and lowering housing 1230 and tip 1010. It is anticipated that repetitive "cycles" of starting and stalling of motor 1310 during this torquing down sequence of bolt 32 will be seen.

In various commercially available riser constructions, the bolt 32 is not completely threaded from its tip to its head and there exists a non-threaded portion. With these non-completely threaded bolts and risers there will exist during a part of the tightening process where the entire threaded portion of bolt 32 is between the threaded portions of the threaded portions of upper and lower riser sections 42 and 46. At this point the bolt 32 will freely drop an amount (approximately one inch) until it engages the threaded portion of the lower riser section 46. To address this partial free fall, driver tip or socket 1010 can have an excess socket depth so that when bolt 32 experiences such free fall, the head of bolt 32 is still retained (albeit by an amount less than the free fall), but a sufficient amount so that proper engagement can be continued during the remainder of the tightening process. Immediately, after engagement of bolt 32 with the lower riser section 44 only a small amount of torque will be needed.

During the tightening of bolt 32 in the flange 47 of lower riser section 46, the free fall distance of the bolt 32 could be made up by wrench 400 using vertical lifting and lowering mechanism 1300 lower driving tip or socket 1010. This can be done either by having wrench 400 lowered at a faster rate then bolt 32 is being moved downward by tightening. Alternatively, a lowering step of wrench 400 could be used where mechanism 1300 lower wrench 400 a distance (e.g., the free fall distance of bolt 32) while driving tip or socket 1010 is not rotating (or rotating at a very slow speed).

Typically, even after bolt 32 engages the threaded portion of flange 47 of lower riser section 46, the low torque portion of wrench 400 can continue to tighten bolt 32 (and the high torque portion will not be needed) until shoulder to shoulder contact is achieved between the head of bolt 32 and the flange 43 of the upper riser section 42.

In one embodiment the wrench 400 switches to high torque based on the height of drive socket 1010. In one embodiment, when ever a high torque portion is needed (e.g., the driving torque for bolt 32 exceeds the recommended torque for low torque driving portion), wrench 400 can transition from the low torque to the high torque driver. In one embodiment, wrench 400 can switch from low torque to high torque (and vice versa) as many times and as frequently as needed by bolt 32. For example, there may be some debris in the threaded portion of flange 43 of upper riser section 42 which increases the amount of torque required to turn bolt 32. If this occurs then wrench 400 can transition to the high torque portion and turn bolt 32 until the debris is cleared at which time the torque required to drive bolt 32 decreases and wrench 400 transitions back to the low torque driver such as until shoulder to should contact between bolt 32 and riser section is achieved when again wrench 400 transitions to the high torque portion to complete the tightening process.

Driving tip or socket 1010 can be continued to be turned in the direction of arrow 66 (moving bolt 32 in the direction of arrow 63) until a specified height is achieved of drive tip 1010 (such height approximating shoulder-to-shoulder contact between the head of bolt 32 and the flange 43 of the upper riser section 42). After this point a higher torque is expected to be required in making up bolt 32 and the high torque/low speed portion of wrench 400 can take over rotating driver tip or socket 1010 in the direction of arrow 66 thereby torquing down bolt 32 until the desired torque is achieved.

After the desired "make up" torque on bolt 32 is achieved driver tip or socket 1010 can be disengaged from bolt 32 where vertical lifting and lowering mechanism 1300 raises driver tip or socket 1010 (in the direction of arrow 64) and driver tip or socket 1010 is also moved horizontally in the direction of arrow 61 so that none of the components of wrench 400 will fall within a hypothetical cylinder extending from the outside of the flanges 43, 47 of upper and lower riser sections 42 and 46. To decrease cycling time driver tip or socket 1010 can be moved horizontally in the direction of arrow 61 shortly after it clears the head of bolt 32 (compared to raising wrench 400 to its maximum height before horizontal movement in the direction of arrow 61 is started).

After adequate clearance between riser 40 and wrench 110 is achieved (such as when torque modules 110A-F have been completely retracted), the riser sections are lowered so that a new riser section is placed on previously upper riser section 46 (and now riser section 46 becomes the new lower riser section and the newly placed riser section becomes the new upper riser section), and the making up process begins again using the above referenced steps.

It is expected that the entire cycle time from first starting the torque wrench 110 in the direction of arrow 60, tightening bolts 32, and moving torque wrench out of the way and ready for the next tightening cycle will be less than three minutes. In various embodiments the entire cycle time from the start of a tightening sequence for all six bolts on a single flange level to completion of tightening sequence on the flange level is less than about 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, and/or 360 seconds. In various embodiments a range between about any to of the above referenced times can be used. In various embodiments these timing limits can be maintained for greater than 5, 10, 15, 20, 30, 40, 50, 60, and more flange levels in installing or tripping in the riser string.

Loosening or Break Out Sequence

Various additional embodiments are described below for the break out mode.

Driving tip or socket 1010 can be moved horizontally in the direction of arrow 60 until driving tip or socket 1010 is directly over the head of bolt 32.

Driving tip or socket 1010 can be turned in the direction of arrow 68 (i.e., counter-clockwise) for loosening. Vertical lifting and lowering mechanism 1300 can lower driving tip or socket 1010 downward in the direction of arrow 63.

Initially, turning in the direction of arrow 68 can be at a relatively slow speed until driving tip or socket 1010 engages the head of bolt 32. Typically, after engagement a high torque will be needed to break out shoulder to shoulder contact between the head of bolt 32 and the flange 43 of the upper riser section 42.

In one embodiment the high torque/low speed portion of wrench 400 is prevented from operating until a desired minimum height of driving tip or socket head 1010 is achieved. This embodiment can resist stripping out of the head of bolt 32. In this embodiment the driving tip or socket 1010 can be turned slowly at a low torque until the desired minimum depth of engagement between driving tip or socket 1010 and bolt 32 is achieved.

With adequate engagement between driving tip or socket 1010 and bolt 32, the high torque/low speed portion of wrench 400 can be used to "break out" bolt 32 from its shoulder to shoulder engagement. Typically a high torque mode is required for this initial "break out" During the high torque mode wrench 400 rotates driving tip or socket 1010 in the direction of arrow 68 (moving bolt 32 in the direction of arrow 64) until shoulder-to-shoulder contact is relieved/removed between the head of bolt 32 and the flange 43 of the upper riser section 42.

Shortly after breaking out the shoulder to shoulder contact, it is expected that a lower torque will be required to continue turning bolt 32 in the direction of arrow 68, and the high speed/low torque driver 1200 can take over loosening of bolt 32. Additionally, the high speed/low torque driver 1200 can turn bolt 32 rotationally faster compared to the high torque/low speed portion of wrench 400.

As bolt 32 is loosened it will move vertically upward (in the direction of arrow 64). To compensate for such upward movement, vertical lifting and lowering mechanism 1300 can also raise wrench 400. The amount of raising of wrench 400 (and driver tip or socket 1010) can be calculated based on the rotational speed with which bolt 32 is being turned by driver tip or socket 1010. Because the pitch of bolt 32 will be known, the amount of vertical movement can be calculated once the rotational speed of bolt 32 is known. In this manner engagement between driver tip or socket 1010 and bolt 32 can be maintained during the entire loosening process.

In various commercially available riser constructions, the bolt 32 is not completely threaded from its tip to its head and there exists a non-threaded portion. With these non-completely threaded bolts and risers there will exist during a part of the loosening process where the entire threaded portion of bolt 32 is between the threaded portions of the threaded portions of upper and lower riser sections 42 and 46. At this point the bolt 32 will "freely spin" and no longer rise. In one embodiment the "break out" portion is completed once the "free spin" condition is reached because bolt 32 no longer threadably connects upper and lower riser sections. However, if bolt 32 is left in the "free spin" state its threads can be damaged when riser section 42 is moved and relocated. Accordingly, it is preferred that bolt 32 is continued to be unloosed until it threads into upper riser section 42 so that the threads of bolt 32 will be protected. To address the "free spin" condition of bolt 32, lifting fork 1400 can be used to lift bolt 32 until bolt 32 starts threading into the threaded portion of the upper riser section 42. Lifting fork 1400 can move in the direction of arrow 1402 until fork 1400 engages the head of bolt 32. Lifting fork 1400 and wrench 1400 can continue to be raised by vertical lifting and lowering mechanism 1200 until the threaded portion of bolt 32 begins to engage the threaded portion of the upper riser section 42. To address this partial free spinning state of bolt 32 and re-engagement with the upper riser section, driver tip or socket can be slowed to avoid cross threading the upper riser section 42. Immediately, after engagement of bolt 32 with the upper riser section 42 only a small amount of torque will be needed.

Driver tip or socket 1010 continues to loosen bolt 32 until a desired position for a "state of breakout" is obtained for bolt 32. After the desired state of breakout is for bolt 32 is achieved driver tip or socket 1010 is disengaged from bolt 32 where vertical lifting and lowering mechanism 1300 raises driver tip or socket 1010 in the direction of arrow 64 and driver tip or socket 1010 is also retracted or moved horizontally in the direction of arrow 61 so that none of the components of wrench 400 will fall within a hypothetical cylinder extending from the outside of the flanges 43, 47 of upper and lower riser sections 42 and 46.

After clearance is achieved from the upper riser section 42 is removed and lower riser section raised so that a new riser section is seen connected to previously lower riser section 46 (and now riser section 46 becomes the new upper riser section and the newly raised riser section becomes the new lower riser section), and the breaking out process begins again using the above referenced steps.

It is expected that the entire cycle time from first starting the torque wrench 110 in the direction of arrow 60, loosening bolt 32, and moving torque wrench out of the way and ready for the next loosening cycle will be less than sixty seconds.

In one embodiment motor 1310 can be set to rotate lifting screw 1330 at a slower rate such that lifting screw 1330 tends to move housing 1230 (of high speed/low torque driver 1200) upwardly a little more slowly in the direction of arrow 64 than bolt 32 (being loosened by tip 1010) tends to move upwardly tip 1010 and housing 1230. In this embodiment, when bolt 32 rises faster than lifting screw 1330 attempts to move up housing 1230, the head of bolt 32 will push tip 1010 (and housing 1230) upward in the direction of arrow 64, tending to cause screw 1330 to also rotate faster, turning and speeding up motor 1310 to catch up to the height of bolt 32. In this embodiment it is anticipated that the threading of screw 1330 will not lock up with the interconnecting threading for housing 1230.

In one embodiment motor screw 1330 can be turned at a rotational speed which will approximate the vertical lift of bolt 32. If screw 1330 is actually turning faster and causing driver tip or socket 1010 to move upwardly (in the direction of arrow 64) faster than bolt 32 is moving, driver tip or socket 1010 has enough excess socket depth compared to the head of bolt 32 that driver tip socket 1010 will maintain adequate contact with the head of bolt 32 during the entire upward movement of bolt 32. For example, the head of bolt 32 may have a nominal head depth of 3⅜ inches so that when driver tip or socket 1010 is fully placed on the head of bolt 32 3⅜ inches of head will be inside of driver tip or socket 1010. If during the lifting cycle screw 1330 raises housing 1230 (and driver tip or socket 1010) an extra 1 or 2 inches compared to the height in which bolt 32 is raised, 2⅜ or 1⅜ inches of the head of bolt 32 will still remain in driver tip or socket 1010.

It is expected that the entire cycle time from first starting the torque wrench 110 in the direction of arrow 60, loosening bolt 32, and moving torque wrench out of the way and ready for the next loosening cycle will be less than sixty seconds. In various embodiments the entire cycle time from the start of a loosening sequence for all six bolts on a single flange level to completion of loosening sequence on such flange level is less than about 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, and/or 360 seconds. In various embodiments a range between about any to of the above referenced times can be used. In various embodiments these timing limits can be maintained for greater than 5, 10, 15, 20, 30, 40, 50, 60, and more flange levels in retrieving tripping out the riser string.

Initial Engagement Between Driver and Head of Bolt

After driver or socket head 1010 has been placed directly over bolt 32 such that the centerline of rotation of driver or socket 1010 lines up with the center of rotation of bolt 32, there may still be a non-alignment between the driving portions of driver or socket 1010 and the driven portions of the head of bolt 32. There is a risk (albeit small) that rotating at such a high speed when initial contact between driver or socket 1010 and the head of bolt 32 will damage one or both if the driving surfaces of both are not properly aligned during first contact.

Accordingly, in one embodiment an alignment sequence can be used to facilitate initial engagement with driver or socket head 1010 and bolt 32 where the effective rotational speed of driver or socket 1010 is substantially reduced. Normal high speed rotational speed of high speed/low torque driver 1200 can exceed about 100 revolutions per minute, e.g., about 100, 105, 110, 115, 120, 125, 130, 135, 140, and 150 revolutions per minute. The alignment sequence can include high speed/low torque driver 1200 turning driver or socket 1010 at a relatively low speed until proper engage is achieved. This low alignment speed can be less than an average of 50, 45, 40, 35, 30, 35, 30, 25, 20, 15, 10, 9, 8, 7, 6, 5, 4, 3, 2, and/or 1 revolution per minute.

The slower alignment speed with high speed/low torque driver 1200 can be achieved by controlling the speed of motor 1210, such as by placing motor 1210 in a low speed phase.

Additionally, the slower alignment speed with high speed/low torque driver 1200 can be achieved by only intermittently supplying pressurized hydraulic fluid to motor 1210 (or supplying pressurized hydraulic fluid in spurts). Another option is to make motor 1210 a variable speed motor. Such an engagement mode can be maintained until a proper engagement between driver or socket 1010 with bolt 32.

Proper engagement can be determined using a variety of means such as: (a) calculating a vertical movement of driver or socket head 1010 and/or measuring resistance to additional vertical dropping of driver or socket head 1010 when driver or socket head is restrained from additional dropping by the bolt head; (b) measuring backpressure in the hydraulic pressure of to motor 1210; and/or (c) measuring resistance to vertical dropping of driver or socket head 1010 (and connected wrench 400).

In one embodiment the effective vertical height of the head of bolt 32 is 3⅜ inches. In one embodiment a vertical drop of driver or socket 1010 a specified amount (e.g., 1, 1½, 2, 2½, 3, 3½, and/or 4 inches)(or 10, 20, 30, 40, 50, 60, 70, 80, 90, 95, and 100 percent or the depth of the head of bolt 32) over the head of bolt 32 is determined to be effective engagement and high speed/low torque driver 1200 can increase to its normal high rotational speed mode.

In one embodiment changes in the back pressure to motor 1210 can be used to determined proper engagement. It is anticipated that resistance to the turning of driver or socket 1010 will vary before proper engagement (where the driving faces of both driver or socket 1010 and the driven faces of the head of bolt 32) meet compared to driver or socket merely spinning on top of the head of bolt 32. This difference in back pressure can be used to determine proper engagement.

In one embodiment changes in backpressure to motor 1310 of vertical lifting and lowering mechanism can be used to determine proper engagement. If proper engagement is not obtained between driver or socket 1010 and bolt 32 (where the driving faces of both driver or socket 1010 and the driven faces of the head of bolt 32), bolt 32 will resist downward movement of wrench 400 and increase resistance to vertical lifting and lowering mechanism 1300, which can cause motor 1310 to stall. This difference in back pressure can be used to determine proper engagement.

In one embodiment one or more (or all three) of the above means can be used to determine proper engagement.

In various embodiments the above referenced initial engage steps can be used in both the make up and break out sequences.

Schematic Diagrams for Components and Hydraulic Flow

Figure 45:
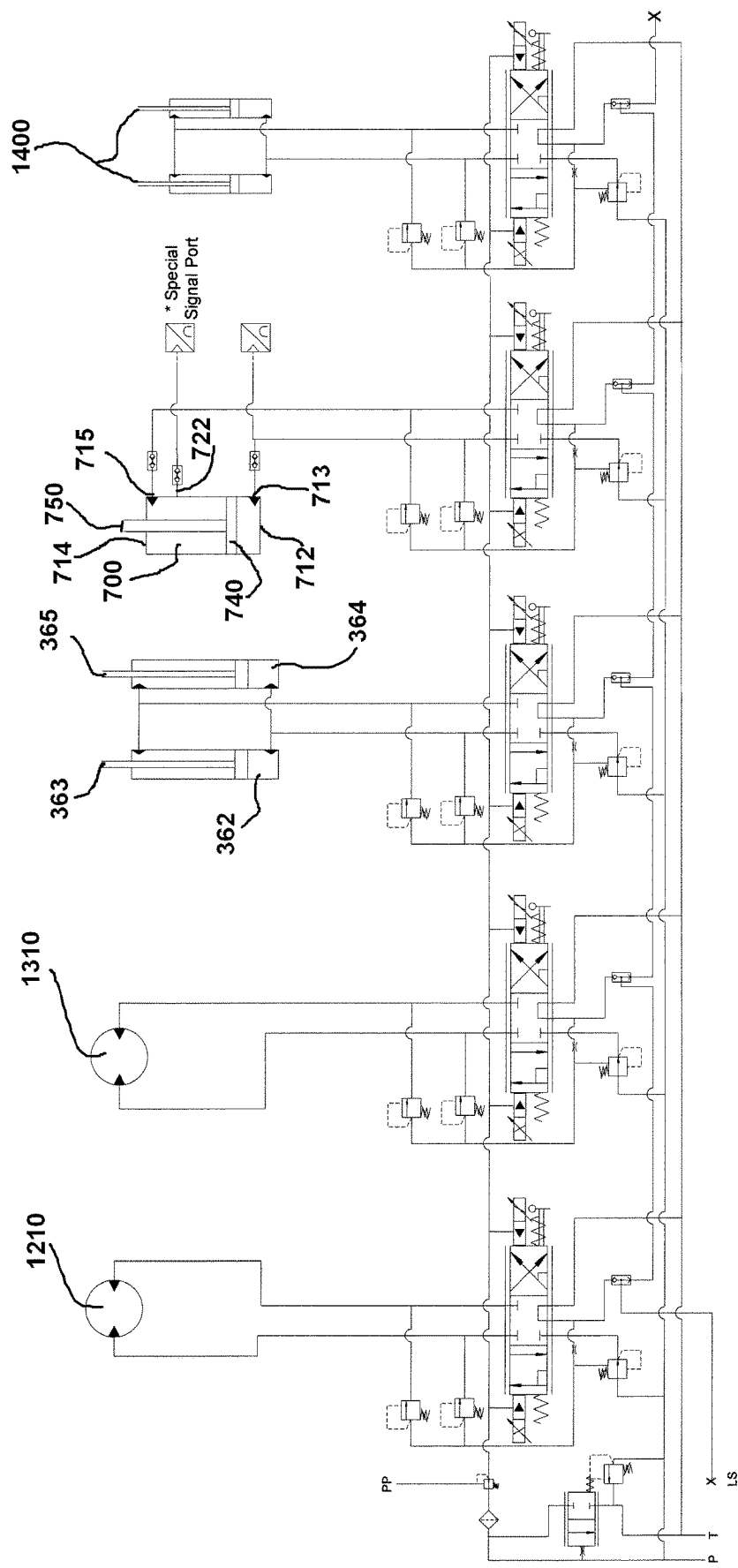
FIG. 45 is a schematic diagram of the hydraulic circuits controlling the high torque driver, low torque driver, vertical lifting and lowering mechanism, sliding housing, and lifting fork during make up mode.
Figure 46:
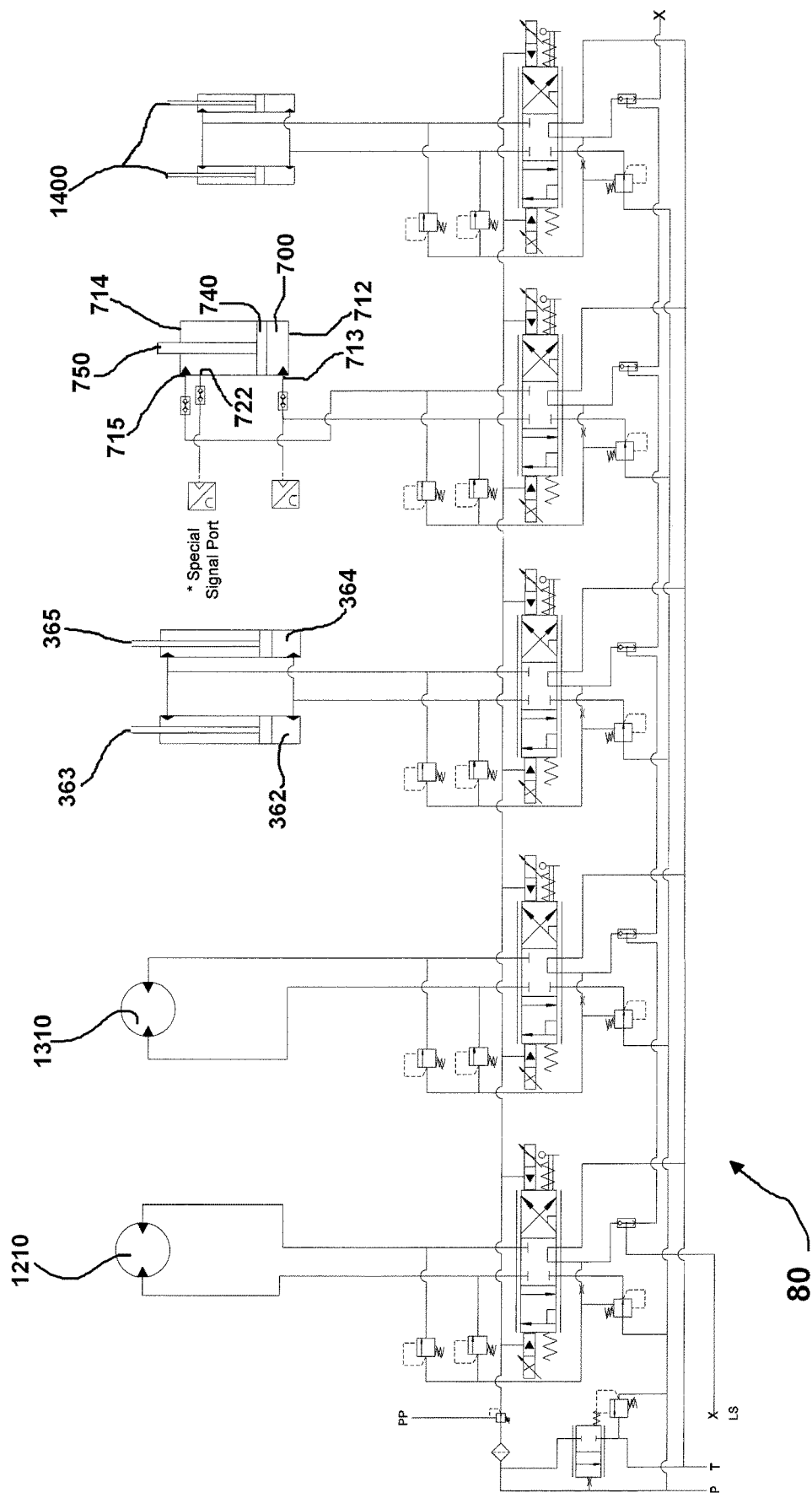
FIG. 46 is a schematic diagram of the hydraulic circuits controlling the high torque driver, low torque driver, vertical lifting and lowering mechanism, sliding housing, and lifting fork during break out mode.
Figure 47:
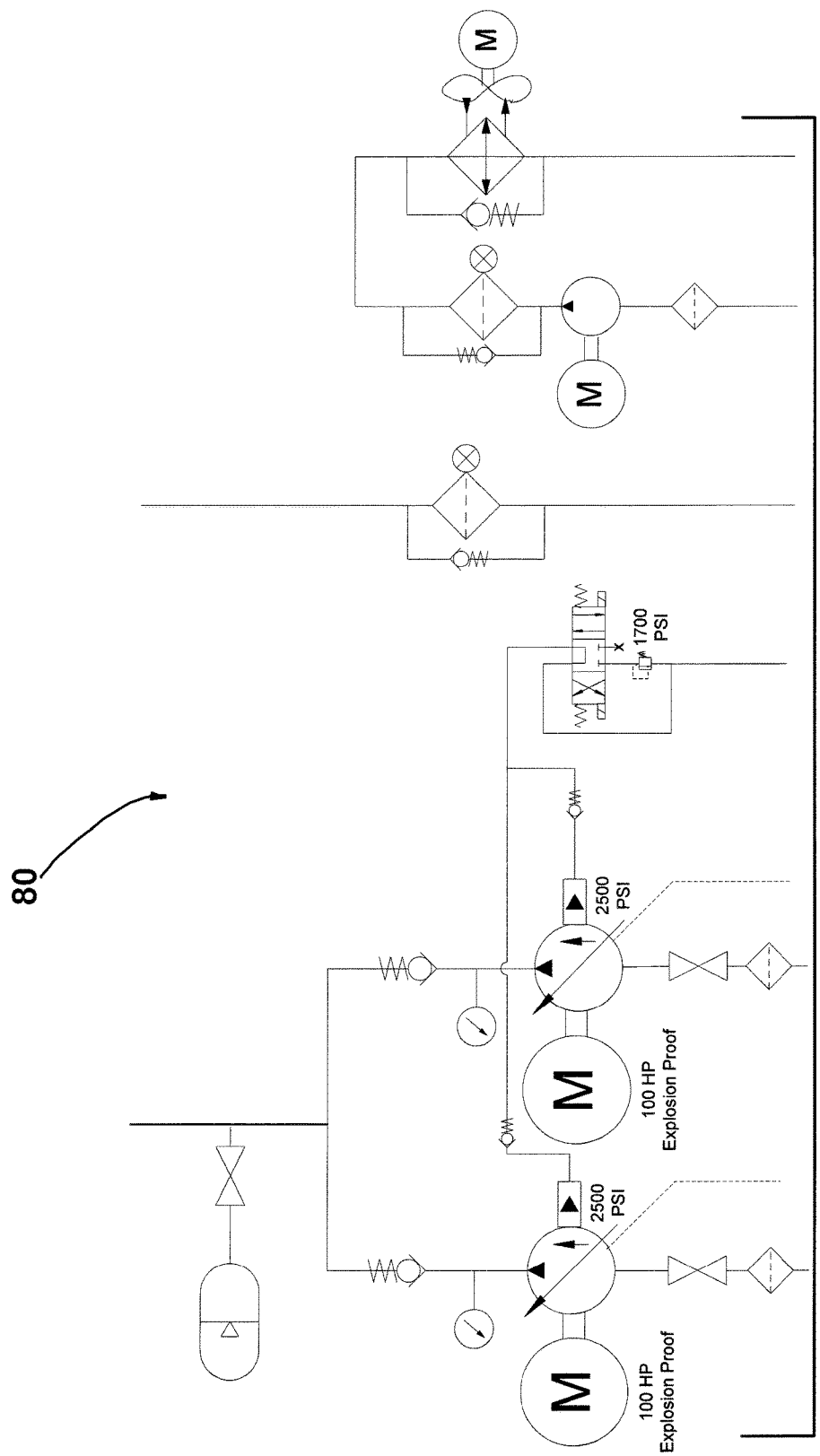
FIG. 47 is a schematic diagram of the hydraulic circuits for the hydraulic power unit.

FIGS. 45 through 47 include schematic diagrams of the hydraulic circuits controlling the high torque driver system 590, low torque driver 1200, vertical lifting and lowering mechanism 1300, sliding system for sliding housing 140 (cylinders/pistons 362 and 364), and lifting fork mechanism 1400.

FIGS. 45 (make up) and 46 (break out) show fluid flow and control for the low speed/high torque portion 590. In one embodiment, automatic reciprocation of piston 740 (distinguished from manual reciprocation of prior art wrenches) is obtained. Basically, piston 740 can be automatically reciprocated between extended and retracted states inside (e.g., between first interior wall 712 and second interior wall 712 of hydraulic cylinder 700).

In one embodiment cylinder 700 can contain interior extension 713 and retraction 715 hydraulic ports. Cylinder 700 can have an interior chamber length L (between first 712 and second 714 interior walls), and piston 740 can have a width D corresponding to the interior chamber size of cylinder 700. In one embodiment fluid source lines 713 and 715 can be located on side walls 712 and 714. In other embodiments fluid source lines 713 and 715 can be spaced apart a desired length (such as between interior walls 712 and 714).

Figure 34:
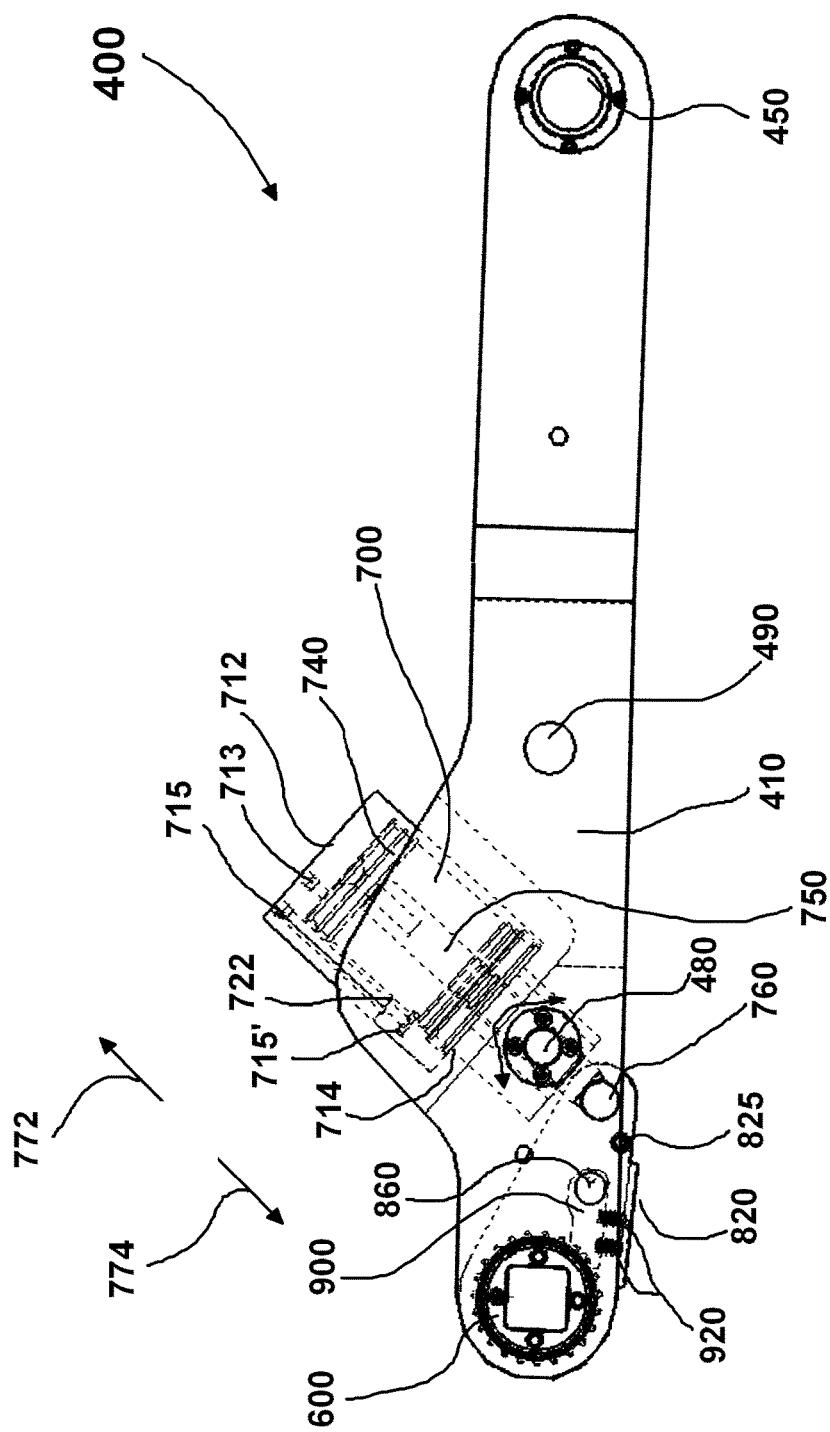
FIG. 34 is a top view of the high torque driver of the wrench of FIG. 30 where the piston is in a completely retracted position.
Figure 35:
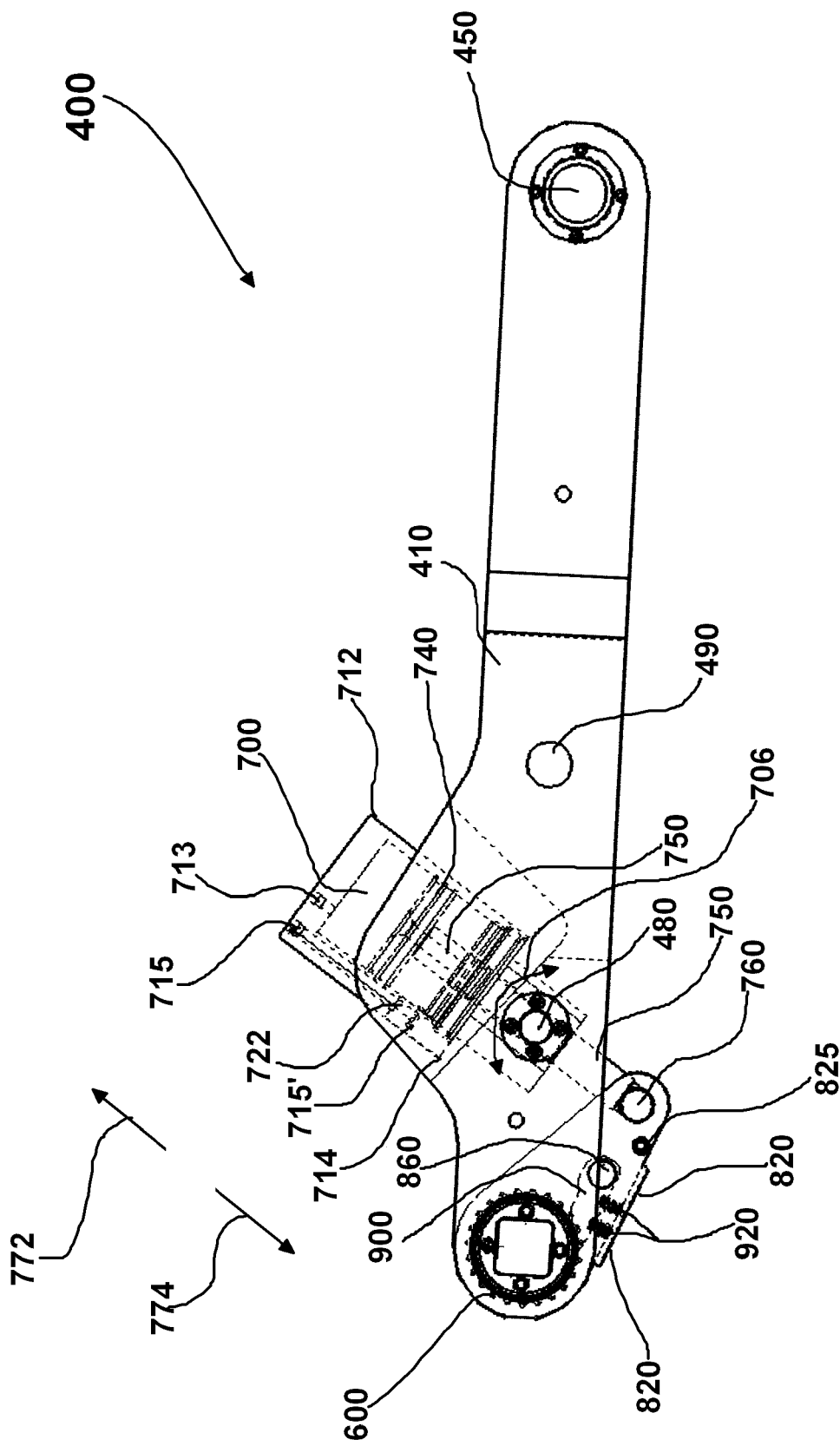
FIG. 35 is a top view of the high torque driver of the wrench of FIG. 30 where the piston is in the middle of a stroke.
Figure 36:
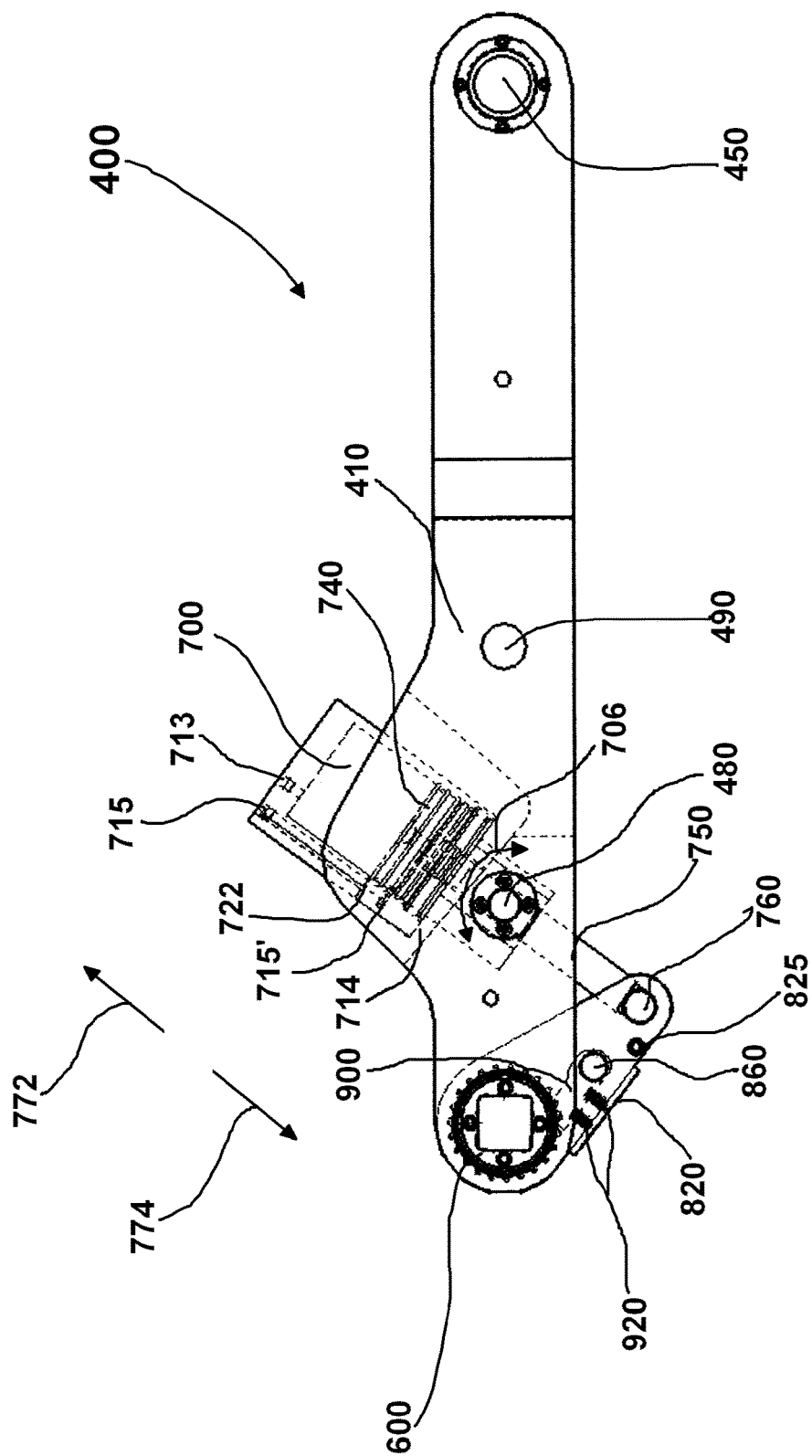
FIG. 36 is a top view of the high torque driver of the wrench of FIG. 30 where the piston is in a completely extended position.

In the start of the extension/advance mode for piston 740 and rod 750 (i.e., movement in the direction of arrow 774) piston 740 can be located to the rear of cylinder 700 (FIG. 34). Hydraulic fluid can flow into from port 713 causing piston 740 to move in the direction of arrow 774. As piston 740 moves (in the direction of arrow 774) past port 722, port 722 will see hydraulic pressure causing the flow direction mechanism schematically shown in the figures to switch flow from fluid source line 713 to fluid source line 715 causing the piston 740 and rode 750 to enter the retraction mode and move in the direction of arrow 772.

The retraction mode can be controlled on a timing basis which can be flow through port 715 for a set period of time which can be 1, 2, 3, 4, 5, 6, 7, 8, 9, and/or 10 seconds of retraction pressure. In various embodiments the set period of time can be between any two of the specified periods of time.

During make up the above steps of entering the extension/advance mode and retraction mode continue until piston 740 stalls from reaching a specified back-pressure. This is preferably the backpressure which causes a desired torque on bolt 32.

During break out the above steps of entering the extension/advance mode and retraction mode can continue for a specified number of strokes.

For extension in the high torque cylinder 700, pressure is sent to the extension port 713 causing piston 740 to move in the direction of arrow 774 until pressure is read in the pilot port 722 (this will occur when the piston 740 passes up the pilot port 722 to see the hydraulic fluid inside the cylinder 710). Once the pilot port 722 sees pressure the system reverses hydraulic fluid flow to now send fluid through the retraction port 715 for a set period of time which can be 1, 2, 3, 4, 5, 6, 7, 8, 9, and 10 seconds of retraction pressure. Flow through retraction port 715 will cause piston 740 to move in the direction of arrow 772.

On make-up this process (alternating stroking of piston 740 and rod 750 in the directions of arrows 774 and 772) is repeated until a pre-specified pressure is reached on the extension port with the pilot port having a reduced pressure (low to zero).

On break-out this process (alternating stroking of piston 740 and rod 750 in the directions of arrows 774 and 772) can be repeated for the set number of cycles.

Overall Side View in of Steps in Making Up (Tripping in) Multiple Sections of a Riser FIGS. 48 through 57 schematically show various steps in making up individual joints of a riser 40.

Figure 48:
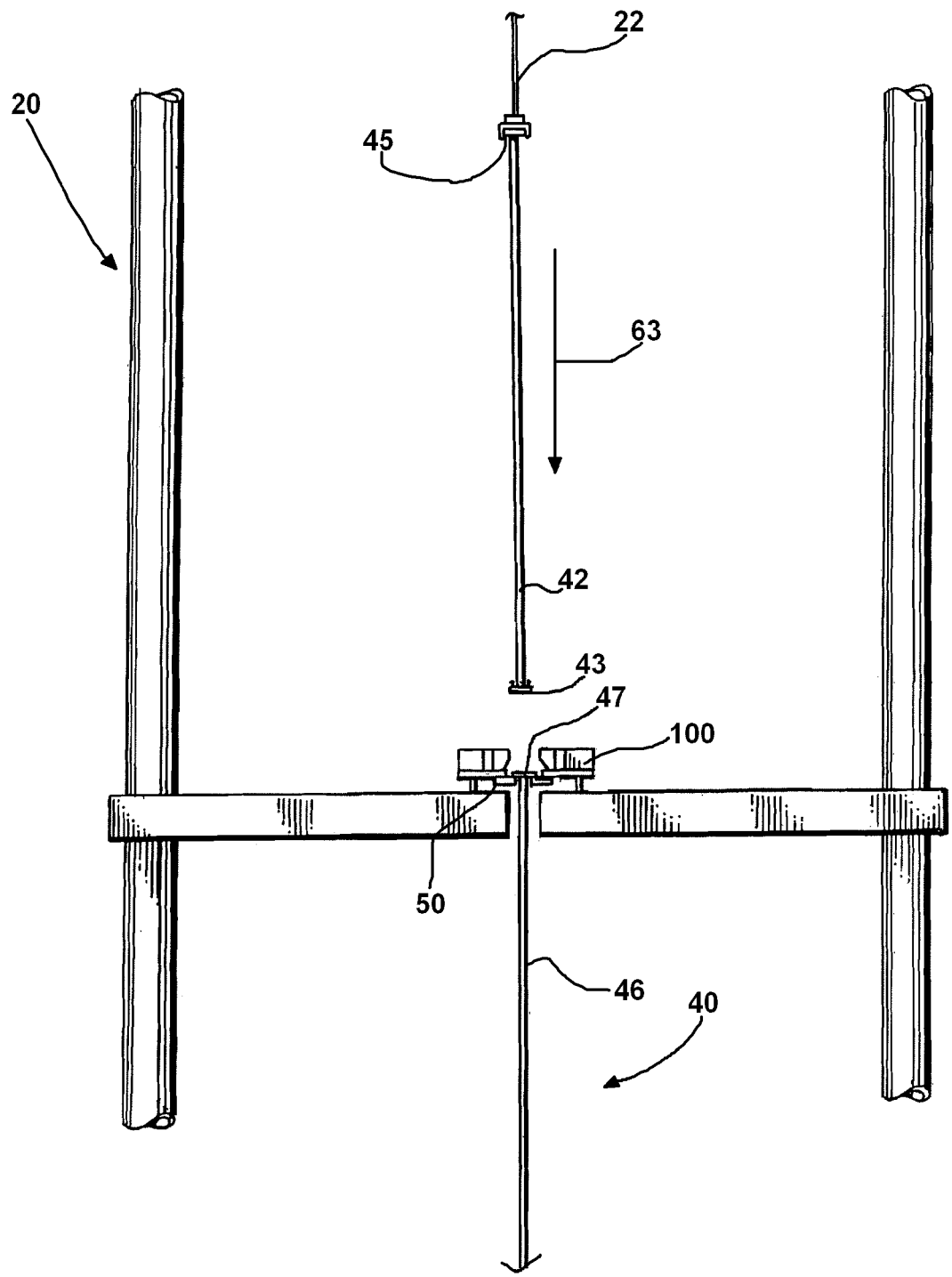
FIG. 48 is a schematic side view of the step of making up a riser string of lowering a second riser section onto a first riser section where the first riser section along with the rest of the riser string is supported by the spider.

FIG. 48 is a schematic side view of the step of making up a riser 40 string of lowering (in the direction of arrow 63) a second riser section 45 onto a first riser section 46 where the first riser section 46 along with the rest of the riser 40 string is supported by the spider 50.

Figure 49:
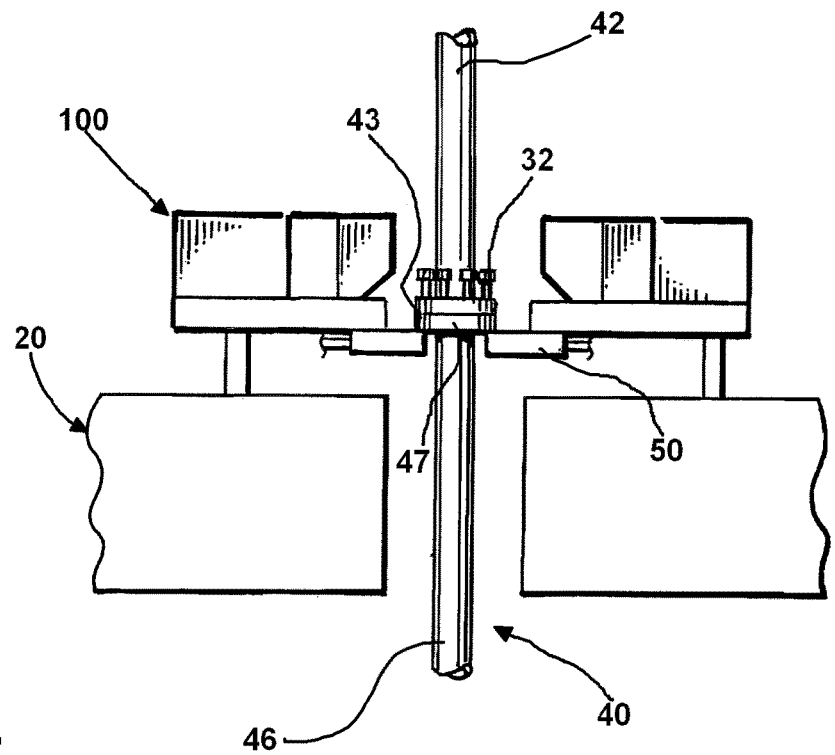
FIG. 49 is a closeup side view of where the second riser section has been placed on top of the first riser section showing a plurality of riser bolts ready to be tightened with the spider supporting the riser string and a plurality of torque modules are located in their home position.

FIG. 49 is a close up side view of where the second riser section 45 has been placed on top of the first riser section 46 showing a plurality of riser bolts 32A-F ready to be tightened with the spider 50 supporting the riser 40 string and a plurality of torque modules 110A-F are located in their home position.

Figure 50:
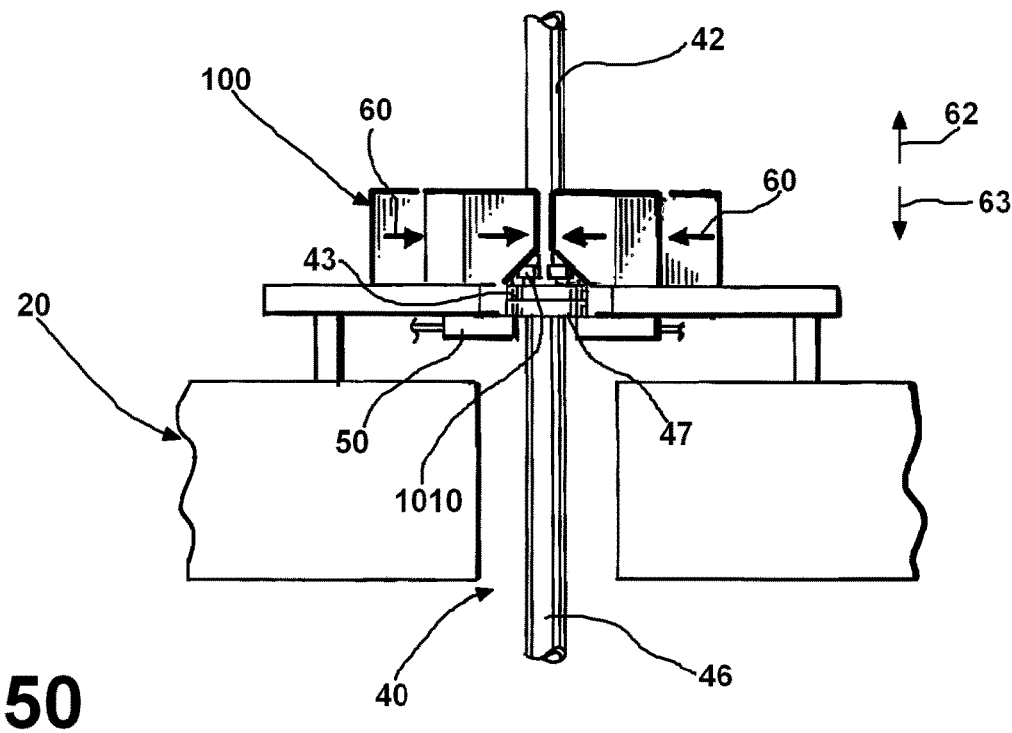
FIG. 50 is a side view schematically indicating that the plurality of torque modules shown in FIG. 49 have extended are making up the plurality of riser bolts while the riser string is being supported by the spider.

FIG. 50 is a side view schematically indicating that the plurality of torque modules 110A-F have extended (radially in the direction of arrow 60) are making up the plurality of riser bolts 32A-F while the riser string 40 is being supported by the spider 50.

Figure 51:
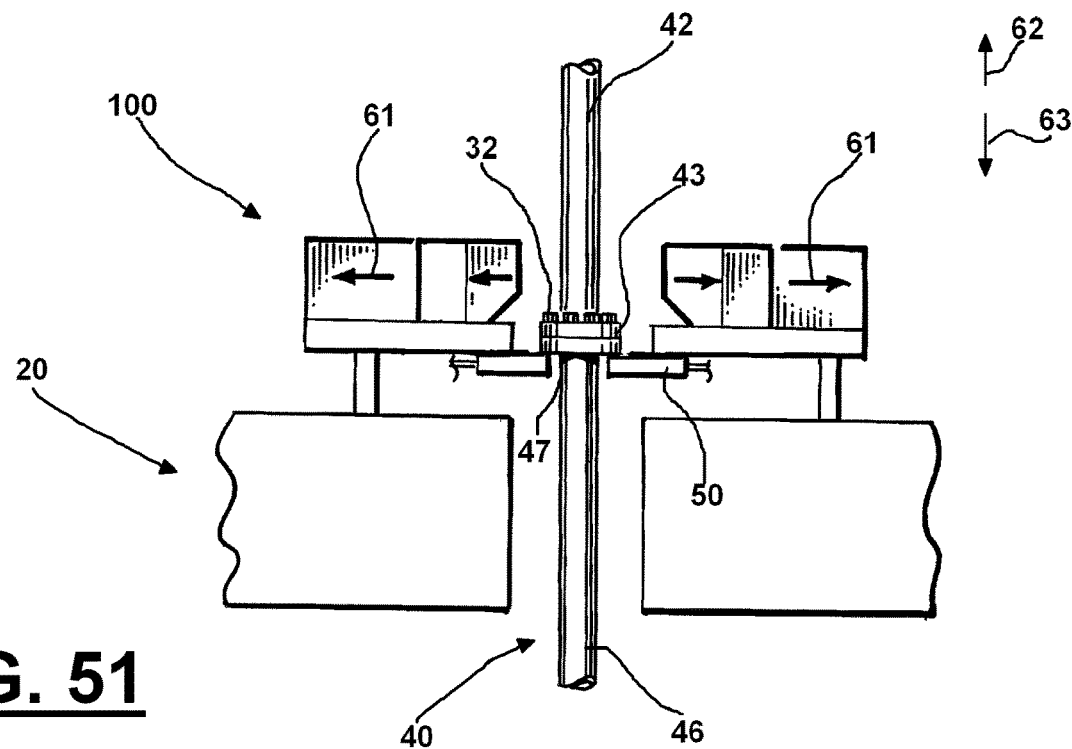
FIG. 51 is a side view schematically indicating that the plurality of torque modules have completed the make up of the plurality of riser bolts and such modules are retracting to their home position.

FIG. 51 is a side view schematically indicating that the plurality of torque modules 110A-F have completed the make up of the plurality of riser bolts 32A-F and such modules are retracting (radially in the direction of arrow 61) to their home position.

Figure 52:
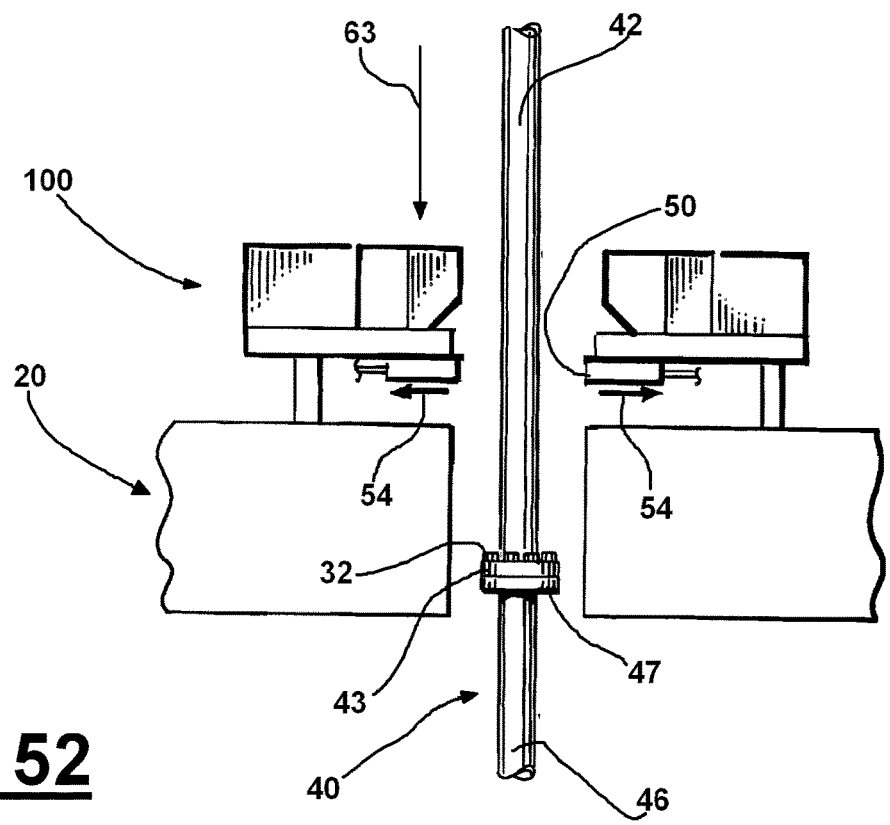
FIG. 52 shows the now made up joint between the second and first riser sections is being lowered by the rig lifting elevator after the spider has been retracted.

FIG. 52 shows the now made up joint (flanges 43 and 47) between the second 42 and first 46 riser sections is being lowered (in the direction of arrow 63) by the rig lifting elevator 22 after the spider 50 has been retracted (in the direction of arrows 54).

Figure 53:
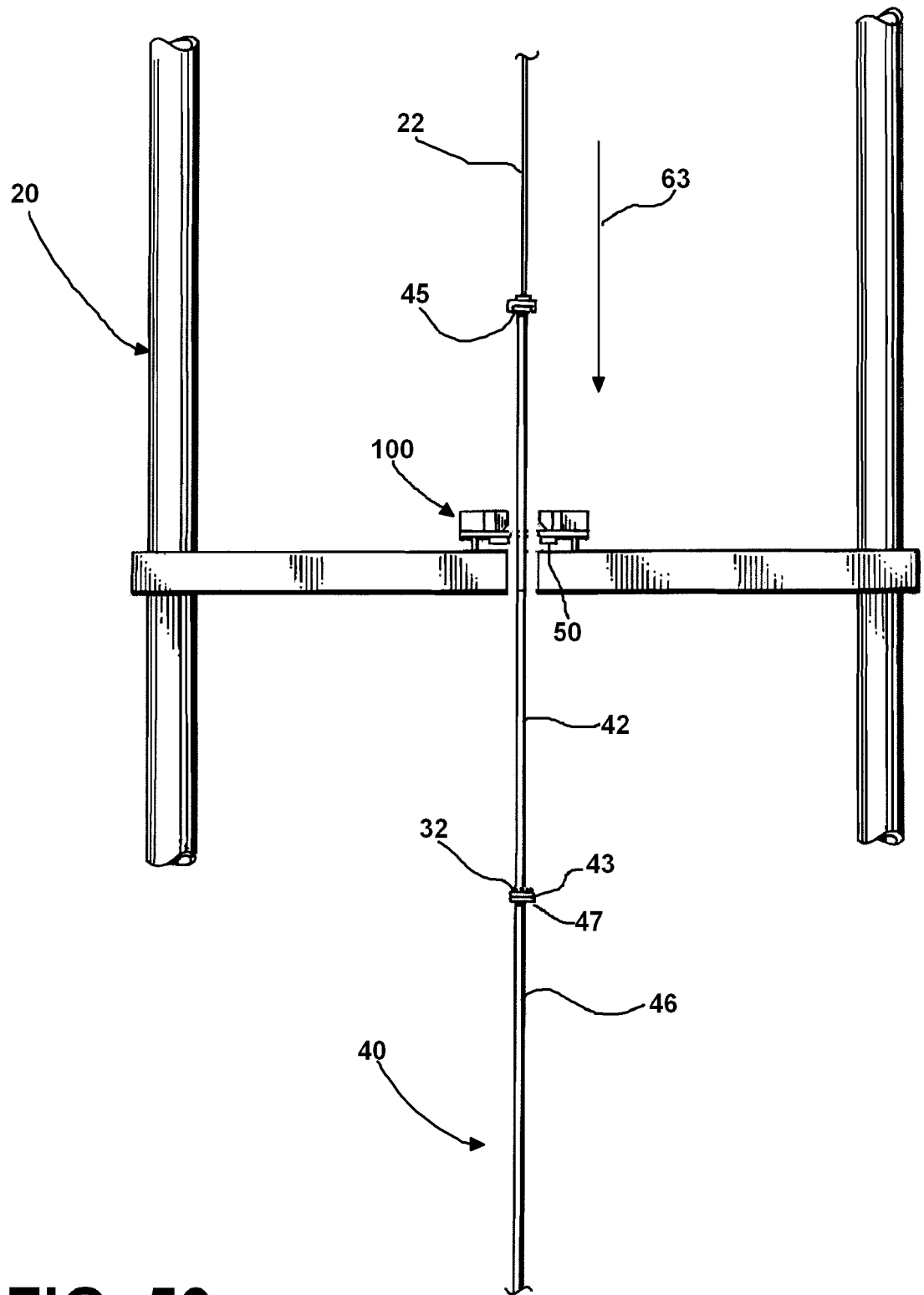
FIG. 53 is a side view of the now made up joint between the second and first riser sections is being lowered by the rig lifting elevator (which supports the string by attachment to the upper flange of the second riser section) after the spider has been retracted.

FIG. 53 is a side view of the now made up joint (flanges 43 and 47) between the second 42 and first 46 riser sections is being lowered (in the direction of arrow 63) by the rig lifting elevator 22 (which supports the riser 40 string by attachment to the upper flange 45 of the second riser section 42) after the spider 50 has been retracted.

Figure 54:
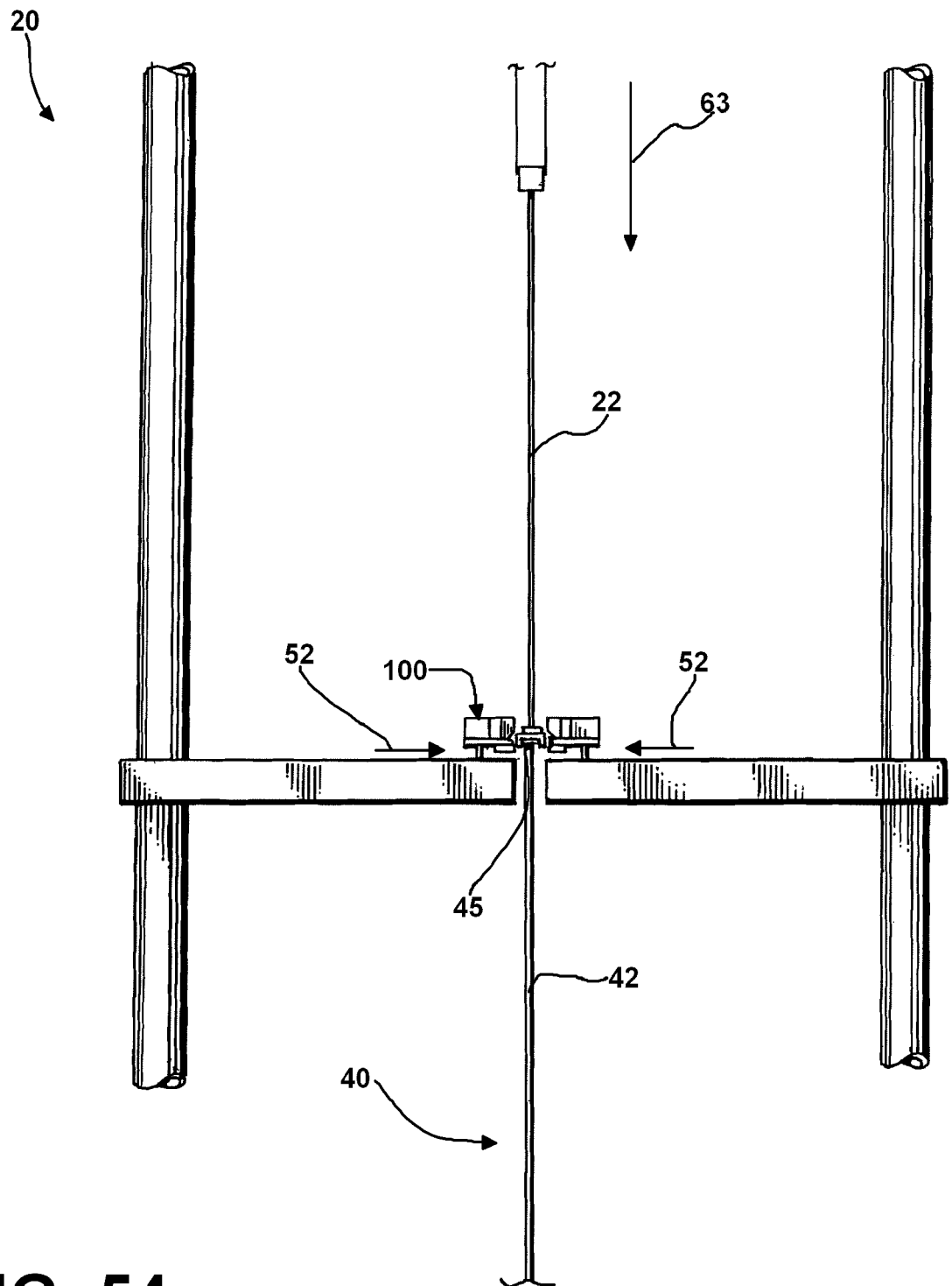
FIG. 54 is a side view of the elevator supporting the riser string by the upper flange of the second riser section and located this upper flange in the spider for support.

FIG. 54 is a side view of the elevator 22 supporting the riser string 20 by the upper flange 45 of the second riser section 42 and located this upper flange 45 in the spider 50 for support. Arrows 52 schematically indicate that the spider 50 has closed to support riser string 40 by supporting upper flange 45.

Figure 55:
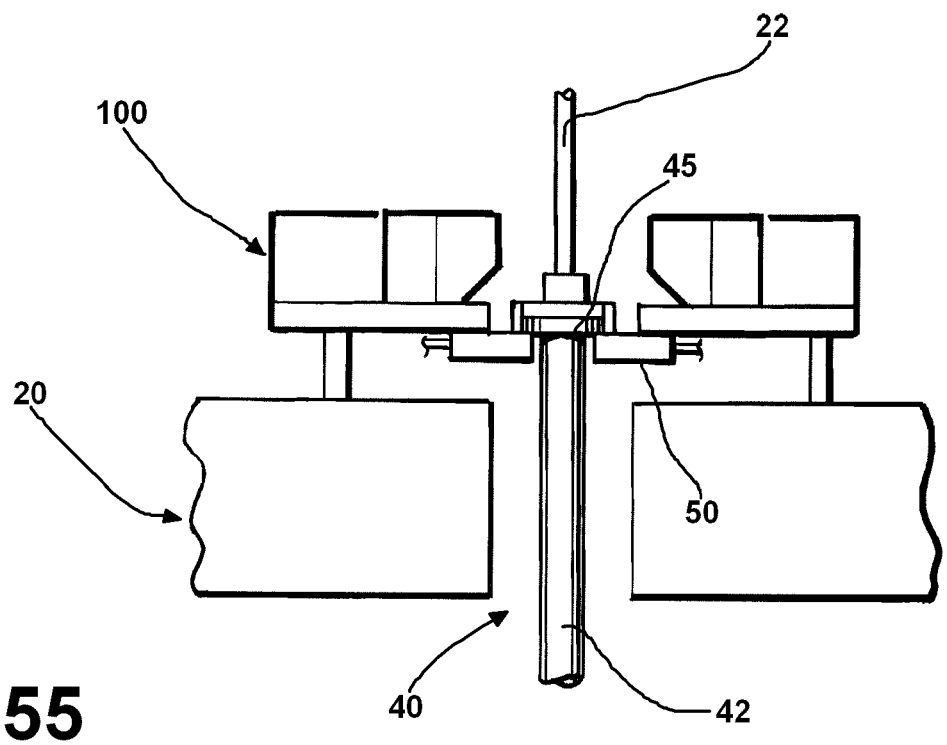
FIG. 55 is a close up view of the elevator supporting the riser string by the upper flange of the second riser section and having placed the upper flange on the spider for support.

FIG. 55 is a close up view of the elevator 22 supporting the riser string 40 by the upper flange 45 of the second riser section 42 and having placed the upper flange 45 on the spider 50 for support.

Figure 56:
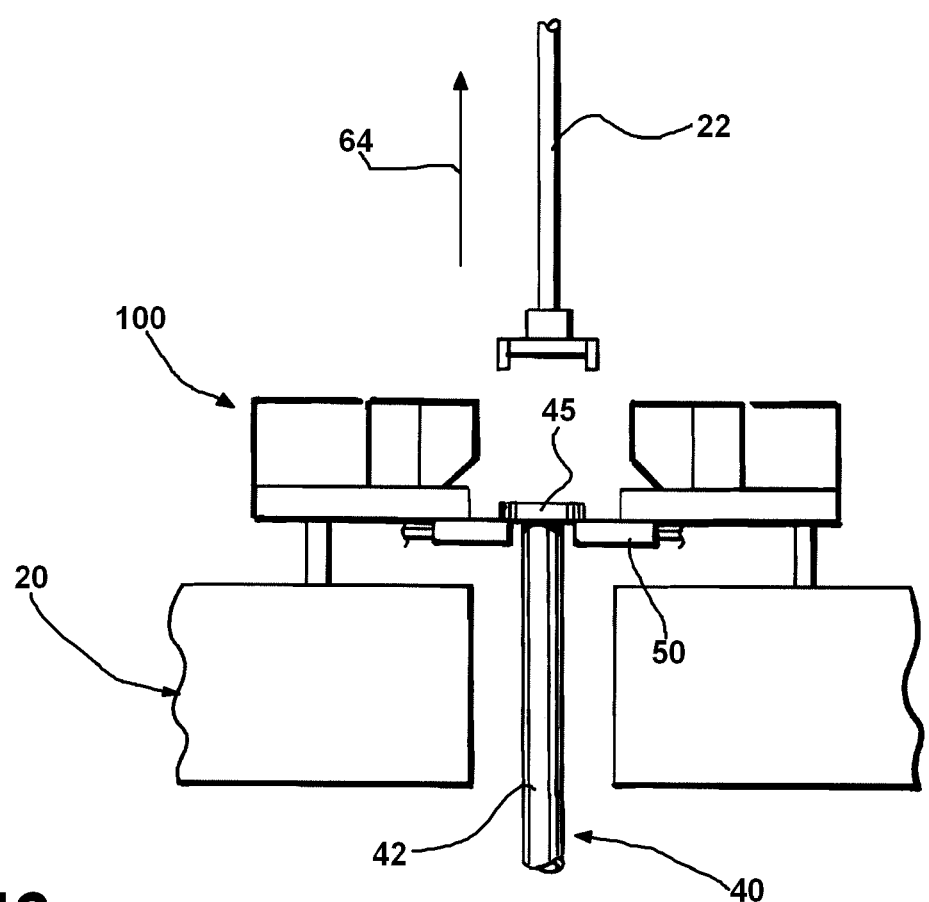
FIG. 56 is a close up view of the elevator being removed from the upper flange of the second riser section.

FIG. 56 is a close up view of the elevator 22 being removed (schematically indicated by arrow 64) from the upper flange 45 of the second riser section 42. Riser string 40 (along with second riser section 42) is supported by spider 50.

Figure 57:
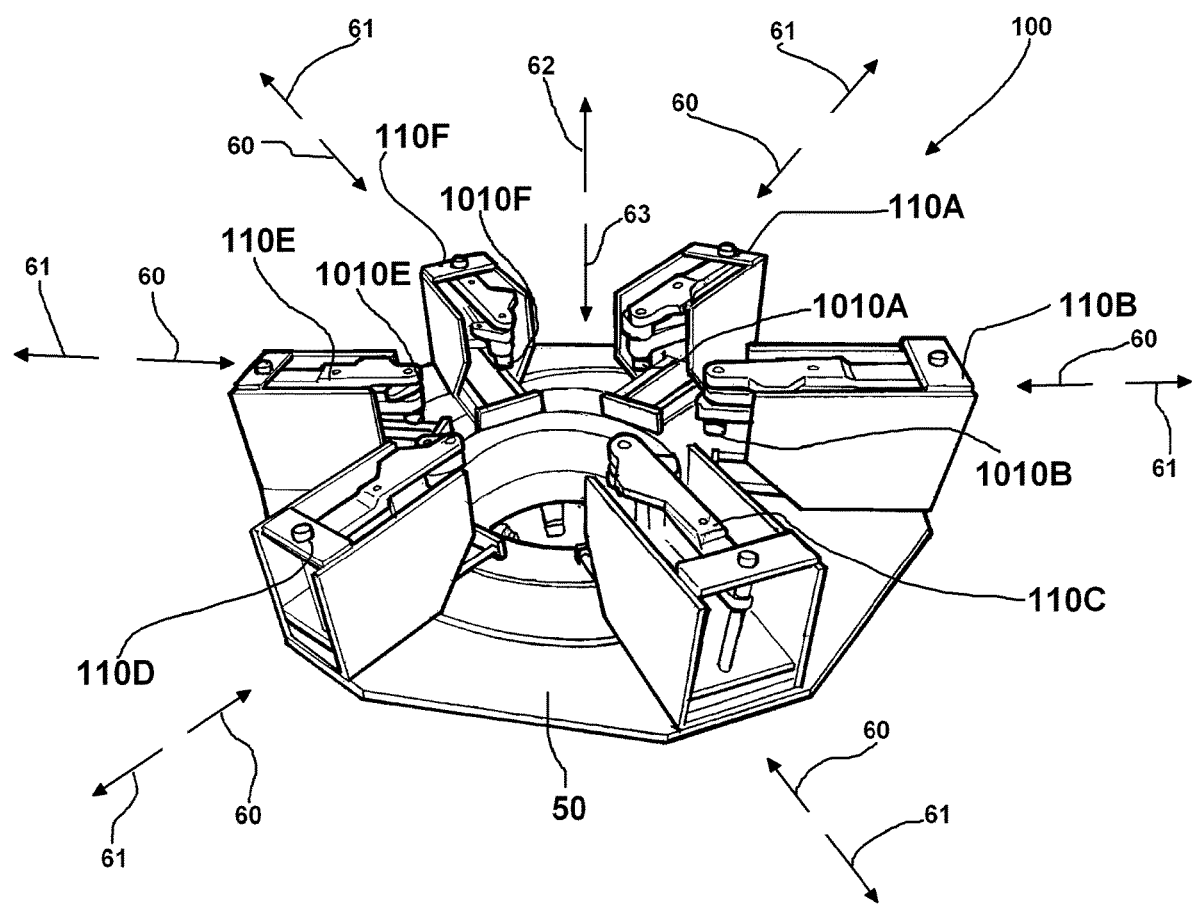
FIG. 57 is a perspective view of all six torque modules in their home positions and set up in the break out mode.

FIG. 57 is a perspective view of all six torque modules 110A-F in their home positions and set up in the break out mode on spider 50. Radial arrows 60 and 61 schematically indicate extension and retraction of each of the modules. Upper and lower arrows 62 and 63 schematically indicated upward movement and lower movement of individual drive sockets 1010A-F for each of the modules.

Rotational Counter

In one embodiment a rotational counter can be used to count the number (and possibly the direction) of revolutions of driver tip or socket 1010 after driver tip or socket 1010 engages the head of bolt 32. Because the pitch of the threads on bolt 32 are known the distance of vertical movement of bolt 32 can be determined. This distance of vertical movement of bolt 32 can be made up by vertical lifting and lowering mechanism 1300 in combination with height sensor 1350. The counter of rotations of bolt 32 can be for one or more portions of the vertical movement of bolt 32. Different portions can be analyzed because of the step where bolt 32 freely spins between the upper and lower flanges (43 and 47) and/or drops between these two upper and lower flanges (43 and 47).

In one embodiment a rotational counter can be used to count the number (and possibly the direction) of revolutions of vertical lifting and lowering screw 1330 (and/or motor 1310) to calculate the vertical movement of driver tip or socket 1010. Because the pitch of the threads on screw 1330 are known the distance of vertical movement of bolt housing 1200 (and tip or socket 1010) can be determined. This distance of vertical movement can be used to control lifting and lowering mechanism 1300 during various steps in the various sequences.

LIST OF REFERENCE NUMERALS

The following is a list of reference numerals used in the present application:

| Reference Numeral | Description: |
|---|---|
| 10 | perspective view of preferred embodiment |
| 20 | rig |
| 22 | lifting elevator for rig |
| 32 | bolt |
| 40 | riser |
| 42 | riser section |
| 43 | flange |
| 44 | floatation/insulation material for riser section |
| 45 | upper flange |
| 46 | riser section |
| 47 | flange |
| 48 | projection of cylinder |
| 49 | gap |
| 50 | spider |
| 52 | arrow (extension) |
| 54 | arrow (retraction) |
| 60 | arrow |
| 62 | arrow |
| 64 | arrow |
| 66 | arrow |
| 68 | arrow |
| 70 | arrow |
| 80 | control panel/hydraulic fluid source |
| 100 | wrench system |
| 110 | wrench |
| 140 | sliding housing |
| 142 | top |
| 144 | bottom |
| 146 | front |
| 148 | rear |
| 150 | side wall |
| 152 | side wall |
| 154 | foot connector |
| 155 | foot connector |
| 156 | foot connector |
| 157 | foot connector |
| 160 | brace |
| 170 | brace |
| 180 | brace |
| 190 | tracks |
| 192 | track |
| 194 | track |
| 196 | track |
| 198 | track |
| 300 | base |
| 310 | top |
| 320 | bottom |
| 330 | front |
| 331 | radial tabs |
| 332 | connecting pins |
| 334 | connecting pins |
| 340 | rear |
| 350 | guide system |
| 352 | guide shaft |
| 354 | guide shaft |
| 356 | front plate |
| 357 | extension adjusters |
| 358 | rear plate |
| 359 | retraction adjusters |
| 360 | positioning system for base |
| 362 | hydraulic cylinder and piston |
| 363 | rod |
| 364 | hydraulic cylinder and piston |
| 3654 | rod |
| 400 | wrench |
| 406 | wrench body |
| 410 | top |

-continued

| Reference Numeral | Description: |
|---|---|
| 420 | bottom |
| 440 | first end |
| 450 | second end |
| 452 | arrows |
| 460 | top opening for driver |
| 470 | bottom opening for driver |
| 480 | opening for cylinder pivot rod |
| 490 | opening for vertical lifting and lowering screw |
| 498 | bore for reaction bar |
| 500 | reaction bar |
| 510 | first end |
| 520 | second end |
| 590 | high torque driver |
| 600 | drive gear |
| 610 | plurality of angular teeth |
| 620 | opening in drive gear for drive pin |
| 700 | reciprocating cylinder |
| 702 | arrows |
| 706 | arrows |
| 708 | arrows |
| 710 | cylinder |
| 712 | first interior wall |
| 713 | extension port |
| 714 | second interior wall |
| 715 | retraction port |
| 720 | cylinder yoke |
| 722 | pressure port |
| 730 | opening for pivot pin |
| 734 | pivot pin |
| 740 | piston |
| 750 | piston rod |
| 760 | tip for piston rod |
| 770 | arrow |
| 772 | arrow |
| 774 | arrow |
| 778 | pivot |
| 800 | first drive plate |
| 810 | second drive plate |
| 820 | drive plate extension |
| 825 | spacer |
| 830 | bore in first drive plate for drive gear |
| 840 | bore in second drive plate for drive gear |
| 850 | bore in first drive plate for piston rod tip |
| 852 | bore in second drive plate for piston rod tip |
| 860 | bore in first drive plate for drive pawl |
| 870 | bore in second drive plate for drive pawl |
| 880 | first bushing |
| 881 | opening |
| 882 | second bushing |
| 883 | opening |
| 884 | plurality of connectors |
| 900 | drive pawl |
| 910 | pivot tips for drive pawl |
| 920 | drive pawl biasing member (e.g., springs) |
| 1000 | driver |
| 1010 | driver tip |
| 1012 | axis of rotation |
| 1020 | opening for head of bolt |
| 1030 | depth of opening |
| 1040 | driver shaft |
| 1042 | first end |
| 1044 | second end |
| 1046 | cross sectional shape |
| 1050 | high speed connection area |
| 1052 | plurality of teeth for high speed connector |
| 1200 | high speed/low torque driver |
| 1210 | motor |
| 1220 | belt |
| 1222 | tension pulleys |
| 1230 | housing |
| 1232 | first end |
| 1234 | second end |
| 1236 | top |
| 1238 | bottom |
| 1240 | opening for vertical lifting and lowering screw |
| 1242 | threaded area for vertical lifting and lowering screw |
| 1250 | plurality of tracks |

-continued

| Reference Numeral | Description: |
|---|---|
| 1252 | track |
| 1254 | track |
| 1256 | track |
| 1258 | track |
| 1300 | vertical lifting and lowering mechanism |
| 1310 | motor |
| 1330 | vertical lifting and lowering screw |
| 1332 | arrow |
| 1334 | arrow |
| 1350 | height sensor |
| 1360 | moving indicator for sensor |
| 1370 | depth to known origin/level/standard |
| 1400 | screw lifting mechanism |
| 1402 | arrow |
| 1404 | arrow |
| 1410 | lifting fork |
| 1420 | plate |
| 1430 | track |
| 1432 | track |
| 1440 | driving hydraulic cylinder and piston or pair of driving cylinders and pistons |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A multi-bolt or nut torque wrench system for installing or removing a plurality of threaded bolt or nut members on a riser, the system comprising:
   (a) a plurality of torque stations, each torque station including:
      (i) a wrench body that includes first and second end portions, and a drive head on the first end portion of the body;
      (ii) a torque wrench operatively connected to the drive head for rotating a threaded bolt or nut member; and
      (iii) a positioning mechanism for moving the drive head, wherein when the drive head is engaged with the threaded bolt or nut member, the positioning mechanism can move the drive head in a vertical direction independent from operation of the torque wrench, wherein the wrench system has a center of mass and the riser has an interior and the center of mass of the wrench system is located inside the interior of the riser; and
   (b) a controller that controls the plurality of torque stations, including the torque wrenches, the positioning mechanism, such that the plurality of drive heads engage their respective bolt or nut members, wherein the controller automatically controls the plurality of torque stations.

2. The wrench system of claim 1, wherein the plurality of torque stations are radially spaced about a circle.

3. The wrench of claim 2, wherein there are six torque stations.

4. The wrench of claim 2, wherein in step "b", the controller automatically controls the torque stations, torque wrenches, and positioning mechanisms.

5. The wrench system of claim 1, wherein the plurality of torque stations encircles said riser, and wherein the positioning mechanism moves the drive head in a radial line extending inwardly toward said riser.

6. The multi-bolt or nut torque wrench system of claim 1, wherein each torque station includes an extendable and retractable bolt lifting mechanism that is extendable and retractable relative to its respective drive head, wherein in the extended condition each bolt lifting mechanism can vertically move a bolt to which its respective drive head is attached in the event the bolt enters a freely spinning condition.

7. The multi-bolt or nut torque wrench system of claim 6, wherein the lifting mechanism is a lifting fork.

8. A multi-bolt or nut torque wrench system for installing or removing a plurality of fasteners each having a threaded bolt and a nut on a riser, the system comprising:
   (a) a plurality of torque stations, each torque station including:
      (i) a wrench body that includes first and second end portions, and a drive head on the first end portion of the body;
      (ii) a torque wrench operatively connected to the drive head for rotating a threaded bolt member, the threaded bolt member including a driven head;
      (iii) a horizontal positioning mechanism for moving the drive head in a generally horizontal direction; and
      (iv) a vertical positioning mechanism for moving the drive head in a generally vertical direction, wherein when the drive head engages the threaded bolt member, the drive head engages the driven head of the threaded bolt member from a vertical direction generally above the head of the threaded bolt member, and wherein the vertical positioning mechanism can move the drive head in a vertical direction independently from operation of the horizontal positioning mechanism, further comprising a frame that encircles said riser and said plurality of torque stations are on said frame, and wherein the horizontal positioning mechanism moves the drive head along a radially extending line; and
   (b) a controller that controls the plurality of torque stations, including the torque wrenches, the horizontal positioning mechanism, and the vertical positioning mechanisms such that the plurality of drive heads engage their respective bolt or nut members.

9. The multi-bolt or nut torque wrench system of claim 8, wherein the plurality of torque stations are radially spaced about a circle.

10. The multi-bolt or nut torque wrench system of claim 9, wherein there are six torque stations.

11. The multi-bolt or nut torque wrench system of claim 9, wherein in step "b", the controller automatically controls the torque stations, torque wrenches, and horizontal and vertical positioning mechanisms.

12. The multi-bolt or nut torque wrench system of claim 8, wherein each torque station includes an extendable and retractable bolt lifting mechanism that is extendable and retractable relative to its respective drive head, wherein in the extended condition each bolt lifting mechanism can vertically move a bolt to which its respective drive head is attached in the event the bolt enters a freely spinning condition.

13. The multi-bolt or nut torque wrench system of claim 12, wherein the lifting mechanism is a lifting fork.

14. A method of breaking out a riser string, comprising the following steps:
   (a) providing a plurality of torque stations, each torque station including:
      (i) a wrench body that includes first and second end portions, and a drive head on the first end portion of the body;
      (ii) a torque wrench operatively connected to the drive head for turning the drive head; and
      (iii) a positioning mechanism for moving the drive head, wherein when the drive head is engaged with a threaded bolt or nut member, the positioning mechanism can vertically position the drive head independent from operation of the torque wrench, and wherein the positioning mechanism moves the drive head along a generally horizontally extending line;
   (b) providing a controller that controls the plurality of torque stations, including the torque wrenches, and the positioning mechanisms;
   (c) supporting a riser string on a drilling rig or platform, the riser string including a plurality of joints of riser sections, wherein the riser joint sections are threadably connected together with a plurality of riser threaded bolt members;
   (d) the controller causing the plurality of drive heads to each engage one of the plurality of riser threaded bolt members on one of the plurality of riser joint sections;
   (e) the controller causing each of the drive heads to break out their respectively engaged riser threaded bolt member;
   (f) causing the plurality of drive heads to spin up their respectively engaged riser threaded bolt members, wherein, during the spin up process, the respective torque wrenches turning their respective drive heads;
   (g) the controller causing the plurality of drive heads to disengage the plurality of riser threaded bolt members;
   (h) removing and retrieving the riser joint section of the riser string; and
   (i) raising the riser string a distance so that another one of the plurality of riser joint sections can be broken out, removed, and retrieved; and
   wherein in step "a" each torque station includes a bolt lifting mechanism that is extendable and retractable relative to its respective drive head, wherein in the extended condition each bolt lifting mechanism can vertically move a bolt to which its respective drive head is attached in the event the bolt enters a freely spinning condition, and wherein during step "f" each threaded riser bolt enters a free spin mode and is lifted by one of the bolt lifting mechanisms.

15. The method of claim 14, wherein step "f" is performed before step "e" is completed for each of the plurality of riser threaded bolt members of a particular riser section.

16. The method of claim 14, wherein in step "d" each of the plurality of riser threaded bolt members are simultaneously engaged.

17. The method of claim 14, wherein the lifting mechanism is a lifting fork.

18. The method of claim 14, wherein in step "f" each riser bolt of the plurality of riser threaded bolt members includes a bolt head and the threaded bolt's respective lifting mechanism engages the bottom of the bolt head.

* * * * *